United States Patent
Saito et al.

(10) Patent No.: US 6,523,696 B1
(45) Date of Patent: Feb. 25, 2003

(54) COMMUNICATION CONTROL DEVICE FOR REALIZING UNIFORM SERVICE PROVIDING ENVIRONMENT

(75) Inventors: Takeshi Saito, Tokyo (JP); Yoshiaki Takabatake, Kanagawa (JP); Mikio Hashimoto, Chiba (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/073,140

(22) Filed: May 6, 1998

Related U.S. Application Data

(63) Continuation-in-part of application No. 09/035,995, filed on Mar. 6, 1998, now abandoned, which is a continuation-in-part of application No. 08/950,143, filed on Oct. 14, 1997, now abandoned.

(30) Foreign Application Priority Data

Oct. 15, 1996 (JP) .............................................. 8-272672
May 6, 1997 (JP) .............................................. 9-115685
Oct. 13, 1997 (JP) .............................................. 9-279159

(51) Int. Cl.$^7$ ............................................ G06F 15/173
(52) U.S. Cl. ........................................ 209/223; 709/236
(58) Field of Search .............................. 709/223, 217, 709/232, 219, 236, 230; 370/401

(56) References Cited

U.S. PATENT DOCUMENTS

| | | | | |
|---|---|---|---|---|
| 5,452,291 A | * | 9/1995 | Eisenhandler et al. | 370/402 |
| 5,473,608 A | * | 12/1995 | Gagne et al. | 370/401 |
| 5,491,812 A | * | 2/1996 | Piscello et al. | 709/236 |
| 5,608,874 A | * | 3/1997 | Ogawa et al. | 395/246 |
| 5,623,605 A | * | 4/1997 | Keshav et al. | 709/236 |
| 5,710,908 A | * | 1/1998 | Man | 709/230 |
| 5,778,189 A | * | 7/1998 | Kimura et al. | 709/236 |
| 5,845,081 A | * | 12/1998 | Rangarajan et al. | 709/224 |
| 5,862,481 A | * | 1/1999 | Kulkarni et al. | 455/432 |
| 5,898,835 A | * | 4/1999 | Troung | 709/217 |
| 5,931,906 A | * | 8/1999 | Fidelibus, Jr. et al. | 709/217 |
| 5,938,752 A | * | 8/1999 | Leung et al. | 710/126 |
| 5,964,836 A | * | 10/1999 | Rowe et al. | 709/221 |
| 5,968,119 A | * | 10/1999 | Stedman et al. | 709/219 |
| 5,974,449 A | * | 10/1999 | Chang et al. | 709/206 |
| 5,991,813 A | * | 11/1999 | Zarrow | 709/236 |
| 5,996,024 A | * | 11/1999 | Blumenau | 709/301 |
| 6,320,874 B1 | * | 11/2001 | Crump et al. | 370/466 |

* cited by examiner

*Primary Examiner*—Glenton B. Burgess
*Assistant Examiner*—Abdullahi E. Salad
(74) *Attorney, Agent, or Firm*—Oblon, Spivak, McClelland, Maier & Neustadt, P.C.

(57) ABSTRACT

A communication control device capable of realizing a uniform service providing environment without relying on a particular network is disclosed. A communication control device connected with first and second networks has a collecting unit for collecting service information of service providing devices connected with the first network, according to a first protocol depending on the first network, and a notifying unit for notifying the service information to a device connected with a second network, according to a second protocol not depending on the first network.

46 Claims, 51 Drawing Sheets

FIG.4

| IP ADDRESSES OF OTHER AV CONTROL TERMINALS | ATTRIBUTE INFORMATION FOR DATA/AV DEVICES UNDER CONTROL OF THIS AV CONTROL TERMINAL | | |
|---|---|---|---|
| | NETWORK TYPE | ADDRESS | ATTRIBUTE |
| IP ADDRESSES OF 1ST AV CONTROL TERMINAL | 1394 | 1394 ADDRESS OF TRANSMITTING TERMINAL 1 | DVD PLAYER |
| --- | --- | --- | --- |
| IP ADDRESSES OF 3RD AV CONTROL TERMINAL | | | |

FIG.16A

| URL: | Service:http://192.168.1.1:80 |
|---|---|
| Attributes: | ATTRIBUTE INFORMATION OF WWW SERVICE |

| URL: | Service:album://192.168.1.1:900 |
|---|---|
| Attributes: | ATTRIBUTE INFORMATION OF DIGITAL ALBUM SERVICE |

| URL: | Service:aircon_lon://192.168.1.1:15000 |
|---|---|
| Attributes: | ATTRIBUTE INFORMATION OF AIR CONDITIONER ON LON |

| URL: | Service:microwave_lon://192.168.1.1:15001 |
|---|---|
| Attributes: | ATTRIBUTE INFORMATION OF MICROWAVE OVEN ON LON |

URL: Service:DVD1394://192.168.1.254:20000
Attributes: ATTRIBUTE INFORMATION OF DVD ON 1394

URL: Service:DVDR1394://192.168.1.254:20001
Attributes: ATTRIBUTE INFORMATION OF DIGITAL VTR ON 1394

URL: Service:http://192.168.1.1:80
Attributes: ATTRIBUTE INFORMATION OF WWW SERVICE URL: Service:album://192.168.1.1:900
Attributes: ATTRIBUTE INFORMATION OF DIGITAL
          ALBUM SERVICE URL: Service:aircon_lon://192.168.1.1:15000
Attributes: ATTRIBUTE INFORMATION OF AIR CONDITIONER
          ON LON URL: Service:microwave_lon://192.168.1.1:15001
Attributes: ATTRIBUTE INFORMATION OF MICROWAVE OVEN
          ON LON URL: Service:lpr://192.168.1.2:515
Attributes: ATTRIBUTE INFORMATION OF lpr SERVICE
          (PRINTER SERVICE)

FIG.33

```
HTTP/1.0 200 Document follows
 , , ,
```
HEADER SECTION

```
<HEAD><TITLE> DVD Home Page </TITLE>
<BODY>
<H1> HOME PAGE OF DVD PLAYER </H1>
 , , ,
<!--Transmission of "PLAY" Button-->
<IMG SRC= "play.gif" >
<A HREF= "rtsp://192.168.1.254:2000 PLAY" ><IMG SRC= "play.gif" ></A>
 , , ,
</BODY>
```
HOME PAGE TEXT SECTION

FIG.36

HEADER SECTION:
```
HTTP/1.0 200 Document follows
. . .
```

HOME PAGE TEXT SECTION:
```
<HEAD><TITLE> DVD Home Page </TITLE>
<BODY>
<H1> HOME PAGE OF DVD PLAYER </H1>
. . .
<!--Transmission of "PLAY" Button-->
<IMG SRC= "play.gif" >
<APP Src= "http://192.168.1.254:2000/app"
       Class= "Play" >
. . .
</BODY>
```

FIG.42

RTSP COMMAND CORRESPONDENCE TABLE

|  | RTSP COMMAND | 1394AV/C COMMAND |
|---|---|---|
| DVD PLAYER | PLAY (PARAMETER) ⋮ | PLAY (PARAMETER) ⋮ |
| DIGITAL VTR | PLAY (PARAMETER) ⋮ | PLAY (PARAMETER) ⋮ |
| ⋮ | ⋮ | ⋮ |

FIG.47

| ADDRESS & PORT NUMBER CONVERSION TABLE | | HOME NETWORK SIDE | |
|---|---|---|---|
| IP ADDRESS | 1ST PORT NUMBER | IP ADDRESS | 2ND PORT NUMBER |
| G.1 | 2000 | G.3 | 80 |
| G.1 | 2002 | G.2 | 80 |
| G.1 | 2004 | G.1 | 80 |
| ⋮ | ⋮ | ⋮ | ⋮ |

FIG.51
DOMESTIC HOME PAGE
HOME PAGE OF Mr.A'S HOME (DEVICES OF Mr.A'S HOME)
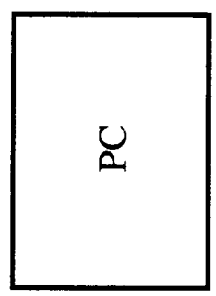
DVD PLAYER
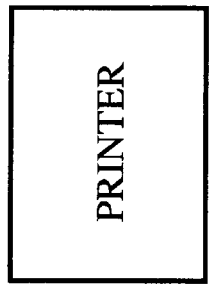
PRINTER
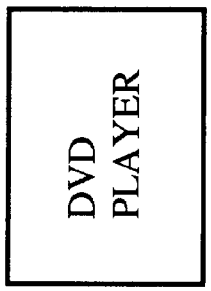
PC

COMMUNICATION CONTROL DEVICE FOR REALIZING UNIFORM SERVICE PROVIDING ENVIRONMENT

This is a continuation-in-part application of our, commonly assigned application Ser. No. 09/035,995 filed Mar. 6, 1998 now abandoned, which in turn is a continuation-in-part application of our commonly assigned application Ser. No. 08/950,143 filed Oct. 14, 1997, which is now abandoned.

BACKGROUND OF THE INVENTION

1. Field of the Invention

The present invention relates to a communication control device such as a computer having functions for realizing a directory service in a home network environment, a remote control of devices and a control of peripheral devices, and more particularly, to a communication control device such as a computer which may be required to control various types of devices connected to a general purpose bus.

2. Description of the Background Art

In recent years, there is a rapid trend for digitalizing electronic devices as exemplified by advances of the multimedia technology, and this trend is already noticeable in the office environment.

In terms of hardware, this trend has been materialized in forms of introduction of PCs, digitalization of OA devices and formation of networks among them. Also, in terms of software, this trend has been expanding to cover the basic functions of hosts (which are progressively light-sized and transferred to PCs), the application software such as the word-processing software, the spreadsheet software, etc., and the Internet application such as the WWW.

The similar trend can also be seen in the home environment for home use devices and related fields. Namely, even in the home environment, this trend for digitalization has been steadily progressed in forms of digitalization of AV devices (DVD, digital VTR, digital video camera, etc.), digitalization of broadcasting, and Internet access such as OCN.

This trend of technological innovations that has started from the office environment is expected to progress toward the formation of networks in future. Namely, it is expected that the technologies of various fields such as information processing, communication and broadcasting will be unified by the digitalization, and inter-mixed with each other by the formation of networks.

There are many candidates for the network technologies that provide the bases for this trend. For example, the Ethernet has overwhelming records of the actual use in the office environment and is probably the most promising candidate even for the home PC network. Also, the ATM is another serious contender because of the general consensus among the infra-structure constructors (telephone companies, CATV companies, etc.) to keep constructing the infra-structures based on this technology in view of the advantageous characteristics of the ATM such as its fast, real-time, and wide bandwidth properties.

In addition to these candidates, the network technology (bus technology) called IEEE 1394 has been attracting much attentions recently. This IEEE 1394 has several remarkable characteristics such as its fast, real-time (QOS guaranteed), and plug-and-play properties, so that there is a high expectation especially among the AV industries on the IEEE 1394 as the most promising candidate for a future scheme for inter-connecting digital AV devices. This vogue has also instigated much interests to the IEEE 1394 from the computer industries as well.

Now, the inter-mixing of various fields such as information processing, communication and broadcasting based on network formation is expected to be realized in a form of the inter-connection of the home use digital devices by these various network technologies in conjunction with the spread of the home use digital devices, depending on preferences and demands of the users, and in this way prototype digital networks will be gradually built up inside each home.

In the next phase, there will be demands for inter-connecting these digital networks together. For example, there will be a desire to inter-connect an AV device connected to the 1394 network of a guest room on the first floor with another AV device connected to the 1394 network of a private room on the second floor at the user's home in order to realize the dubbing or the cooperative operation between these AV devices.

However, the realization of the inter-connection among digital networks within a home or between homes is associated with the following problems (1) In the case of realizing the control of devices through networks within a home or between homes, there is no mechanism for ascertaining information such as "which device is located at which position on the network" or "what kind of service is being offered on the network". Without this mechanism, the user cannot recognize the existence of a particular device/service on the network and therefore cannot operate or control the target device or receive the offered service.

(2) It is expected that parts obeying different protocols will be co-existing in the case of the inter-connection among digital networks, but there is no mechanism for conveying operation commands and the like over different protocols.

For instance, when IEEE 1394 is used, other devices such as those applicable to Internet can co-exist with devices applicable to 1394, and their protocols may not necessarily coincide. Now, in the case of realizing a remote control in such a co-existing state, that is, controlling a target device through different types of networks, it is impossible to transmit operation commands because the IEEE 1394 protocol cannot be operated in the different types of networks.

It is possible to consider the realization of remote control by providing gateways, but there is no design guideline for gateways in such a case.

As described, conventionally, even when it is desired to inter-connect digital networks within a home or between homes and carry out control of devices through networks, there has been no technique to ascertain information regarding a position of each device that exists on the network or a service that is offered on the network so that the user cannot recognize the existence of a particular device/service on the network and therefore it has been impossible for the user to carry out the operation or control of the target device or receive the offered service. In addition, when parts obeying different protocols are co-existing in the inter-connected digital networks, there has been no technique for conveying operation commands and the like over the different protocols so that it has been impossible for the user to carry out the operation or control of the target device or receive the offered service over the different protocols.

SUMMARY OF THE INVENTION

It is therefore an object of the present invention to provide a communication control device capable of realizing a uniform service providing environment without relying on a particular network.

According to one aspect of the present invention, there is provided a communication control device connected with first and second networks, comprising: a collecting unit for collecting service information of service providing devices connected with the first network, according to a first protocol depending on the first network; and a notifying unit for notifying the service information to a device connected with a second network, according to a second protocol not depending on the first network.

In this aspect of the present invention, it becomes possible to notify the service information of the service providing devices connected to the first network, independently from a protocol of a datalink of the first network, to said device connected with the second network, regardless of a datalink type of the second network. Also, it becomes possible to urge the operations with respect to these service providing devices from the second network.

In this aspect of the present invention, the second protocol may be a network layer protocol, while the first protocol may be depending on a datalink of the first network.

Also, in this aspect of the present invention, the communication control device may further comprises: a receiving unit for receiving a second protocol packet for controlling at least one of the service providing devices connected with the first network, from said device connected with the second network; and a control unit for controlling said at least one of the service providing devices specified by the second protocol packet, according to the first protocol.

In this case, it becomes possible to control a node on the first network from a node on the second network by means of the protocol conversion by the control unit, even in a case where the first network and the second network adopt protocols of different link levels so that their connection terminals can only understand protocols depending on the respective networks, for example. Namely, it becomes possible to realize the control from an arbitrary device of the second network, regardless of a datalink type of the first network, even in a case where a control target node can only understand a protocol depending on the datalink type of the first network.

Similarly, in this aspect of the present invention, the notifying unit may also notify the service information to another device connected with the first network, and the communication control device may further comprises: a receiving unit for receiving a second protocol packet for controlling at least one of the service providing devices connected with the first network, from said another device; and a control unit for controlling said at least one of the service providing devices specified by the second protocol packet, according to the first protocol.

Also, in this aspect of the present invention, the notifying unit may notify the service information to a directory agent of the second network, so as to register a service provided by one service providing device into the directory agent on behalf of said one service providing device.

In this case, it becomes possible for the directory agent to register the services provided in the datalink layer protocol (such as the AV/C protocol of the IEEE 1394, etc., for example) with respect to the directory service in the protocol (the network layer protocol such as IP, etc., for example) by which it is operated. As a result, the directory agent or the directory service can search out the services provided on the network regardless of their providing network so that the convenience of network user and the flexibility can be improved simultaneously.

Also, in this aspect of the present invention, the notifying unit may notify the service information to a user agent of the second network, so as to notify the service information of one service providing device in response to a query from the user agent on behalf of said one service providing device.

In this case, it becomes possible for the user agent to obtain information regarding the services provided in the datalink layer protocol (such as the AV/C protocol of the IEEE 1394, etc., for example) with respect to the service location service in the protocol (the network layer protocol such as IP, etc., for example) by which it is operated. As a result, the user agent or the service location service can search out the services provided on the network regardless of their providing network so that the convenience of network user and the flexibility can be improved simultaneously.

Also, in this aspect of the present invention, the notifying unit may notify the service information by using a logical multiplex identifier defined by the communication control device and assigned to one service providing device as an access port for said one service providing device.

In this case, it becomes possible for the communication control device to recognize an access to the logical multiplex identifier as an access to the service provided by the service providing device, and carry out appropriate processing necessary for actually realizing that service. On the other hand, it becomes possible for the directory agent to use this logical multiplex identifier as an access point for the service of the service providing device in its response, so that it becomes possible to provide the uniform directory service regardless of the service providing network. Also, when this logical multiplex identifier is notified as the access point for the service of the service providing device, the user agent recognizes that this service is provided through this logical multiplex identifier regardless of the network, so that it becomes possible to provide the uniform service providing system by the network as a whole regardless of the network.

Also, in this aspect of the present invention, the communication control device may further comprises: a transfer unit for receiving a second protocol command in the second protocol which is destined to a port specified by the logical multiplex identifier assigned to said one service providing device, converting the second protocol command into a first protocol command in the first protocol, and transmitting the first protocol command to said one service providing device.

In this case, it becomes possible for the communication control device to recognize an access to the logical multiplex identifier as an access to the service provided by the service providing device, and send a command for service request to an entity which is actually providing that service after the command is converted into a form suitable for the protocol of the service providing datalink layer so that it becomes possible to realize the procedure of "service request→service realization" as a whole. Also, the user agent recognizes that the access to the service of the service providing device is to be carried out in the layer in which that command is described so that it implies that accesses to various services on that network become possible as long as the simplification of processing, that is, the preparation of the environment for the service access in that layer, is made in advance, and therefore it is possible to provide significant contributions to the simplicity, efficiency, and uniformity of the service providing environment of that network.

Also, in this aspect of the present invention, the transfer unit may have a correspondence table for mapping second protocol commands in the second protocol into first protocol commands in the first protocol.

In this case, it becomes possible for the communication control device to carry out the command conversion in the case of an access to the logical multiplex identifier in a predetermined procedure. Consequently, it becomes possible for the communication control device to recognize an access to the logical multiplex identifier as an access to the service provided by the service providing device, and send a command for service request to an entity which is actually providing that service after the command is converted into a form suitable for the protocol of the service providing datalink layer so that it becomes possible to realize the procedure of "service request→service realization" as a whole. Also, the user agent recognizes that the access to the service of the service providing device is to be carried out in the layer in which that command is described so that it implies that accesses to various services on that network become possible as long as the simplification of processing, that is, the preparation of the environment for the service access in that layer, is made in advance, and therefore it is possible to provide significant contributions to the simplicity, efficiency, and uniformity of the service providing environment of that network.

Also, in this aspect of the present invention, the notifying unit may notify the service information in a form of a home page for issuing a first protocol command in the first protocol for controlling a service provided by one service providing device, and the communication control device may further comprises: a receiving unit for receiving a message based on the home page from said device connected with the second network; and a control unit for controlling said one service providing device by the first protocol command issued according to said message received by the receiving unit.

In this case, it becomes possible for the user receiving and operating the home page to carry out the remote control even for the devices that interpret only the protocol depending on the link layer technique such as AV devices connected to the IEEE 1394, regardless of the protocol of the service providing device connected to the first network.

Also, in this aspect of the present invention, said message may contain a second protocol command in the second protocol which is depending on the second network for controlling the service provided by said one service providing device, and the control unit may convert the second protocol command contained in said message into the first protocol command by referring to a correspondence table of first protocol commands and second protocol commands.

In this case, when the specific second protocol command information (remote control command) is received through the receiving unit, what operation should be done to a desired device of the first network (the service providing device connected to the first network) can be ascertained by referring to the above described correspondence table.

Also, in this aspect of the present invention, said message may also contain an address depending on the second protocol and a multiplex identifier for identifying said one service providing device, and the control unit may also control said one service providing device as identified by said multiplex identifier in the first protocol command.

In this case, a node receiving the home page can specify the service providing device connected to the first network which is a control target as well as its desired operation by acting on an object referred through the hyperlink by using the second protocol command (remote control command), so that it becomes possible to carry out the remote control of the service providing device connected to a desired first network.

Also, in this aspect of the present invention, the home page may contain a program for generating a second protocol command in the second protocol for controlling the service provided by said one service providing device and said message may contain the second protocol command generated by said program.

In this case, a node receiving the home page can activate a program (e.g. JAVA program) set in correspondence to it so as to specify the service providing device connected to the first network which is a control target and issue a command for specifying its desired operation, so that it becomes possible to carry out the remote control of the service providing device connected to a desired first network.

Also, in this aspect of the present invention, the control unit may activate a program for issuing the first protocol command with respect to said message received by the receiving unit.

In this case, a node receiving the home page can activate a program (such as CGI script) set in correspondence to it so as to specify the service providing device connected to the first network which is a control target and issue a command for specifying its desired operation, so that it becomes possible to carry out the remote control of the service providing device connected to a desired first network.

Also, in this aspect of the present invention, the communication control device may further comprises: a home page creation unit for creating a home page for issuing a first protocol command in the first protocol for controlling a service provided by one service providing device according to the service information collected by the collecting unit, so that the notifying unit notifies the service information in a form of the home page created by the home page creation unit; a receiving unit for receiving a message based on the home page from said device connected with the second network; and a control unit for controlling said one service providing device by the first protocol command issued according to said message received by the receiving unit.

In this case, it becomes possible for the user receiving and operating the home page to carry out the remote control even for the devices that interpret only the protocol depending on the link layer technique such as AV devices connected to the IEEE 1394, regardless of the protocol of the service providing device connected to the first network.

Also, in this aspect of the present invention, the home page creation unit may have a table registering a second protocol command in the second protocol for controlling the service provided by said one service providing device that corresponds to the first protocol command which is prescribed for the service provided by said one service providing device, and the home page creation unit may create the home page by obtaining from said table an information regarding the second protocol command that corresponds to the service information collected by the collecting unit.

In this case, it becomes possible to display a list of remote control operations for the service providing device that can be realized by the second protocol command information (remote control commands). so that it becomes possible to create the home page that enumerates the operational remote control methods.

Also, in this aspect of the present invention, said message may contain a second protocol command in the second protocol for controlling the service provided by said one service providing device, and the control unit may convert the second protocol command contained in said message into the first protocol command by referring to a correspondence table of first protocol commands and second protocol commands.

In this case, when the specific second protocol command information (remote control command) is received through the receiving unit, what operation should be done to a desired device of the first network (the service providing device connected to the first network) can be ascertained by referring to the above described correspondence table.

Also, in this aspect of the present invention, said message also may contain an address depending on the second protocol and a multiplex identifier for identifying said one service providing device, and the control unit may control said one service providing device as identified by said multiplex identifier in the first protocol command.

In this case, a node receiving the home page can specify the service providing device connected to the first network which is a control target as well as its desired operation by acting on an object referred through the hyperlink by using the second protocol command (remote control command), so that it becomes possible to carry out the remote control of the service providing device connected to a desired first network.

Also, in this aspect of the present invention, the home page may contain a program for generating a second protocol command in the second protocol for controlling the service provided by said one service providing device and said message may contain the second protocol command generated by said program.

In this case, a node receiving the home page can activate a program (JAVA program) set in correspondence to it so as to specify the service providing device connected to the first network which is a control target and issue a command for specifying its desired operation, so that it becomes possible to carry out the remote control of the service providing device connected to a desired first network.

Also, in this aspect of the present invention, the control unit may activate a program for issuing the first protocol command with respect to said message received by the receiving unit.

In this case, a node receiving the home page can activate a program (such as CGI script) set in correspondence to it so as to specify the service providing device connected to the first network which is a control target and issue a command for specifying its desired operation, so that it becomes possible to carry out the remote control of the service providing device connected to a desired first network.

Also, in this aspect of the present invention, the communication control device may further comprises: a memory unit for assigning a second logical multiplex identifier to a service provided by one service providing device on the first network which is identified by a first logical multiplex identifier, and storing a correspondence between a set of a first address of said one service providing device and the first logical multiplex identifier and a set of a second address accessing from the second network and the second logical multiplex identifier, such that the notifying unit notifies the service information in order to present the service provided by said one service providing device as a service accessible from the second network at the second address and the second logical multiplex identifier; and a packet transfer unit for carrying out packet transfer between the first network and the second network in order to provide the service provided by said one service providing device to the second network according to the correspondence stored by the memory unit.

In this case, it becomes possible for the user on the second network to realize an access to the service provided on the first network even when the first protocol and the second protocol use different address systems, as in a case where the second protocol is operated by the IPv4 address system while the first protocol is operates by the IPv6 address system or by the private IP address system.

Namely, the services provided on the first network are presented to the second protocol as if they are provided by this communication control device, using the home page as a way of presentation to the user of the second network, for example. When there is an access to the service from the user of the second network, a packet used between the user of the second network and this communication control device is converted into a packet used between this communication control device and the service provided on the first network by using the correspondence (address and port number conversion table) stored in the memory unit, so that the user of the second network and the service provided on the first network recognize this communication control device as carrying out transparent packet exchanges.

Also, in this aspect of the present invention, the communication control device may further comprises: a unit for collecting first logical multiplex identifiers and first addresses of the service providing devices on the first network.

In this case, it becomes possible to automatically update the home page as a way of presentation, for example, according to the collected information regarding the service providing devices on the first network.

Also, in this aspect of the present invention, the communication control device may further comprises: a second memory unit for storing identifiers of packets transferrable to the first network; and an output unit for outputting those packets having identifiers which are stored by the second memory unit among packets entered from the second network.

In this case, it becomes possible to prevent improper packet intrusion into the first network from the external network such as the public network by carrying out the user authentication and the like in advance.

According to another aspect of the present invention, there is provided a communication device, comprising: an information memory unit for storing a configuration information which dynamically describes service information regarding services provided at said communication device; and a communication unit for carrying out a communication with a communication control device for recognizing the services of said communication device, by using the configuration information stored in the information memory unit.

In this aspect of the present invention, the other node communicating with this communication device can timely recognize applications serviced by this communication device at that point by making an access to the information memory unit, so that the directory service for network configuration and the detection of services of mobile nodes become possible and therefore the flexibility in the network operation can be improved. In particular, when the operating services change dynamically or the services are realized by software, the service operation state dynamically changes frequently due to the installment or the version upgrading of software, so that it is quite effective to change the service configuration information dynamically.

Also, in this aspect of the present invention, the configuration information may also describe attribute information regarding attributes of said communication device.

In this case, it becomes possible to notify both the service based configuration information and the device based configuration information to the other node communicating with this communication device, so that it is effective in simplifying the choice between the service specific configuration information or the device specific configuration information when the other node constructs the directory information of the network to which this communication device is connected. This is particularly effective in dealing with both users who are familiar with the service by service operation/search and users who are familiar with device by device operation/search.

Also, in this aspect of the present invention, said communication device may be connected to a network, through which the communication unit carries out the communication with the communication control device and at least one other network, and the configuration information may also describes at least a part of information regarding services provided at devices on said at least one other network.

In this case, the nodes other than said communication device which are connected to the first network can recognize the configuration information for the other network to which this communication device is connected. Consequently, it becomes possible to recognize the configuration information for all the inter-connected networks from the information memory unit through the communication unit of this communication device, so that it becomes possible to simply the mechanism and works required for the network management and the network service registration.

Other features and advantages of the present invention will become apparent from the following description taken in conjunction with the accompanying drawings.

BRIEF DESCRIPTION OF THE DRAWINGS

FIG. 4 is a diagram showing one example of a table for storing attribute information of information devices provided in an AV control terminal of the communication network of FIG. 1.

FIGS. 16A to 16D are diagrams showing an example of information to be registered into a directory agent in the network system of FIG. 7.

FIG. 19 is a diagram showing an example of information acquired from a directory agent in the network system of FIG. 7.

FIG. 33 is a diagram showing one exemplary home page text to be transmitted by the processing of FIG. 32 in the third embodiment of the present invention.

FIG. 36 is a diagram showing another exemplary home page text to be transmitted by the processing of FIG. 32 the third embodiment of the present invention.

FIG. 42 is a diagram showing one exemplary content of an RTSP command correspondence table used in the HTTP/RTSP processing function of FIG. 41.

FIG. 47 is a diagram showing an exemplary content of an address and port number correspondence table in the AV connection device of FIG. 44.

FIG. 51 is a diagram showing an exemplary home page presented to Internet side by the AV connection device of FIG. 44.

DETAILED DESCRIPTION OF THE PREFERRED EMBODIMENTS

First Embodiment

Referring now to FIG. 1 to FIG. 6, the first embodiment of the present invention will be described in detail.

Figure 1:
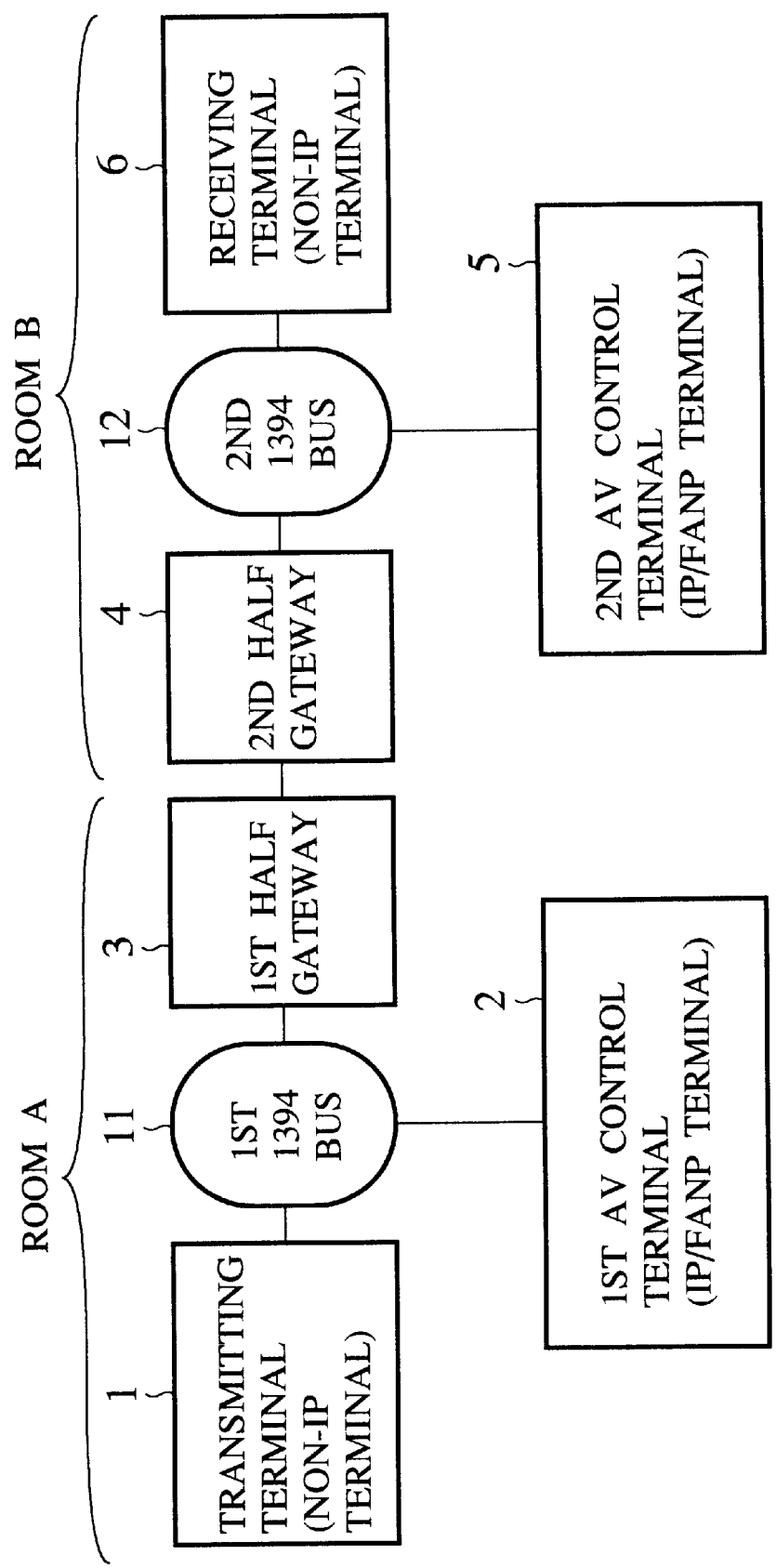
FIG. 1 is a block diagram showing an exemplary overall configuration of a communication network (home network) according to the first embodiment of the present invention.

FIG. 1 shows an exemplary overall configuration of a communication network system according to this first embodiment, which constitutes a home network within a home, for example.

As shown in FIG. 1, this home network comprises a transmitting terminal 1, a first AV (Audio Visual) control terminal 2, a first half gateway 3, a second half gateway 4, a second AV control terminal 5, a receiving terminal 6, a first 1394 bus 11, and a second 1394 bus 12. In this embodiment a transmission scheme between the half gateways 3 and 4 is assumed to be the ATM.

The transmitting terminal 1 and the receiving terminal 6 are non-IP terminals (also referred to as 1394 terminals hereafter), that is, terminals which can only understand the 1394 protocol (a protocol dedicated to 1394 such as AV/C protocol and IEC 61883, for example, and which cannot understand the Internet Protocol (IP). They may be the dedicated 1394 terminals.

This first embodiment is directed to a scheme of communication between terminals based on a control by the AV control terminal, in a case where these transmitting and receiving terminals are (or one of them is) the above described type that cannot understand the Internet protocol and a direct communication by the 1394 protocol cannot be carried out between them (such as a case where the 1394 buses are not bridge connected, that is, a case where a network other than the 1394 bus exists between them or a case where the public network such as the Internet or the ISDN exists between them).

Here, it is assumed that the two 1394 buses 11 and 12 are not directly bridge connected and the ATM network exists between them, so that, on a level of the 1394 protocol, a dedicated 1394 node connected to one 1394 bus cannot see another dedicated 1394 node connected to another 1394 bus.

In contrast, an IP terminal (also referred to as an IP node hereafter) based on the IP which is the inter-connection network protocol can recognize the other IP terminal connected to another bus even when they are terminals connected to these 1394 buses.

Assuming that the transmitting terminal 1 and the receiving terminal 6 are video terminals (as in a case where the transmitting terminal 1 is a DVD player and the receiving terminal 6 is a TV), for example, and that they are provided on the different 1394 buses, the problem is how to realize a communication between them.

Figure 2:
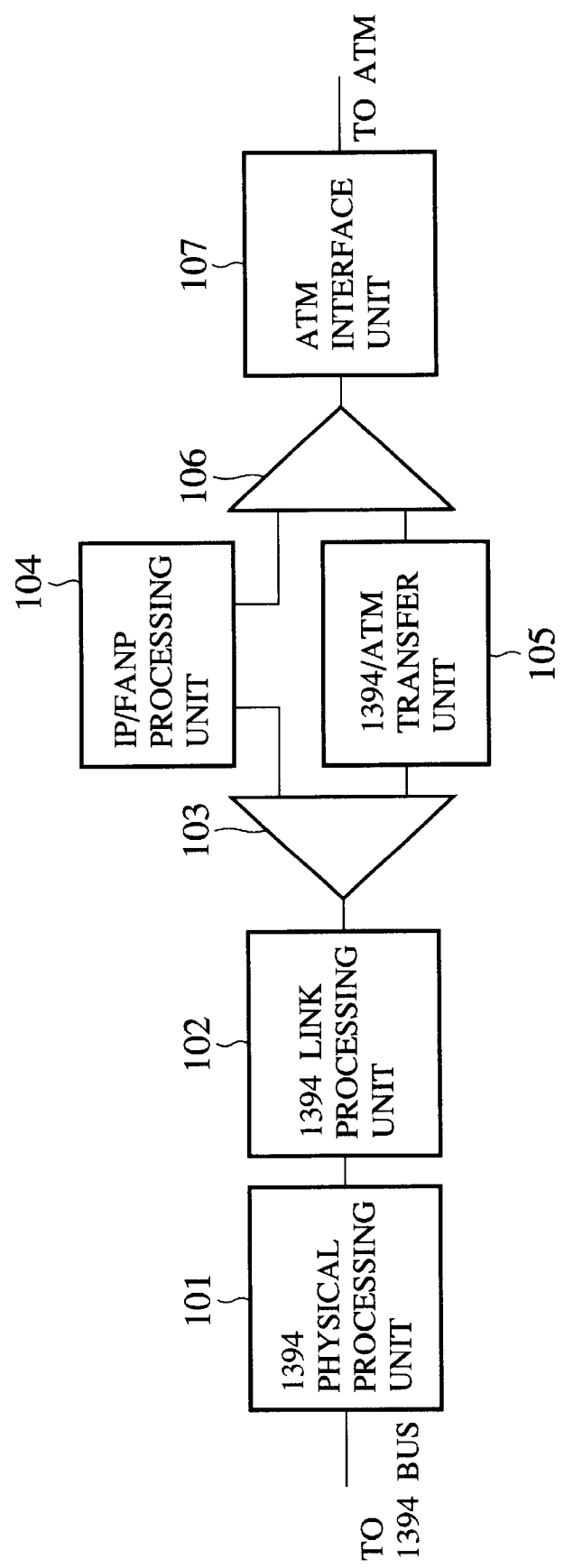
FIG. 2 is a block diagram showing an exemplary internal configuration of a half gateway in the communication network of FIG. 1.

FIG. 2 shows an exemplary internal configuration of each of the half gateways 2 and 3. As shown in FIG. 2, the half gateway comprises a 1394 physical processing unit 101, a 1394 link processing unit 102, a first MUX/DEMUX 103, an IP/FANP processing unit 104, a 1394/ATM transfer unit 105, a second MUX/DEMUX 106, and an ATM interface unit 107.

The 1394 physical processing unit 101 and the 1394 link processing unit 102 carry out the physical layer processing, the link layer processing, the bus management and the transaction layer processing for a connected 1394 bus, as well as the exchanges of data (PDU (Protocol Data Unit) from a viewpoint of the 1394) with the IP/FANP processing unit 104 or the 1394/ATM transfer unit 105, using the 1394 frames to be transmitted or received that are passing through the first MUX/DEMUX 103 and the second MUX/DEMUX 106.

The IP/FANP processing unit 104 has functions for carrying out the routing based on the IP address, the routing table management, the FANP (Flow Attribute Notification Protocol) processing, the ARP (Address Resolution Protocol) processing, etc., for the received IP packets, FANP packets (which will be described below), ARP packets, etc. (For details concerning the FANP, see Japanese Patent Application No. 8-264496 (1996).

The 1394/ATM transfer unit 105 has a function for transmitting data received from the 1394 side, especially data received through the isochronous channel, to the ATM side, and a function for transmitting data received from the ATM side to the 1394 side.

The ATM interface unit 107 is an interface with respect to the physically connected ATM network (the ATM cable in this embodiment), and carries out the cell assembling and disassembling of data to be exchanged with the second MUX/DEMUX 106 and the ATM cells. This ATM interface unit 107 may also carry out the ABR (Available Bit Rate) processing, the UPC (Usage Parameter Control) processing, SDH (Synchronous Digital Hierarchy) processing, etc.

Note here that, some VC is defined in advance as a default VC of the ATM between the half gateways 3 and 4, and the both half gateways 3 and 4 already recognize that the FANP messages will be exchanged through this default VC, as described in Japanese Patent Application No. 8-264496 (1996).

The first AV control terminal 2 and the second AV control terminal 5 are both IP nodes as well as FANP nodes and apparently capable of carrying out communications by the Internet protocol. As will be described below, these AV control terminals 2 and 5 can understand the 1394 protocol as well as the Internet protocol, and are capable of carrying out communications with local terminals on the 1394 bus by using the 1394 protocol as well as communications with local and remote IP terminals by using the Internet protocol.

On each of the AV control terminals 2 and 5, a "video transmission and reception control application" is implemented. This application has the following functions.

(1) A function for checking resources and services (such as nodes) on the own local bus, and communicating the obtained result with each other by using the Internet protocol.

(2) A function for indicating the resources and services of the terminals on the remote bus to the user according to the information obtained by (1), so as to urge the user to carry out operations on them, as well as exchanging these control information with each other.

(3) A function for exchanging FANP packets with each other and reserving a transmission path (a connection with the bandwidth, etc. reserved, if necessary) between the 1394 buses at which the AV control terminals are located.

(4) A function for carrying out the control of nodes on the local bus by using the 1394 protocol (such as AV/C protocol).

By using these AV control terminals, it becomes possible for the user to carry out the exchanges of data with terminals located on the remote 1394 bus, even when transmitting and receiving terminals are not the IP terminals.

The protocol for carrying out the control of AV devices on the 1394 regardless of whether they are local ones or remote ones as described above will be called a FANP-AV protocol here. This protocol may be an IP application.

For example, consider a case where the first 1394 bus 11 is provided at a room A within the home while the second 1394 bus 12 is provided at a room B within the home. Here, suppose that the user who is located in the room B tries to display video data from the transmitting terminal 1 located in the room A, on the receiving terminal 6 located in the room B.

Figure 3:
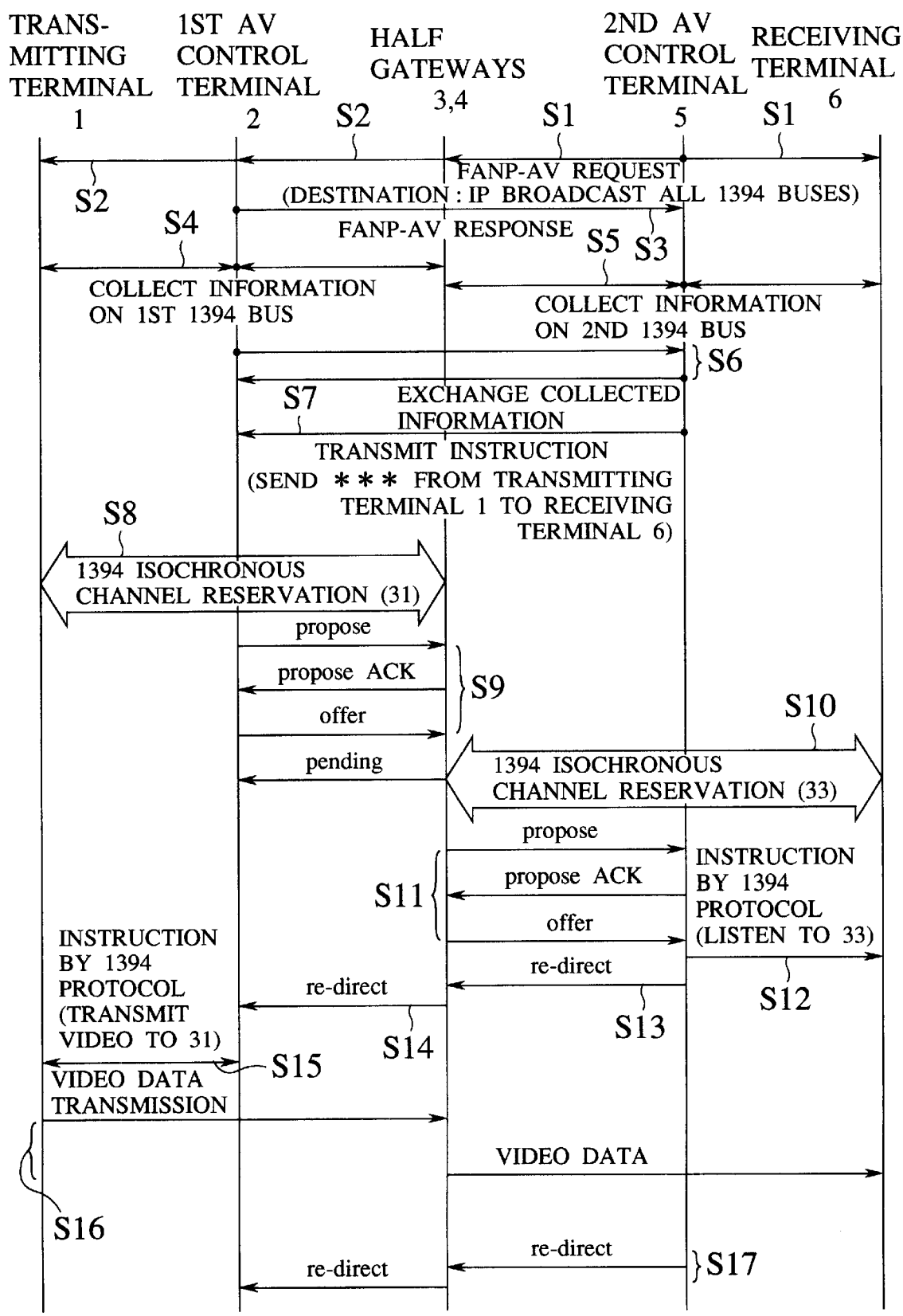
FIG. 3 is a sequence chart for an operation sequence in a case of transmitting video data from a transmitting terminal to a receiving terminal in the communication network of FIG. 1.

Now, with reference to the sequence chart of FIG. 3, the operation procedure (including the FANP-AV protocol) up to the video data exchange between the transmitting terminal 1 and the receiving terminal 6 which are the non-IP terminals will be described.

First, in the communication system of the present invention, the user activates the second AV control terminal 5 and carries out the necessary setting on this second AV control terminal 5. Namely, as shown in FIG. 3, the second AV control terminal 5 transmits a "FANP AV request" packet to the entire home network using the IP broadcast address, in order to check the presence/absence of a node for processing the FANP-AV protocol on the home network (step S1).

This packet is assigned with a well known port number which is allocated to the FANP-AV processing function in advance. This IP broadcast packet may be transmitted to a 1394 address called "bus broadcast address" on the second 1394 bus 12, that is, to the asynchronous channel in a form of broadcast with respect to all nodes in the home network of that home. This broadcast packet reaches to all nodes on the second 1394 bus 12. Note here that it is also possible to transmit this packet to a 1394 address called "local bus broadcast" as long as it is made such that this packet reaches to all nodes within that IP subnet. Namely, even when a network other than the 1394 bus is connected, it is sufficient if it is made such that this packet will be transferred.

Now, the second half gateway 4 that received this packet confirms that it is "IP broadcast" or "broadcast with respect to all buses" from the destination 1394 address, and forwards this packet to the first half gateway 3 side. The first half gateway 3 that received this packet then forwards this packet to the first 1394 bus 11 (step S2). At this point, the destination 1394 address is the "bus broadcast address".

Here, a node which by itself is activating the FANP-AV protocol receives this packet (FANP-AV request packet), and confirms that it is the "FANP-AV request", that is, a packet for searching a node that is activating the FANP-AV protocol, by referring to the port number. Then, this node transmits a "FANP-AV response" packet indicating that "it is also activating the FANP-AV protocol" as a response to the received packet, to its source IP address (step S3). In FIG. 3, the first AV control terminal 2 is the FANP-AV protocol node, so that this terminal transmits the FANP-AV response packet to the second AV control terminal 5 which is the source of the "FANP-AV request" packet. At the same time, the first AV control terminal 2 stores the existence of the second AV control terminal 5 and its IP address.

Note that, as already noted above, instead of carrying out such an automatic constituent recognition, it is also possible for the AV control terminals to recognize each other by using a method in which each AV control terminal registers addresses of the other AV control terminals by the manual setting in advance.

Around this point, each FANP-AV node (AV control terminal 2, 5) collects information on AV devices existing on the 1394 bus to which it is connected, by using the 1394 protocol (step S4 and step S5). This operation may be realized by using protocols such as the AV/C protocol reading configuration ROM, and the IEEE 1212 which are standardized by the 1394 trade association and the HD-DVTR conference, or their extended versions.

In this manner, each AV control terminal 2, 5 collects various information regarding AV devices on the 1394 bus to which it belongs, such as what AV devices they are, what contents they have, how many media they have, what 1394 addresses they have, etc., and store the collected information into an internal table.

Next, the AV control terminals 2 and 5 exchange the collected information with each other (step S6). For this information exchange, each one transmits the collected information to the IP address of the other by using IP packets. As a result, in each AV control terminal 2, 5, a table with contents as shown in FIG. 4 is produced, for example. Namely, by carrying out this information exchange between the AV control terminals 2 and 5, each AV control terminal 2, 5 can collect various information (attribute, information) regarding AV devices which are connected with a network to which the other AV control terminal belongs, such as what AV devices they are, what contents they have, how many media they have, what 1394 addresses they have, etc., in addition to the information regarding AV devices on the 1394 bus to which it belongs, on the table of FIG. 4.

Figure 5:
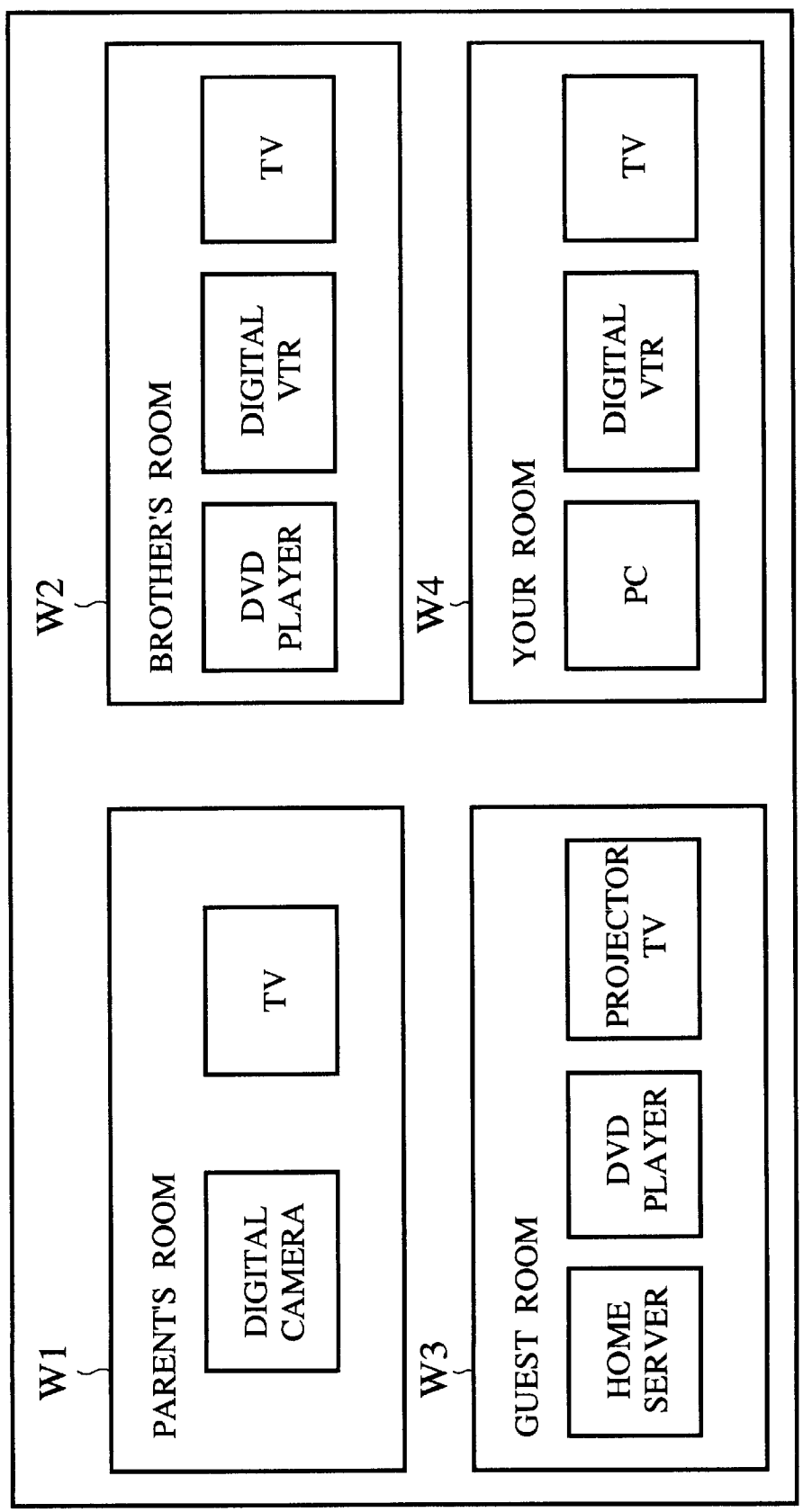
FIG. 5 is a diagram showing one example of a screen display by a display device that can be provided in an AV control terminal of the communication network of FIG. 1.

It is also possible to display the information on the table of FIG. 4 at a display screen of the AV control terminals 2 and 5. FIG. 5 shows an exemplary screen display by a display device provided at the second AV control terminal 5. In FIG. 5, for the sake of clarity, under the assumption of one bus per one room (or one datalink network per one room), display windows (W1 to W4) within the display screen are set in correspondence to the respective rooms, and the screen display is presented in a form of an arrangement in each room. By looking at this, the user can make a judgement such as "to/from which terminal data should be transmitted/received".

For example, suppose that the user in the room B wishes to receive video data from the transmitting terminal 1 and display it on the receiving terminal 6. To this end, the user operates the second AV control terminal 5 so as to make a setting by which appropriate contents constituting the video at the transmitting terminal 1 are transmitted to the receiving terminal 6 and displayed there. This operation may be carried out through the GUI on the second AV control terminal 5. In response, the second AV control terminal 5 transmits an instruction with a content of "send appropriate contents constituting the video at the transmitting terminal 1 to the receiving terminal 6" to the first AV control terminal 2 (step S7). By means of this, the first AV control terminal 2 can ascertain the address of the transmitting terminal 1 which is the transmission destination in a form of the 1394 address.

The first AV control terminal 2 that received this instruction communicates with the transmitting terminal 1 by the 1394 protocol, and checks whether the video transmission is possible or not. In addition, the operation such as the authentication with respect to the second AV control terminal 5 may also be carried out.

Next, the first AV control terminal 2 reserves the isochronous channel of the first 1394 bus 11 by using the 1394 protocol and the 1394 AV protocol, etc., at the first 1394 bus 11 (step S8). A channel number reserved at this point is assumed to be #X (the isochronous channel 31 of FIG. 6). Also, as should be apparent, the bandwidth necessary for the video transmission is to be reserved at the same time by acting on the isochronous resource manager of the first 1394 bus 11.

Next, the first AV control terminal 2 makes a setting with respect to the first half gateway 3 so that the isochronous channel #X will be received there. Then, the first AV control terminal 2 transmits the FANP message such as the offer message toward the first half gateway 3 through this isochronous channel (step S9).

Here, the FANP is the protocol described in Japanese Patent Application No. 8-264496 as already noted above. Namely, this protocol is used for the purpose of carrying out communications with a neighboring node that can interpret the FANP (which is usually provided at a middle of network segments that constitute the home network and plays a role of an inter-connection device for these plurality of segments), and notifying the identifier of the channel through which data are to be transmitted, their destination address, and their communication attribute and communication quality. It is also possible to use this protocol for the purpose of setting up an end-to-end connection. Using this FANP message, the channel is established through both 1394 buses similarly as in the steps S8 to S11.

The first half gateway 3 that received this offer message confirms that the second AV control terminal 5 exists in a direction of the second half gateway 4 by referring to the internal routing table, and checks whether it is possible to support the bandwidth, communication quality, etc. requested by this offer message by referring to the idle bandwidth, etc., of a communication path inside the second half gateway 4. When it is judged that it is possible to support them, the propose message, the propose ACK message, the offer message, etc., are transmitted to the second half gateway 4 similarly as in the above processing. On the other hand, when it is judged that it is not possible to support them, a reject message is transmitted to the first AV control terminal 2.

The second half gateway 4 checks the internal communication resources (checks whether the communication quality described in the offer message is internally possible or not similarly as in the first half gateway 3), and establishes the isochronous channel #Y (the isochronous channel 33 of FIG. 6) on the second 1394 bus 12. Around this point, the second half gateway 4 commands the second AV control terminal 5 to take the contents of this isochronous channel, by using the 1394 protocol. After that, the exchanges of the propose message, the propose ACK message and the offer message are carried out between the second half gateway 4 and the second AV control terminal 5 (step S11).

The second AV control terminal 5 that received the propose message and the offer message recognizes that they are for the video transmission earlier requested by this second Av control terminal 5 to the first AV control terminal 2, according to the flow ID or the prescribed identifier agreed by both sides in advance. This prescribed identifier can be that which is conveyed by the FANP message.

Next, the second AV control terminal 5 commands the receiving terminal 6 to receive the data transmitted through the isochronous channel #Y, by using the 1394 protocol such as IEC 61883 (step S12). By means of this, the data transmitted through the isochronous channel #Y can be received by the receiving terminal 6.

After that, the second AV control terminal 5 transmits the re-direct message to the second half gateway 4 (step S13). This re-direct message is a message that bears the meaning that the setting offered by the offer message of the step S11 is accepted.

The re-direct message returns from the second half gateway 4 to the first half gateway 3 (at which the setting of the 1394/ATM transfer unit 105 is made similarly as in the second half gateway 4), and then to the first AV control terminal 2 (step S14).

Figure 6:
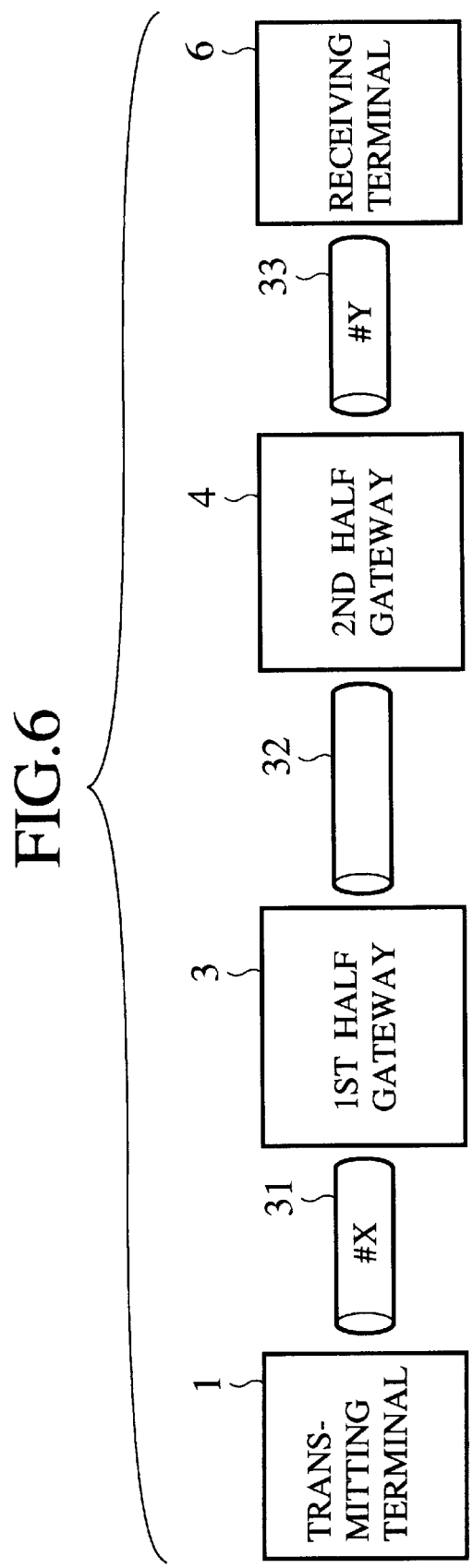
FIG. 6 is a diagram showing a communication route set up in the communication network of FIG. 1 according to the sequence of FIG. 3.

Here, the first AV control terminal 2 confirms that the datalink layer connection up to the final terminal as shown in FIG. 6 has been set up. Here, the final terminal is the receiving terminal 6 in this embodiment, but the receiving terminal 6 is the dedicated 1394 terminal and not a node that can understand the FANP and the IP. It is the second AV control terminal 5 that made the preparation such that the receiving terminal 6 can receive the video data, and the setting was made by this second AV control terminal 5 by using the 1394 protocol.

Then, the first AV control terminal 2 commands the transmitting terminal 1 to carry out the transmission of the corresponding appropriate video with respect to the isochronous channel with the channel number #X (the isochronous channel 31 of FIG. 6), by using the 1394 protocol (step S15).

The transmitted video reaches to the receiving terminal 6 through the isochronous channel 31 on the first 1394 bus 11, the ATM virtual connection 32, and the isochronous channel 33 on the second 1394 bus 12 (step S16). At the intermediate nodes (the half gateways 3 and 4), only the switching in the datalink layer is applied, so that the data transfer is carried out by maintaining the communication quality while the data pass through this route.

The transmission of the re-direct message for the purpose of connecting this video transmission is carried out from the second AV control terminal 5 toward the upstream side (that is, through the second half gateway 4 and the first half gateway 3, to the first AV control terminal 2) (step S17).

Also, a request for interruption of the transmission from the user side (the transmission of the release message) is also sent from the second AV control terminal 5 in the similarly order. At this point, the first AV control terminal 2 carries out the control by the 1394 protocol such as AV/C protocol toward the transmitting terminal 1 so as to terminate the video transmission.

As described, according to the communication network system of this embodiment, the control of AV devices over a plurality of 1394 buses such as the video delivery, interruption, etc., from the transmitting terminal 1 to the receiving terminal 6 is carried out by the FANP and the FANP-AV, despite of the fact that the transmitting terminal 1 and the receiving terminal 6 are not the IP terminals (that is, through the AV control terminals 2 and 5).

In general, the implementation of the IP is said to be costly, but by using the scheme of the present invention, the control between AV devices in which the IP is not implemented and the control of connection over a plurality of 1394 buses can be carried out by the AV control terminals 2 and 5 in which the IP and the FANP are implemented, so that a simplification, a low cost implementation, and a centralized control can be realized for the system as a whole. In addition, it should be apparent that the same can be realized by exactly the same principle even when a plurality of FANP nodes exist between the half gateways. Consequently, it becomes possible to carry out the control between AV terminals on arbitrary 1394 buses, without requiring a long distance 1394 bus transfer or a complicated 1394 bridge protocol which are the drawbacks of the 1394 buses.

Note that, in this embodiment, it is assumed that the AV control terminals 2 and 5 carry out communications with each other by using the IP, but it is also possible to realize this feature by using the other network layer technology (such as Netware, CLNP (Connection-Less Network Protocol), etc.) or the other technology (such as I-PNNI (Integrated P-NNI, 1394 protocol, etc.) instead of the IP.

Also, in this embodiment, the set up of the connection (channel) between the AV control terminals 2 and 5 is made by using the protocol called FANP, but it is easily possible to realize this feature by using the other connection set up protocol such as RSVP (Resource Reservation Setup Protocol), ST2 (Stream Transport Protocol-2), or I-PNNI, instead of the FANP.

Also, in this embodiment, it is assumed that the network to which the transmitting terminal 1 and the receiving terminal 6 are connected is the IEEE 1394 bus, but it is also possible to use FDDI2 or the broadcast based network such as home ATM-LAN and LON (Local Operating Network) as described in Japanese Patent Application No. 8-108015 (1996), in substantially the same manner as described above. Moreover, it is also possible to use a network which is not broadcast based, by modifying the AV control terminal to also carry out the connection set up between the half gateways and the transmitting/receiving terminals in a manner of the third party set up.

Also, in this embodiment, it is assumed that the AV control terminal 2, 5 and the half gateway 3, 4 are provided in separate bodies, but they may be provided within the same body. Namely, when the AV control terminal 2 and the half gateway 3 are provided in an identical body while the AV control terminal 5 and the half gateway 4 are provided in an identical body, it is possible to regard the half gateways 3 and 4 themselves as incorporating the functions of the AV control terminals 2 and 5.

Also, in this embodiment, a scheme in which the information regarding AV devices on local buses is exchanged between the AV control terminals 2 and 5 has been described, but when a number of AV control terminals increases, this information exchange may be carried out by using mesh connections among the AV control terminals. It is also possible to use a scheme in which one AV control terminal functioning as a server distributes the information to the other AV control terminals, or the hybrid of these schemes in which some AV control terminal aggregates the information for a plurality of AV control terminals and notifies the aggregated information to the other AV control terminals.

Also, in this embodiment, when the user is operating the AV control terminal, the resulting control process may be displayed on a display device provided at the receiving terminal 6.

Second Embodiment

Referring now to FIG. 7 to FIG. 26, the second embodiment of the present invention will be described in detail.

Figure 7:
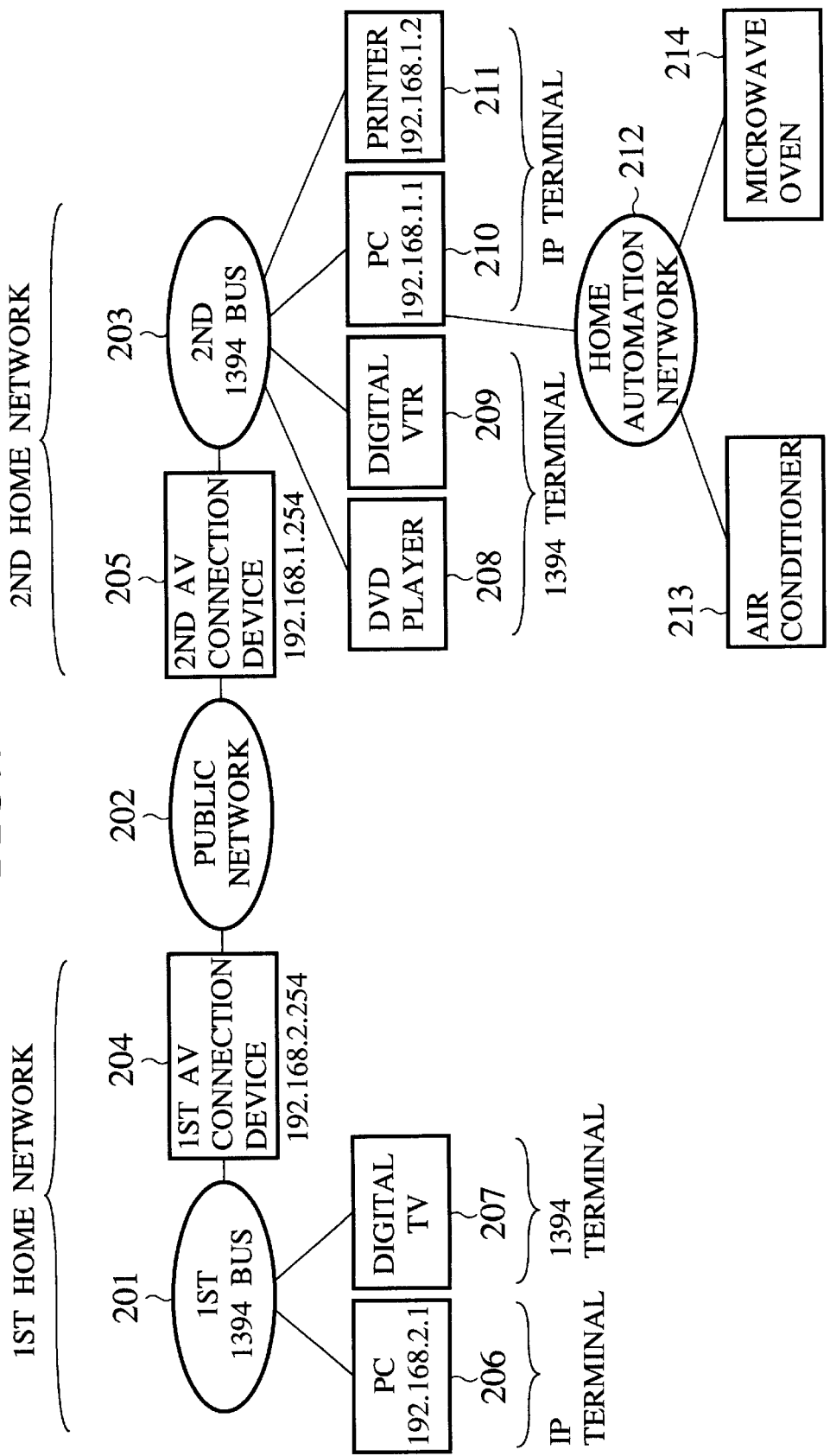
FIG. 7 is a block diagram showing an exemplary overall configuration of a network network according to the second embodiment of the present invention.

FIG. 7 shows a system configuration according to this second embodiment, in which two home networks are interconnected through a public network 202. The public network 202 can be a telephone network, a broadband network such as ISDN, a dedicated connection, or Internet, although preferably a network that can satisfy a communication bandwidth necessary for utilizing and providing services should be used.

The first home network comprises a first IEEE 1394 bus 201, to which a first AV connection device 204, a personal computer (PC) 206, and a digital TV 207 are connected.

The second home network comprises a second IEEE 1394 bus 203 and a home automation network 212. For the home automation network 212, LON (Local Operating Network) of the Echelon corporation is used in this embodiment. More information on LON of the Echelon corporation can be obtained from the following URL: http://www.echelon.com.

To the second IEEE 1394 bus 203 of the second home network, a second AV connection device 205, a DVD player 208, a digital VTR 209, a PC 210, and a printer 211 are connected, where the PC 210 is also connected to the home automation network 212. Apart from the PC 210, an air conditioner 213 and a microwave oven 214 are also connected to the home automation network 212.

Among these terminals connected to these networks, the first AV connection device 204, the PC 206, the second AV connection device 205, the PC 210, and the printer 211 are the so called IP terminals which have their own IP addresses (assumed to be private IP addresses here). Here, it is assumed that the first AV connection device 204 has the IP address "192.168.2.254", the PC 206 has the IP address "192.168.2.1", the second AV connection device 205 has the IP address "192.168.1.254", the PC 210 has the IP address "192.168.1.1", and the printer 211 has the IP address "192.168.1.2". The IP addresses of the terminals in this embodiment are either private IP addresses (when the public network 202 is ISDN and the like rather than Internet) or global IP addresses (when the public network 202 is Internet), and it is assumed that the routing mechanism setting (such as the IP routing table setting) for the purpose of routing among these terminals is already properly made. Note that the global IP address is currently given in 32 bits but is expected to be given in 128 bits in near future so that it is realistic to consider an environment which can assign a global IP address to each terminal.

On the other hand, the digital TV 207, the DVD player 208, and the digital VTR 209 are the so called 1394 terminals that can interpret only the 1394 protocol group (IEEE 1394-1995, IEC 61883, IEEE 1394 AV/C, SBP, etc.).

Also, the air conditioner 213 and the microwave oven 214 are the so called LON terminals that can interpret only the protocol group defined for LON.

Each one of the first AV connection device 204 and the second AV connection device 205 basically has a function for inter-connecting two or more networks (the IEEE 1394 bus and the public network in this embodiment). An internal configuration of each AV connection device 204 or 205 in this embodiment is shown in FIG. 8.

Figure 8:
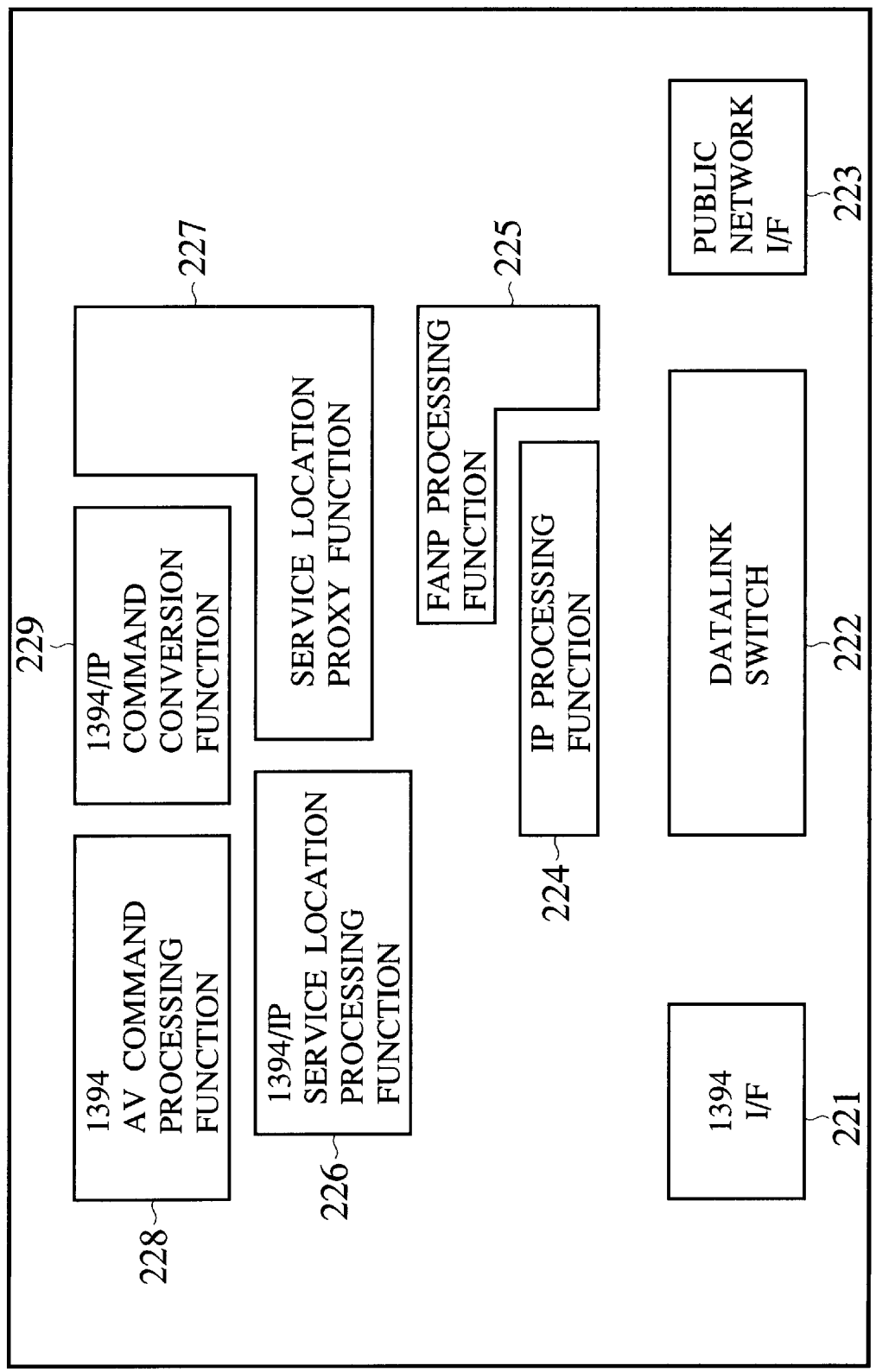
FIG. 8 is a block diagram showing an exemplary internal configuration of an AV connection device in the network system of FIG. 7.

As shown in FIG. 8, the AV connection device of this embodiment has a 1394 interface 221, a datalink switch 222, a public network interface 223, an IP processing function 224, a FANP processing function 225, a 1394/IP service location processing function 226, a service location proxy function 227, a 1394 AV command processing function 228, and a 1394/IP command conversion function 229. Each of these functions may be realized by either hardware or software.

The 1394 interface 221 is a function for interfacing with respect to the 1394 bus.

The datalink switch 222 is a switch for carrying out data transfer over networks. More specifically, the datalink switch 222 is a switch for transferring data entered from the 1394 bus to the public network and data entered from the public network to the 1394 bus, with the setting made by a protocol such as FANP so that a transfer target of data can be ascertained explicitly in advance by referring only to datalink layer identifier/information (such as isochronous channel identifier, ATM-VCI, transmission wavelength, etc., for example).

The public network interface 223 is a function for interfacing with respect to the public network. When the datalink layer of the public network is ATM, for example, the public network interface 223 will be provided physically with an ATM interface and logically with an ATM signaling function, etc.

The IP processing function 224 is a set of functions of a series of Internet protocols (TCP/IP protocol suit) such as TCP/UDP/IP.

The FANP processing function 225 is a function for reserving bandwidths and matching virtual transmission path identifiers on the datalink layer of a data transmission path. Further details of the FANP processing function can be found in Japanese Patent Application Nos. 8-264496 (1996), 8-272672 (1996) and 9-52125 (1997).

It is preferable to provide this FANP processing function 225 in the case of dealing with a service for which there is a need to guarantee a somewhat wide bandwidth such as video data service, but it may be omitted in the case which requires no bandwidth guarantee. Note that it is also possible to use a processing function according to the protocol called RSVP (Resource Reservation Protocol; Internet draft "draft-ietf-rsvp-spec-08.txt") instead of this FANP processing function.

It is also possible to control the use of the FANP processing function 225 and the like according to the service to be provided. For example, whether or not to use the FANP processing function 225 and the like may be determined for each set of IP address and port number. Else, the use of the FANP processing function 225 and the like may be determined upon receiving an explicit request from a user.

The 1394/IP service location processing function 226 is a function that searches out a terminal or a service connected to the 1394 bus or receives its registration, recognizes what terminal/service exists on the 1394 bus, and notifies this information to the external whenever the need arises such as when a notification is requested. The 1394/IP service location processing function 226 at least has a processing function of the service location protocol (Internet draft "draft-ietf-svrloc-protocol-16.txt").

The service location proxy function 227 activates the service location protocol in a form of IP based service location, with respect to the public network side. In addition, the service location proxy function 227 also has a function to set this AV connection device as a proxy server of services and terminals connected to the 1394 bus, that is, the non-IP based IEEE 1394 specific protocol terminals/services that can only recognize and process a series of 1394 protocols (the digital TV 207 of the first home network, the DVD player 208 and the digital VTR 209 of the second home network) so as to advertise such terminals/services, and a function to notify access requests for these advertised terminals/services to the 1394/IP command conversion function 229 as to as map these access requests to the IEEE 1394 commands or services, upon receiving these access requests from the public network side (IP side in general).

The 1394 AV command processing function 228 is a processing function of the IEEE 1394 terminal control protocol (1394 AV/C protocol, SBP, etc., for example).

The 1394/IP command conversion function 229 is a function for converting the control commands (such as RTSP (Real Time Stream Protocol); Internet draft "draft-ietf-mmusic-rtsp-02.ps", for example) that have arrived by being transmitted or that are to be transmitted by using IP and the IEEE 1394 terminal control commands (such as commands of 1394 AV/C protocol or SBP, for example) that are to be transmitted over the 1394 bus, into each other, and notifying the conversion result to the other side.

Next, a procedure for the second AV connection device 5 to acquire information regarding the second home network in the second home network, that is a procedure for the second AV connection device 5 to recognize terminals and services existing on the second home network, will be described.

Figure 9:
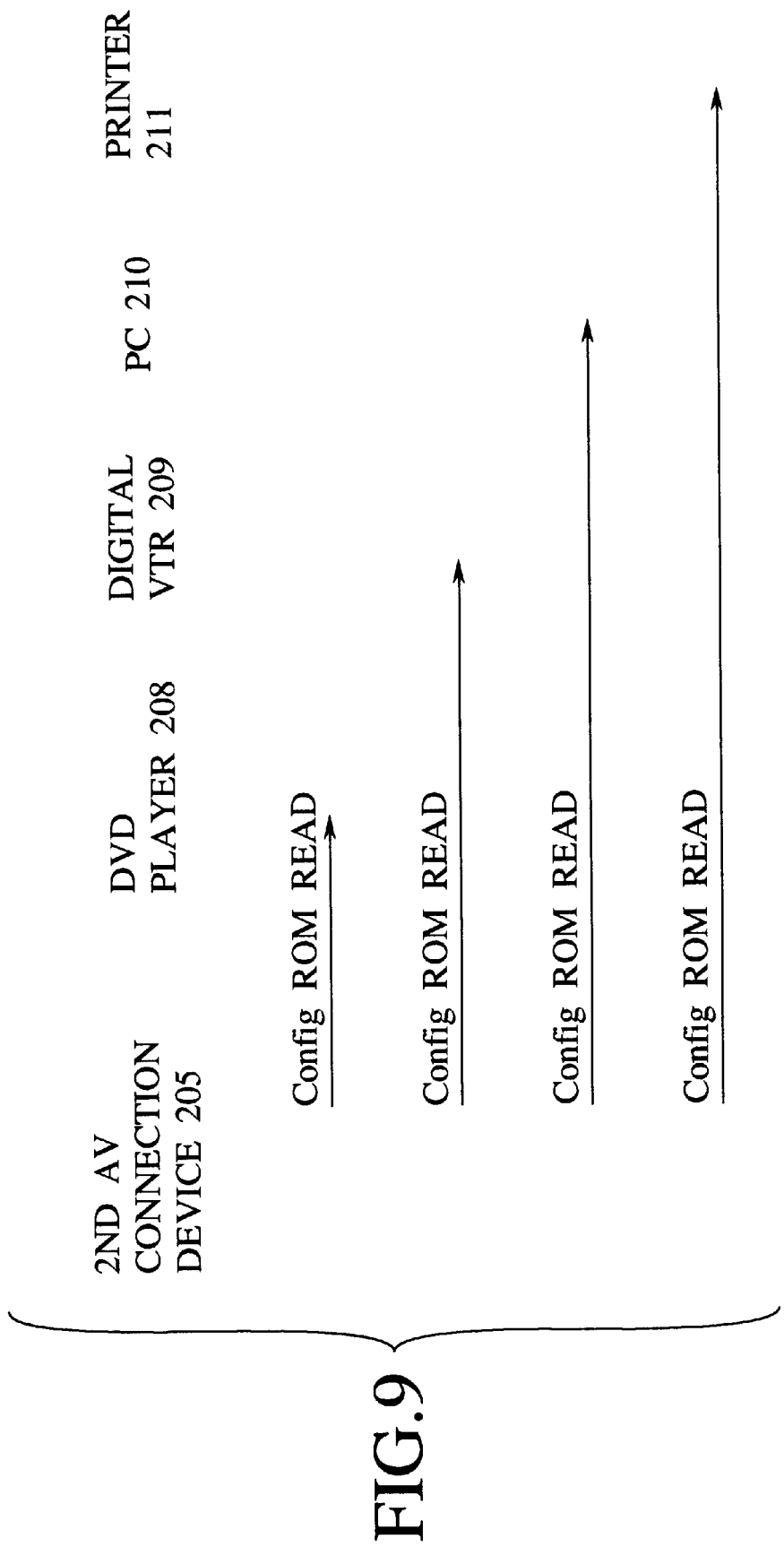
FIG. 9 is a diagram showing an exemplary sequence for collecting terminal/service information in the network system of FIG. 7.

FIG. 9 shows an exemplary sequence for a terminal/service collection procedure using a mechanism specific to the IEEE 1394. A terminal connected to the 1394 bus stores therein a configuration ROM in which a prescribed information on that terminal is written. In FIG. 9, the second AV connection device 5 collects information on the devices 208 to 211 connected to the 1394 bus 203 by reading out the configuration ROM of each of the devices 208 to 211. This information collection may be carried out for all the terminals connected to the 1394 bus 203.

In the following, some examples of the information to be described in the configuration ROM will be shown. Here, an exemplary case of the configuration ROM of the PC 210 will be described. Note that the term "ROM" is used in this embodiment in accordance with the IEEE 1394 specification, but it should actually be construed as meaning a "register" or a "part of memory space" that also encompasses non-ROM cases (cases of RAM, etc.).

Figure 10:
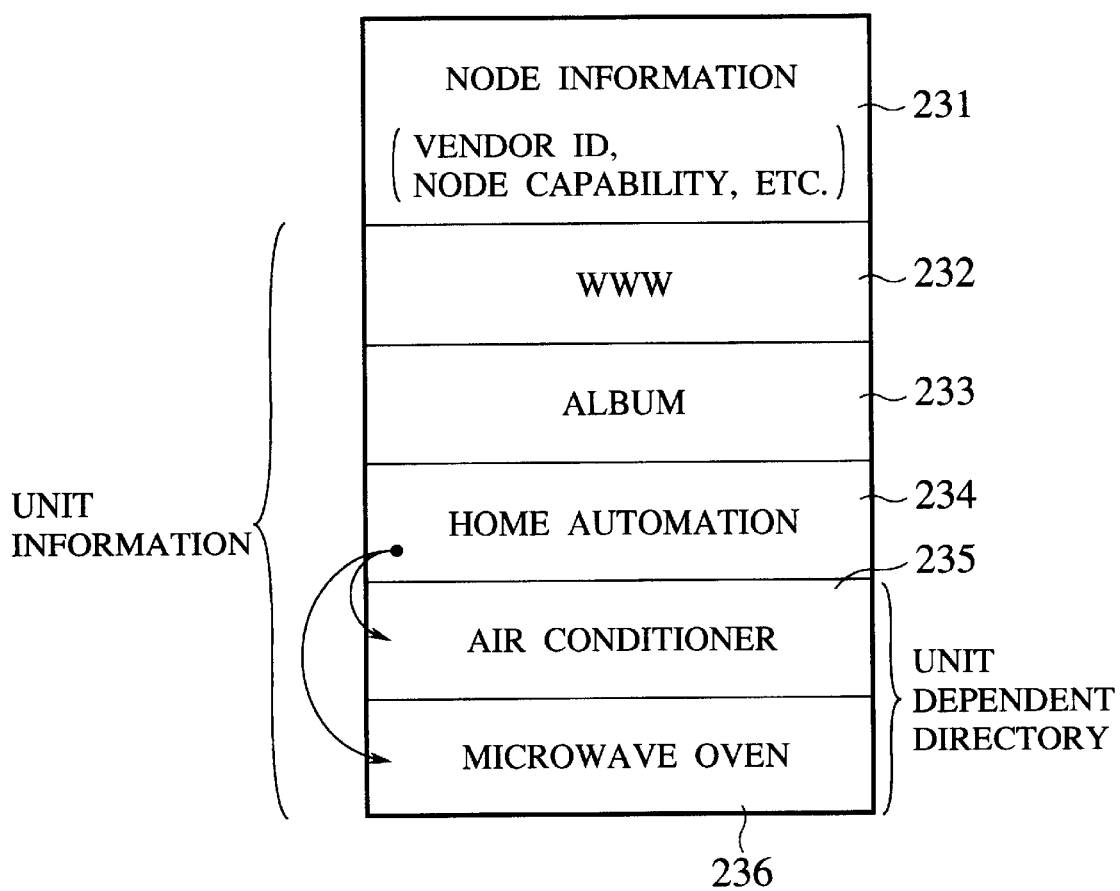
FIG. 10 is a diagram showing one example of a content described in the configuration ROM used in the network system of FIG. 7.

FIG. 10 shows the first example of the information to be described in the configuration ROM. In this first example, in the configuration ROM, apart from a node information 231 (such as vendor ID, node capability, etc., for example) that is the basic information about that terminal, services provided by that PC 210 are described as a unit information. Namely, this PC 210 has a WWW server function and a digital album server function, which are reflected in the content of the configuration ROM at sections 232 and 233. By describing the information in the configuration ROM in this manner, it becomes possible to explain what kind of terminal this terminal is and make what services are provided by this terminal known to the other terminals connected to the 1394 bus. This function is particularly useful in the case where a plurality of functions are realized in one terminal as in the case of PC. Concrete examples of the information to be described in the configuration ROM include a service type and attributes of that service (various parameters and the like to be used in order to receive that service such as maximum data transfer rate, device specification, setting parameters, etc., for example).

Now, the PC 210 is also connected to the home automation network 212 so that it also functions as a home automation server. Namely, in the configuration of this embodiment, this PC 210 carries out controls of various devices (the air conditioner 213 and the microwave oven 214) connected to the home automation network 212. In other words, this implies that a terminal connected to the second 1394 bus 203 can control various devices connected to the home automation network 212 by making access to this PC 210. In order to make this fact known to the terminals on the second 1394 bus 203, information (service information) about the home automation network 212 is also stored in the configuration ROM of the PC 210.

First, an information indicating that the home automation service is provided is stored in the configuration ROM at a section 234. Then, as directories dependent on that unit, an information indicating that the air conditioner service is provided and an information indicating that the microwave oven service is provided are described in the configuration ROM at sections 235 and 236, respectively. In this manner, the other terminals connected to the 1394 bus can ascertain what services are provided in what manner even for those services connected to a network other than the 1394 bus, so that a considerable improvement in recognizability and operational convenience of services can be expected.

Figure 11:
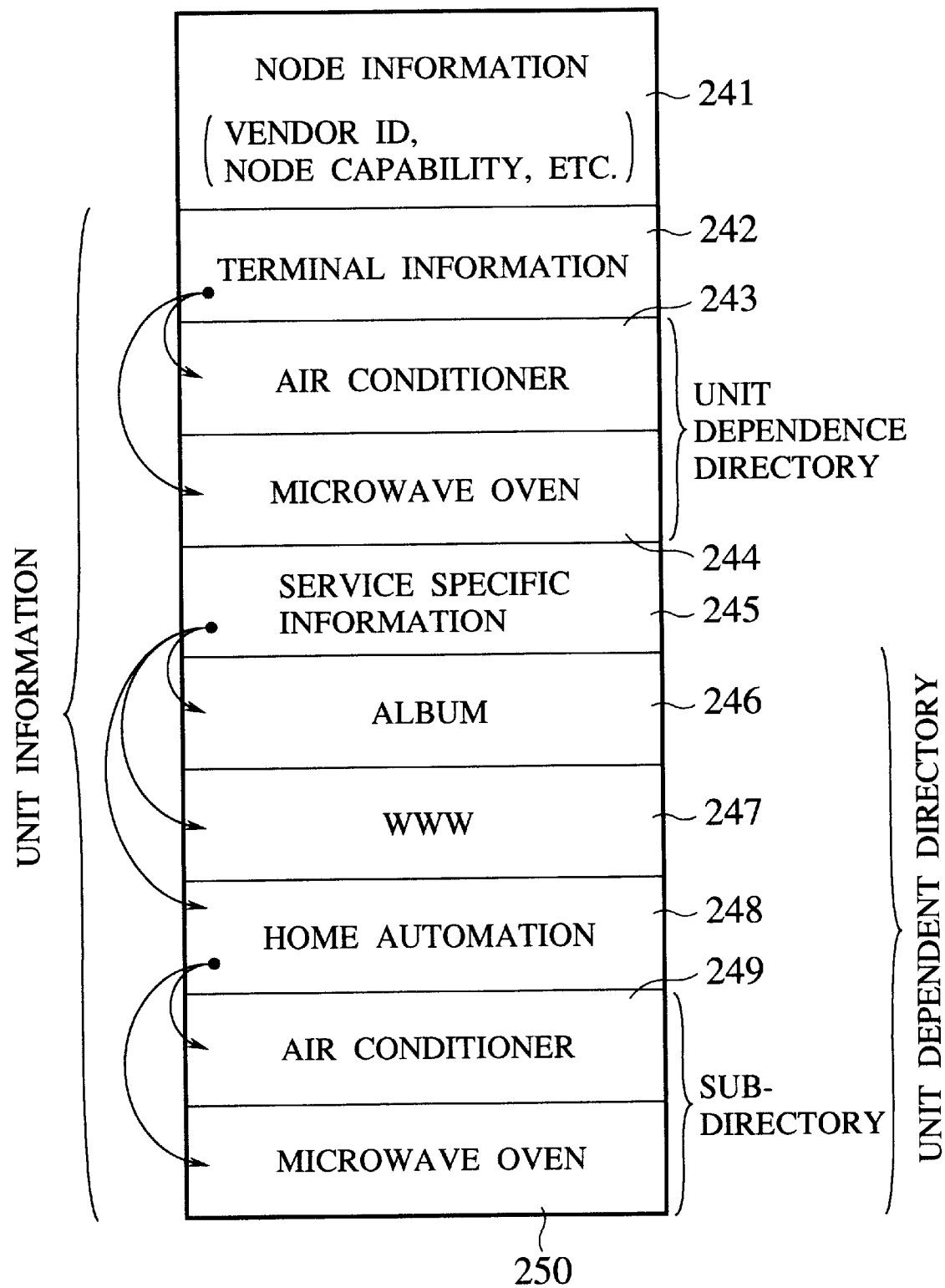
FIG. 11 is a diagram showing another example of a content described in the configuration ROM used in the network system of FIG. 7.

Next, FIG. 11 shows the second example of the information to be described in the configuration ROM. In contrast to the first example in which the information about the services provided by the terminal is described as the unit information for that terminal in the configuration ROM, this second example uses the description of terminal specific information at sections 242 to 244 in addition to the description of service specific information similar to those of the first example at sections 245 to 250. These terminal specific information and service specific information are stored as the unit information, and each of them can be stored as a unit dependent directory. Moreover, sections 242 and 245 for indicating either the terminal specific information or the service specific information for the purpose of distinguishing the terminal specific information and the service specific information may be included.

Here, the information about terminals (the air conditioner 213 and the microwave oven 214) connected to the PC 210 via the home automation network 212 is stored as the terminal specific information at sections 243 and 244 respectively. By referring to this information, it becomes possible for the other 1394 nodes to obtain not only the information on nodes connected to the 1394 bus but also the information on the other nodes (the air conditioner 213 and the microwave oven 214 in this embodiment) connected with the node that is connected to the 1394 bus, both at the 1394 level, so that this is quite effective for integrated management and control of the home network.

In addition, similarly as in the first example, when this PC 210 has the WWW server function, the digital album server function and so on, these are reflected in the configuration ROM at sections 245 to 250. The specific rules for their description is basically the same as in the first example.

Figure 12:
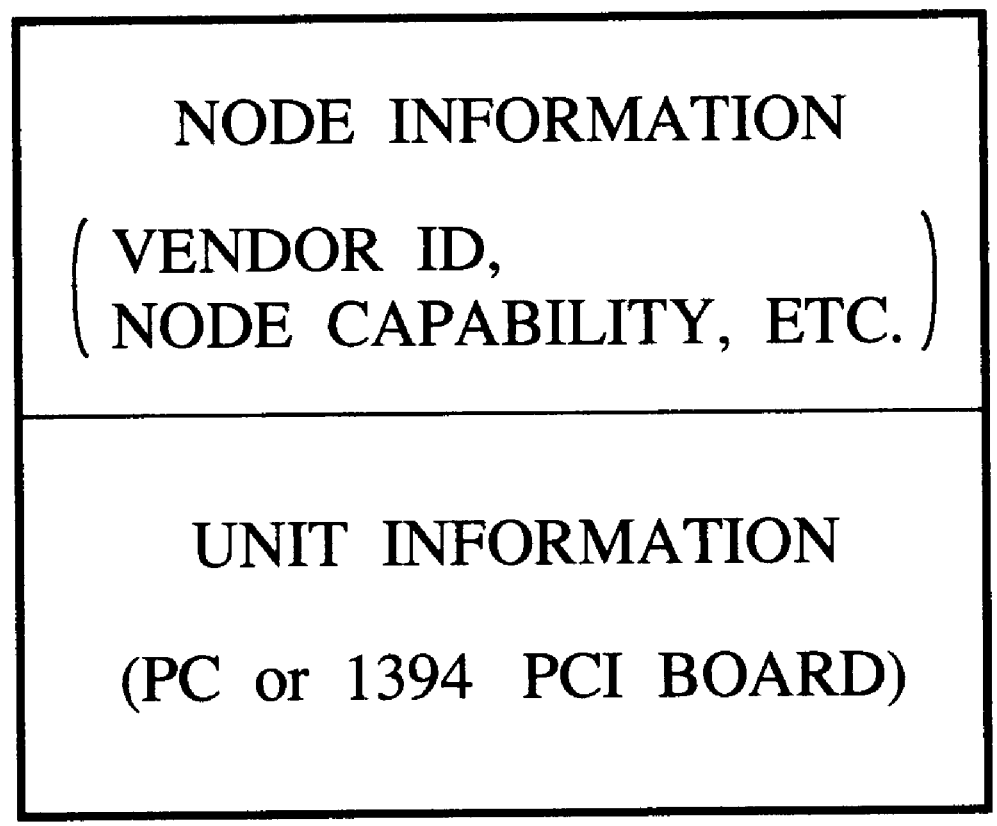
FIG. 12 is a diagram showing still another example of a content described in the configuration ROM used in the network system of FIG. 7.

Next, FIG. 12 shows the third example of the information to be described in the configuration ROM. This example is directed to the case of storing only the information about the PC 210 itself. In this case, unlike the first and second examples, only the information of the PC 210 as a node, i.e., the information of the PC 210 as a device, is to be described without any service based description, so that the unit information describes the fact that the PC 210 itself is a PC or PC board (such as 1394 PCI board).

Now, by displaying the information on terminals/services on the second home network collected by the second AV connection device 205 as described above on a console of that second AV connection device 205, for example, it is possible to urge the user to operate on them. A display scheme for this purpose can be either a service specific display scheme or a terminal based display scheme.

Figure 13:
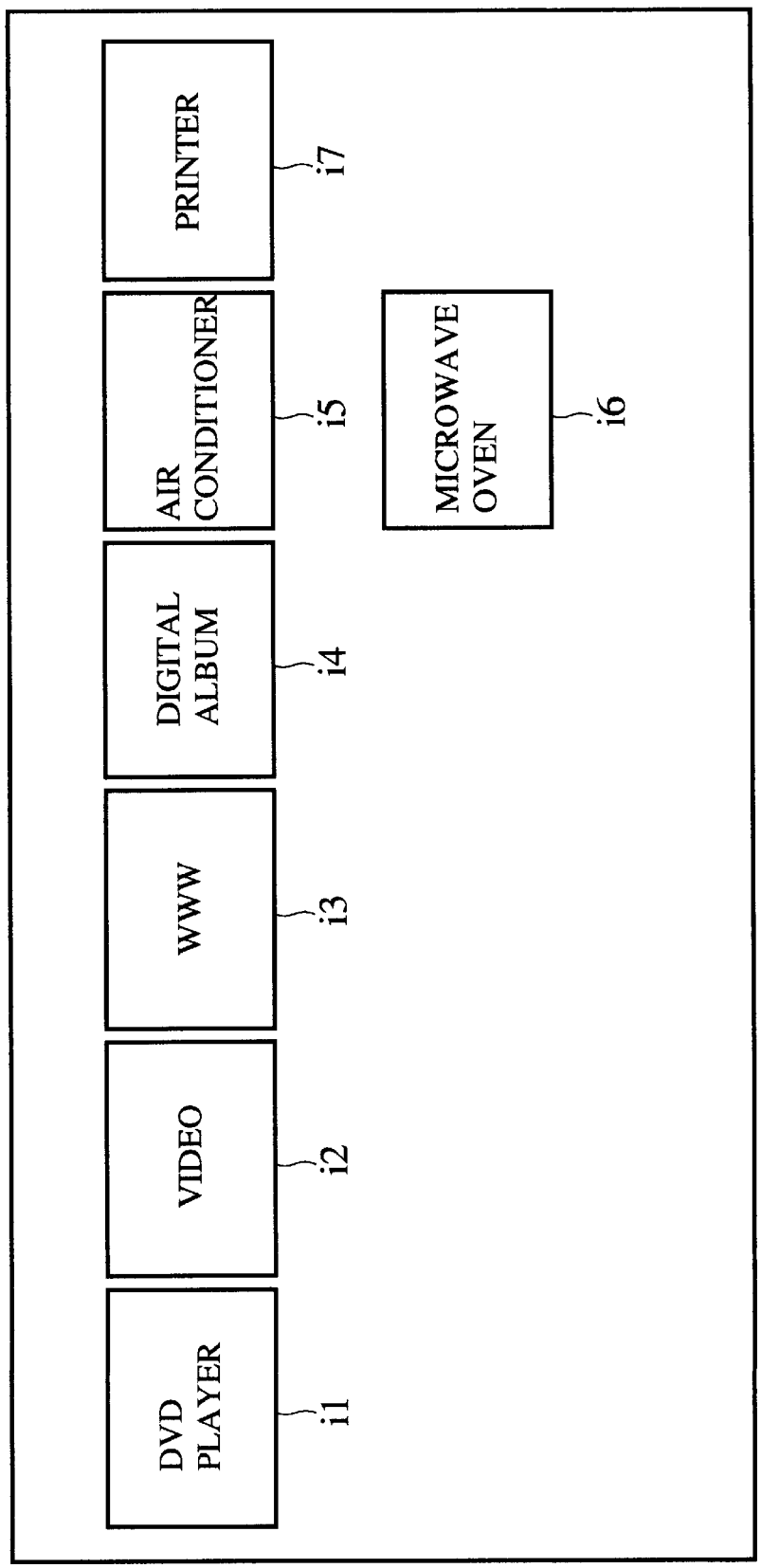
FIG. 13 is a diagram showing an exemplary screen display in the case of service specific display in the network system of FIG. 7.

FIG. 13 shows an exemplary screen display in the case of service specific display. As shown in FIG. 13, one icon (i1 to i7) is provided for each service provided on the second home network, and the user can make an access to a desired service by specifying that service using a prescribed user interface (by executing click or drag-and-drop on a mouse device, for example).

Here, the screen display of service specific icons shown in FIG. 13 displays both services connected to the second IEEE 1394 bus 203 and services connected to the home automation network 212 without distinguishing different network types. This way of screen display is considered preferable because it is expected that general users are not interested in a physical network to which a particular service is connected. In this screen display, it is possible to prevent any confusion that would be caused when the user is made aware of physical networks.

Note that it is not necessarily required to display the information as described in the configuration ROM exactly on the screen, and another corresponding information may be displayed instead. For example, it is generally expected that the information described in the configuration ROM is often codes intended for specialists in the terminology unfamiliar to general users. As a concrete example, even when a code indicating "digital VCR (Video Cassette Recoder)" is described in the configuration ROM, this terminology may be unfamiliar to general users. In such a case, it is possible to display a term like "video" or "video deck" which is more familiar to general users instead of displaying "digital VCR".

Figure 14:
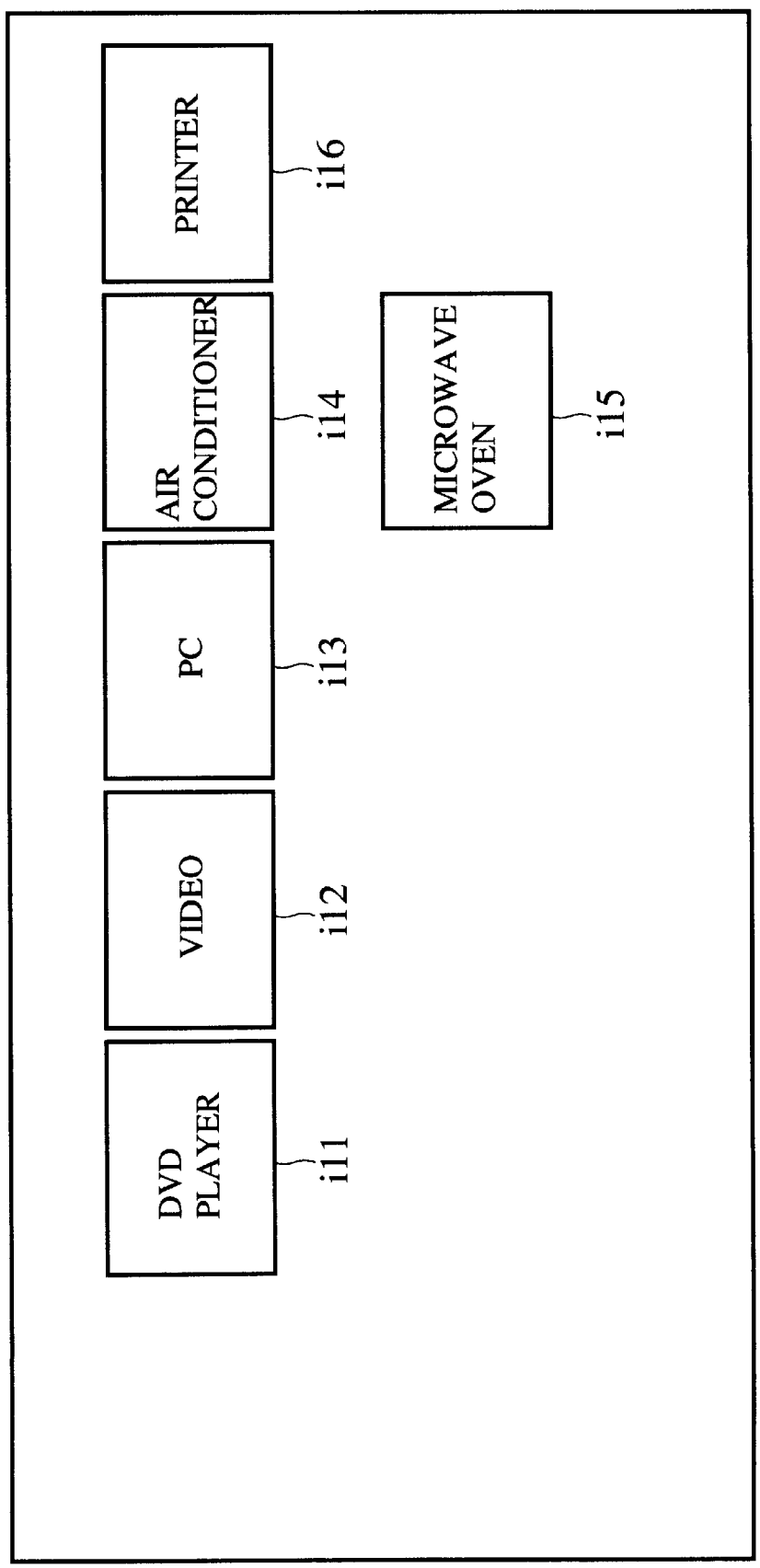
FIG. 14 is a diagram showing an exemplary screen display in the case of device specific display in the network system of FIG. 7.

Next, FIG. 14 shows an exemplary screen display in the case of terminal specific display. Similarly as in the case of service specific display, one icon (i11 to i15) is provided for each terminal provided on the second home network, and the user can make an access to a desired service by specifying that service using a prescribed user interface (by executing click or drag-and-drop on a mouse device, for example). Here, the screen display of terminal specific icons.shown in FIG. 14 also displays both services connected to the second IEEE 1394 bus 203 and services connected to the home automation network 212 without distinguishing different network types.

In the above, a method for recognizing terminals or services by reading the configuration ROM on the 1394 bus has been described.

Next, the registration of service using the service location protocol will be described.

The IETF, the standardization organization of Internet, is currently discussing a service registration and search scheme using the service location protocol. According to this discussion, for IP terminals, services are classified in advance and it is made possible to register and search services by the following two methods.

(1) A location information of a server that provides a service is registered into a directory agent (also referred to as a directory server in this embodiment) for each classified service. It is possible for the user to ascertain the location of the service by inquiring to this directory agent.

(2) An IP multicast address is provided for each classified service. The user requesting a particular service sends a message meaning "where is that particular service?" to this IP multicast address. The server that provides that particular service then responds to this message, so that it.is possible for the user to ascertain the location of the server that provides that particular service.

In this embodiment the second AV connection device 205 in FIG. 7 plays the role of the directory agent of the service location protocol in (1) described above.

The IP terminals (the PC 210 and the printer 211 in FIG. 7) on the second home network register the services they provide into the second AV connection device 205 which is the directory agent. First, each IP terminal checks a location on the network at which the directory agent exists, and carries out a procedure for registering service information. This procedure will now be described with reference to FIG. 15 for an exemplary case where the PC 210 registers services.

The PC 210 sends a service request message to the second IEEE 1394 bus 203. Here, the service request message is a message meaning "a server that provides this service please reply", and more specifically in this embodiment, a message meaning "a server that provides the directory service please reply" is sent.

The service request message is provided with a "predicate" region for identifying a service type of interest, and the message with "directory server" described in this region and a directory agent (DA) discovery multicast address (IP address) as its destination is sent.

In this embodiment, the second IEEE 1394 bus 203 is the only network to which IP packets reach in the second home network so that the service request message sent from the PC 210 reaches to the second AV connection device 205 which is the directory agent and the printer 211.

Upon receiving the service request message, the second AV connection device 205 which is the directory agent returns "directory agent (DA) advertisement" to the PC 210 in order to notify that it is the directory agent. Note that the printer 211 is not the directory agent itself so that it ignores the service request message (normally as the link layer does not receive this message).

Then, upon receiving the directory agent (DA) advertisement, the PC 210 recognizes that the directory agent exists at the second AV connection device 205.

Next, the PC 210 carries out a registration of the service provided by itself into the directory agent. In this embodiment, the PC 210 provides the WWW service (the http server to be specific) and the digital album service by itself, and in addition the PC 210 can receive service requests from the external for the services of the air conditioner 213 and the microwave oven 214 connected to the home automation network 212 as their proxy server.

At a time of registration, the PC 210 registers a location information, an attribute information, etc., for each of the WWW service and the digital album service provided by itself, as well as a location information, an attribute information, etc., for each of the services on the home automation network (LON) 212 on behalf of the air conditioner 213 and the microwave oven 214.

FIGS. 16A and 16B show exemplary registered information contents for the WWW service and the digital album service, respectively. As the location information for the WWW service and the digital album service, a URL containing the IP address of the PC 210 and a port number assigned to each service is used here.

Also, FIGS. 16C and 16D show exemplary registered information contents for the air conditioner service and the microwave oven service for which the PC 210 is the proxy, respectively. In this case, a port number of the PC 210 is assigned to each service for which the PC 210 is the proxy. In the example shown in FIGS. 16C and 16D, the air conditioner. service on LON is assigned with a port number "15000" while the microwave oven service on LON is assigned with a port number "15001". As a result of this registration, an external terminal interprets that the air conditioner service and the microwave oven service are existing on the PC 210, and that these services are provided as IP level services.

When it is desired to make an access to the air conditioner service on the home automation network 212, the external terminal makes an access to the port number "15000" of the PC 210, whereas when it is desired to make an access to the microwave oven service, the external terminal makes an access to the port number "15001" of the PC 210. On the other hand, when there is an access to the port number "15000", the PC 210 interprets that as a service request directed to the air conditioner, whereas when there is an access to the port number "15001", the PC 210 interprets that as a service request directed to the microwave oven. Then, the PC 210 translates the received IP control command into a LON control command and sends this toward the actual device (the air conditioner 213 or the microwave oven 214) on the home automation network 212. This operation will be described below for an exemplary case of an access to the air conditioner service.

In this manner, the WWW service, the digital album service, the air conditioner service on LON, and the microwave oven service on LON are registered into the second AV connection device 205 as a result of the service registration. When the service registration succeeds, the second AV connection device 205 which is the directory agent returns the service acknowledgement (ACK) towards the PC 210.

Note that the registration of the printer service is similarly made by the printer 211 with respect to the second AV connection device 205.

As a result of this registration procedure of the service location protocol, the services of WWW, digital album, air conditioner, microwave oven, and printer are registered in the second AV connection device 205.

Now, it is possible to construct a service information on the second home network by combining the information obtained by this registration procedure with the information obtained by reading the configuration ROM on the IEEE 1394 described above.

There are many possible ways of constructing such a service information, and this embodiment adopts an exemplary way in which: (i) the services registered by the service location protocol will be displayed with higher priority, while (ii) the service information is constructed according to the configuration ROM information, for the other services, that is, those of nodes that cannot be recognized by the service location protocol but are recognized by the reading of the configuration ROM on the IEEE 1394, and the information of both (i) and (ii) is to be presented to the user and the external as "service directory information on the second home network".

Figure 17:
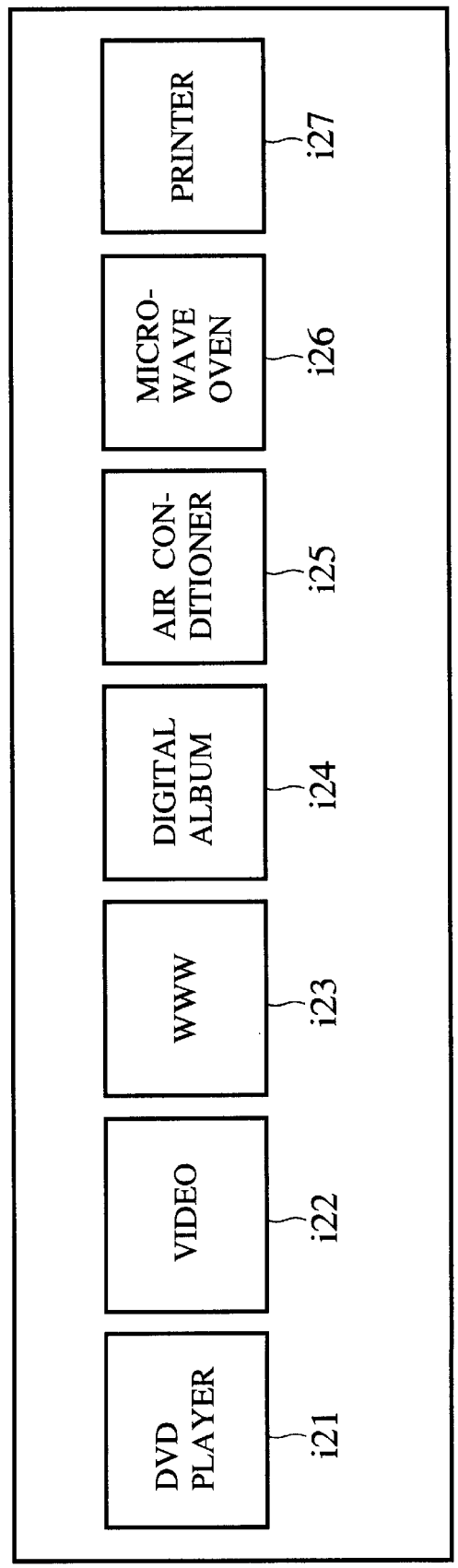
FIG. 17 is a diagram showing another exemplary screen display in the case of service specific display in the network system of FIG. 7.

More specifically, all the services including the WWW service, the digital album service, the air conditioner service, the microwave oven service and the printer service that are recognized by the registration procedure of the service location protocol, and the DVD player service and the video service that are recognized by the reading of the configuration ROM on the IEEE 1394 will be recognized here. Then, as shown in FIG. 17, one icon (i21 to i27) is displayed for each service provided on the second home network, on a console of the second AV connection device 205, for example. Also, similarly as described above, the user can make an access to a desired service by specifying that service using a prescribed user interface (by executing click or drag-and-drop on a mouse device, for example).

Now, the user agent which is the user terminal that receives the service can acquire the information regarding the services on the IEEE 1394 bus to which it is connected by inquiring to the directory agent, but it is also possible to acquire the information regarding the services receiving a notification from each device at the user agent using a procedure similar to the procedure for registration of the information regarding the services into the directory agent as described above instead.

Next, the case where a user of the first home network (i.e., a user of a terminal connected to the 1394 bus 201) executes a remote control of a terminal within the second home network (i.e., a terminal connected to the 1394 bus 203 or the home automation network 212) through the public network 202 to realize a desired operation will be described.

As shown in FIG. 7, the first home network and the second home network are inter-connected through the public network 202. As described above, the public network 202 can be a telephone network, a broadband network such as ISDN, a dedicated connection, or Internet. Also, the IP addresses of the terminals in this embodiment are assumed to be either private IP addresses (when the public network 202 is ISDN and the like rather than Internet) or global IP addresses (when the public network 202 is Internet).

Here, the first AV connection device 204 is the directory agent of the first home network, which is assumed to have recognized the services within the network by the procedure similar to that described above for the second AV connection device 205. More specifically, the PC 206 and the digital TV 207 are recognized as terminals and some services provided by the PC 206 and the digital TV service are recognized as services.

In the initial phase, the first AV connection device 204 attempts to collect the service information (directory information) of the second home.network in order to present the services within the second home network to the user of the first home network. At this point, the first home network and the second home network are assumed to carry out communications by the Internet protocol. Note however that the scheme of this embodiment is equally applicable to the case of using the other protocol such as IPX, NetBEUI, native IEEE 1394, etc.

Figure 18:
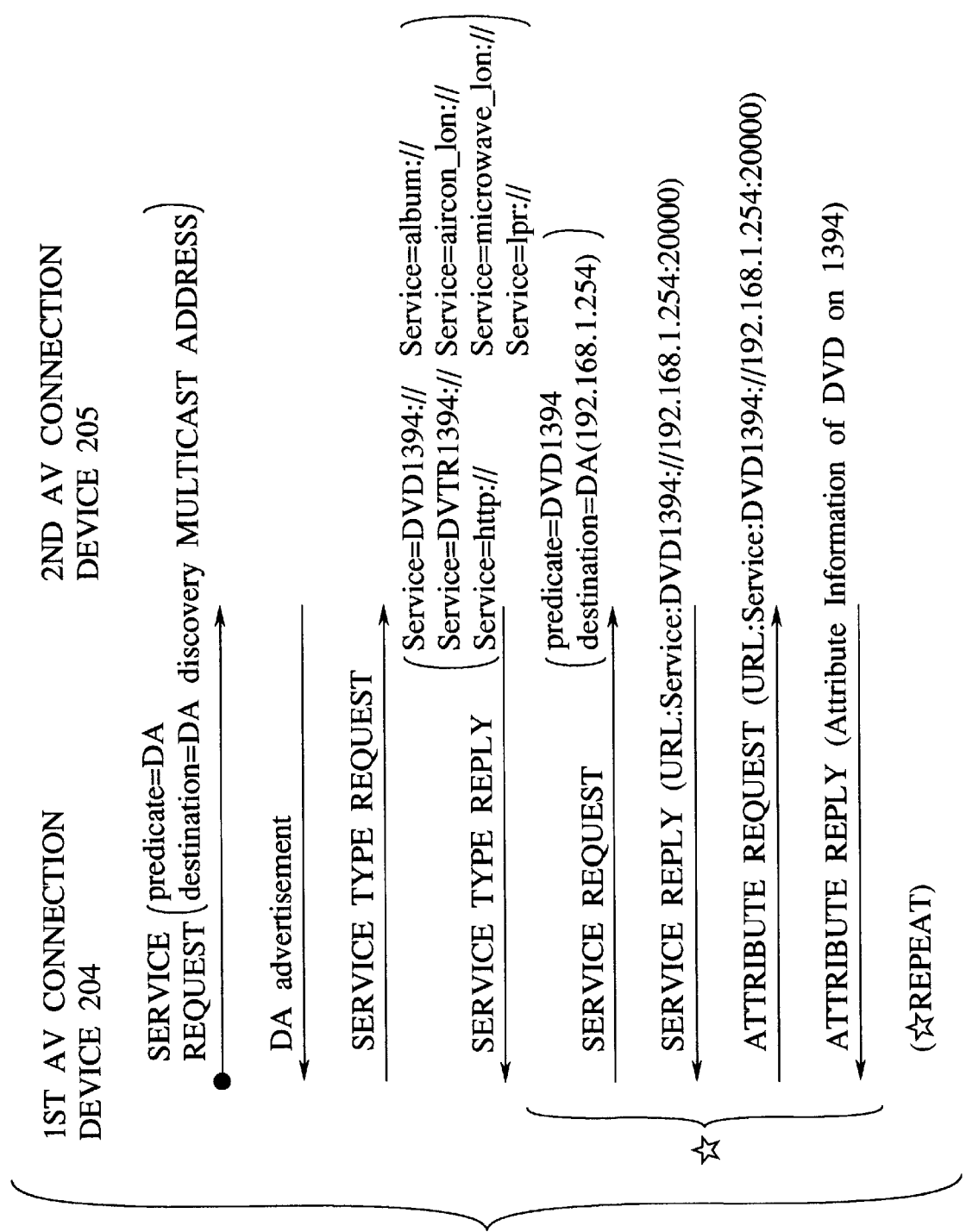
FIG. 18 is a diagram showing an exemplary procedure for acquiring service information from a directory agent in the network system of FIG. 7.

FIG. 18 shows an exemplary procedure for information exchange between the first AV connection device 204 and the second AV connection device 205 for the purpose of collecting the service information.

First, the first AV connection device 204 sends a service request with "directory agent" described in the "predicate" region toward the second home network in order to search out the directory agent within the second home network. In order to realize this, it is possible to use a method for sending the IP multicast with plural hops (so as to have a scope containing the other home network) or a method for sending the IP multicast after a source routing or routing header is assigned to the second home network.

Here, the IP address of the correspondent side home, in particular the IP subnet address (i.e., the address of the network) can be obtained by exchanging the routing information using the routing protocol with respect to the correspondent side home, for example.

Now, upon receiving this service request, the second AV connection device 205 which is the directory agent of the second home network notifies the directory agent advertisement to the first AV connection device 204 in order to notify that it is the directory agent.

Next, the first AV connection device 204 sends a service type request to the second AV connection device 205 in order to ascertain what services are provided at the second home network.

Then, the second AV connection device 205 notifies a service type reply indicating WWW (a service name appearing in URL is http), digital album (a service name appearing in URL is album), printer (a service name appearing in URL is lpr), air conditioner connected to LON (a service name appearing in URL is aircon$_{13}$ lon), microwave oven connected to LON (a service name appearing in URL is microwave_lon), 1394 terminal of DVD player (a service name appearing in URL is DVD1394), and 1394 terminal of digital VTR (a service name appearing in URL is DVTR1394). For example, as shown in FIG. 18, they can be notified in forms of "Service:http://", "Service:album://", "Service:lpr://", "Service:aircon_lon://", "Service:microwave_lon://", "Service:DVD1394://", and "Service:DVTR1394://".

As for the devices connected to the LON, the service information (the URL information indicating the location of the service) notified from the PC 210 are notified as it is. Namely, for those services which are registered by the service location protocol of the IP, the service information is notified as it is to the first AV connection device 204.

As for the services that can be recognized only as 1394 terminals/services by the second AV connection device 205 which is the directory agent of the second home network, they are presented to the first AV connection device 204 on the IP using new service categories "service:DVD1394" and "service:DVTR1394" meaning "DVD on 1394" and "DVTR on 1394", in an attempt to provide these services from the second AV connection device 205 which is the directory agent itself as the proxy server of these services.

Next, upon receiving this information, the first AV connection device 204 proceeds to the procedure for collecting detailed information about each received service.

Here, one exemplary procedure for collecting information will be described. Namely, in order to obtain the location information and the attribute information for all the services received by the service type reply described above, or for a service of interest for the first AV connection device 204 side among them, the first AV connection device 204 sends a service request and an attribute request for each service to the second AV connection device 205 which is the directory agent. In response to the service request, a service reply (more specifically, a URL which is the location information of that service, such as URL: "Service:DVD1394:// 192.168.1.254:20000", for example) will be returned, and in response to the attribute request, an attribute reply (the attribute information of that service, such as the attribute information of the DVD on 1394, for example) will be returned. Note that further details in this regard can be found in the service location protocol document such as Internet draft "draft-ietf-svrloc-protocol-16.txt".

FIG. 18 shows the above procedure for the DVD1394 service alone, but by collecting the information similarly for all the other services, the first AV connection device 204 can collect the service information of the second home network as shown in FIG. 19.

Here, for the DVD1394 and DVTR1394 services, the second AV connection device 205 can receive service requests from the external as the proxy server for these services as already described above. Namely, a concrete service embodiment such as a remote command protocol which is the IP protocol is received by the second AV connection device 205 on behalf of the 1394 node, and this is converted into the 1394 protocol and then exchanged with the 1394 node (as will be described in detail below). In this manner, services (the DVD service and the DVTR service here) that can only be exchanged by the 1394 protocol can be presented through the IP service presentation protocol which is a network independent protocol, so that it becomes possible to send and control commands to the 1394 node (i.e., commands become controllable) from arbitrary IP node, regardless of networks.

Among the services for which the information is collected by various replies, a service (the DVD service and the DVTR service) for which the second AV connection device 205 is the proxy will be assigned with a port number to be used as a service window, that is, a proxy service port number. This port number may be assigned by the standardization organization in advance or determined by negotiation between nodes. In this embodiment, it is assumed that the DVD service on 1394 is assigned with a port number "20000" and the DVTR service on 1394 is assigned with a port number "20001". In this manner, the external terminal (the terminal on the first home network, for example) interprets that these services exist on the second home network, and that these services are IP level services.

Figure 20:
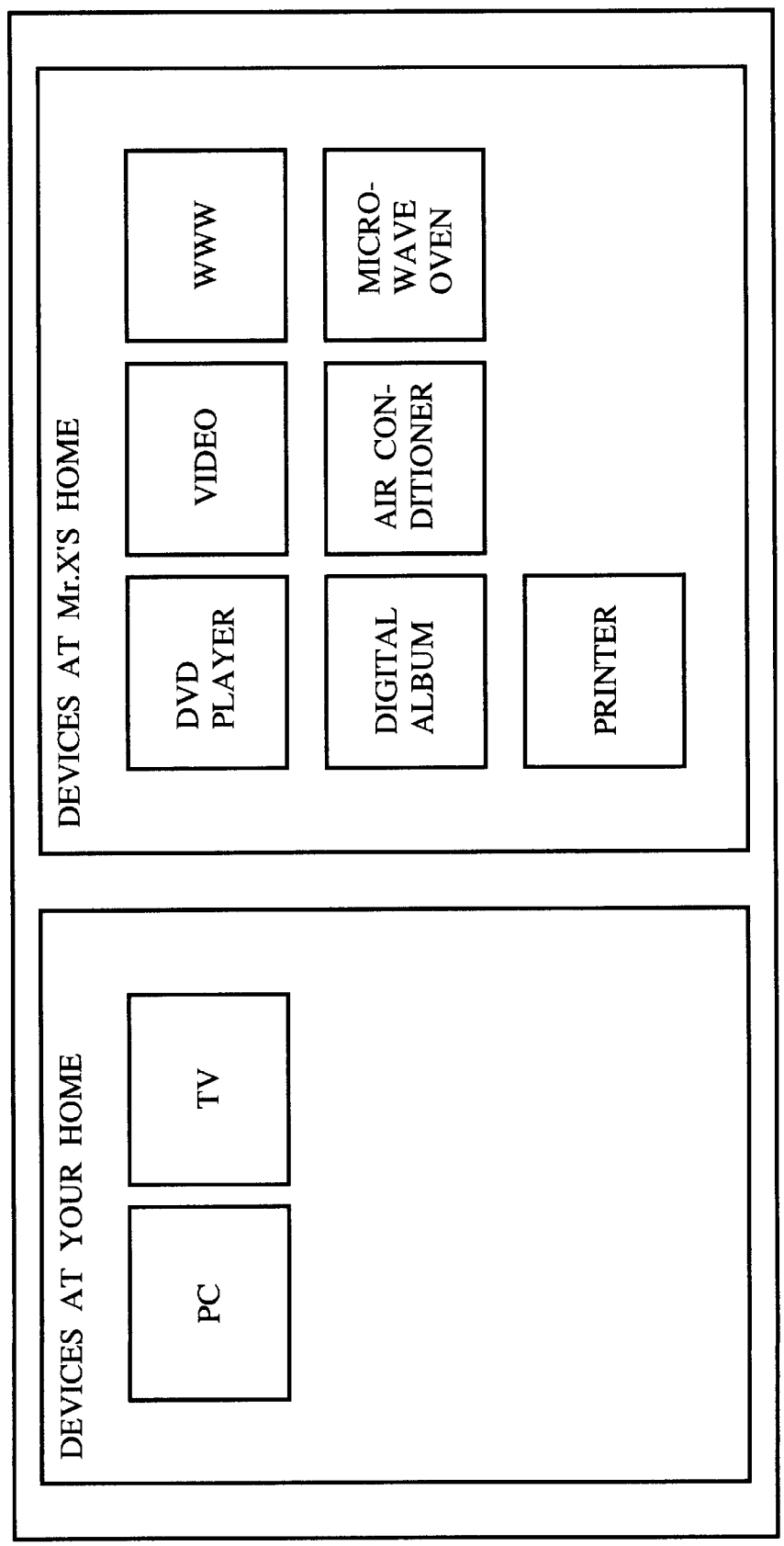
FIG. 20 is a diagram showing still another exemplary screen display in the case of service specific display in the network system of FIG. 7.

Now, as shown in FIG. 20, the terminal on the first home network, such as the first AV connection device 204 for example, displays on its console the information on the first home network as well as the information on services on the second home network (such as the home network of Mr. X's home, for example) in a form of a list of services recognized by it, according to the information acquired by the service location protocol described above. Here, the display may be made by the same policy as that for FIG. 17 described above.

Next, when it is desired to makes an access to a service of the second home network, the external terminal makes an access to the address and the port number presented in the URL shown in FIG. 19.

For example, consider the case where the user operates the first AV connection device 204 to obtain video data from the DVD player 208 which is the 1394 terminal on the second home network, and displays the obtained video data on the digital TV 207.

Figure 21:
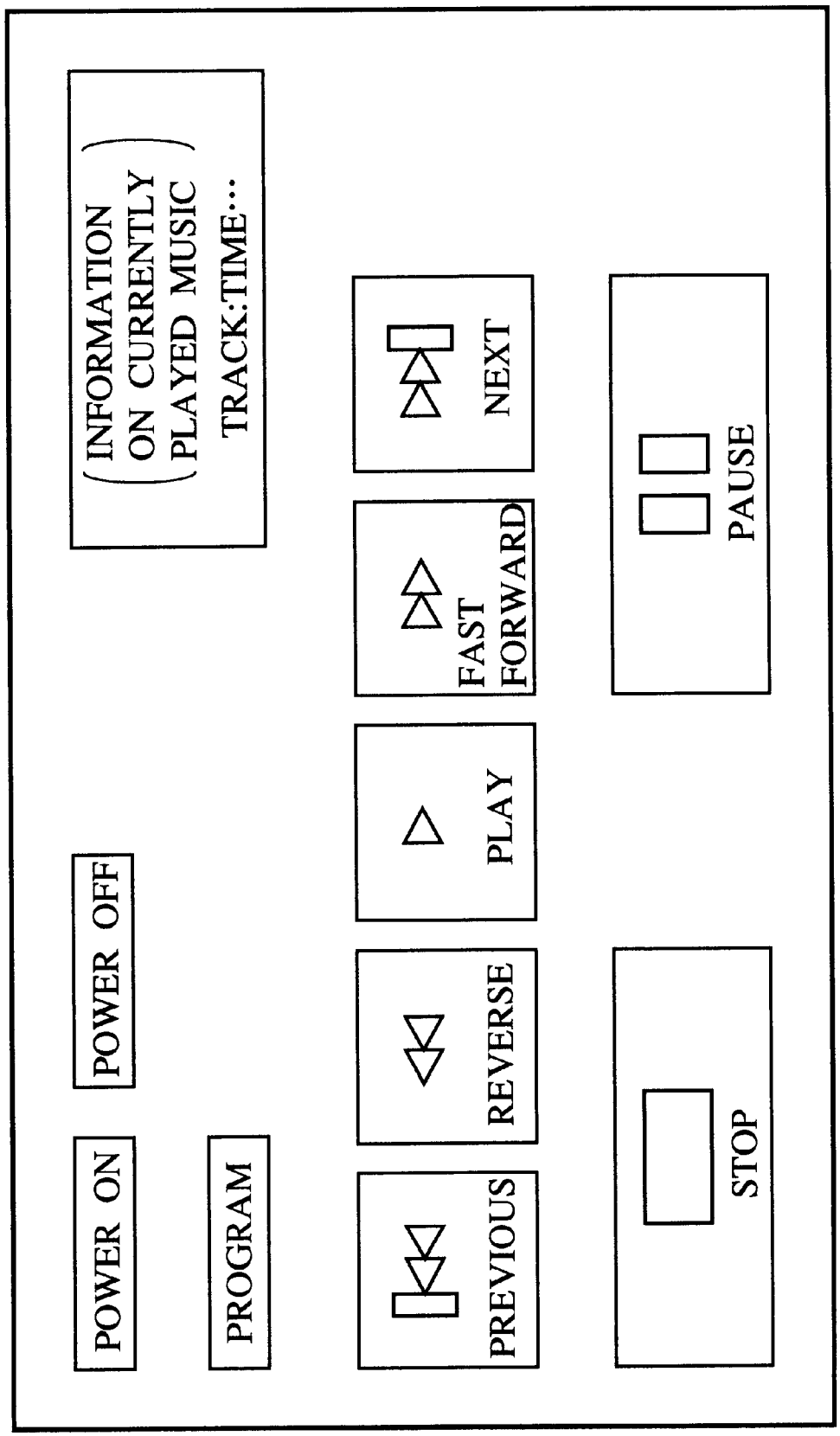
FIG. 21 is a diagram showing an exemplary screen display for operating a DVD player in the network system of FIG. 7.

In this case, the actual operations to be made by the user are as follows. First, the user clicks an icon of the DVD player on the display of FIG. 20. Then, a group of operation buttons for operating the DVD player will be displayed on the screen as shown in FIG. 21, for example. Next, the user executes the remote control of the DVD player 208 by clicking a desired operation button. Also, the user specifies that the receiving terminal is the digital TV by some input method such as clicking.

Figure 22:
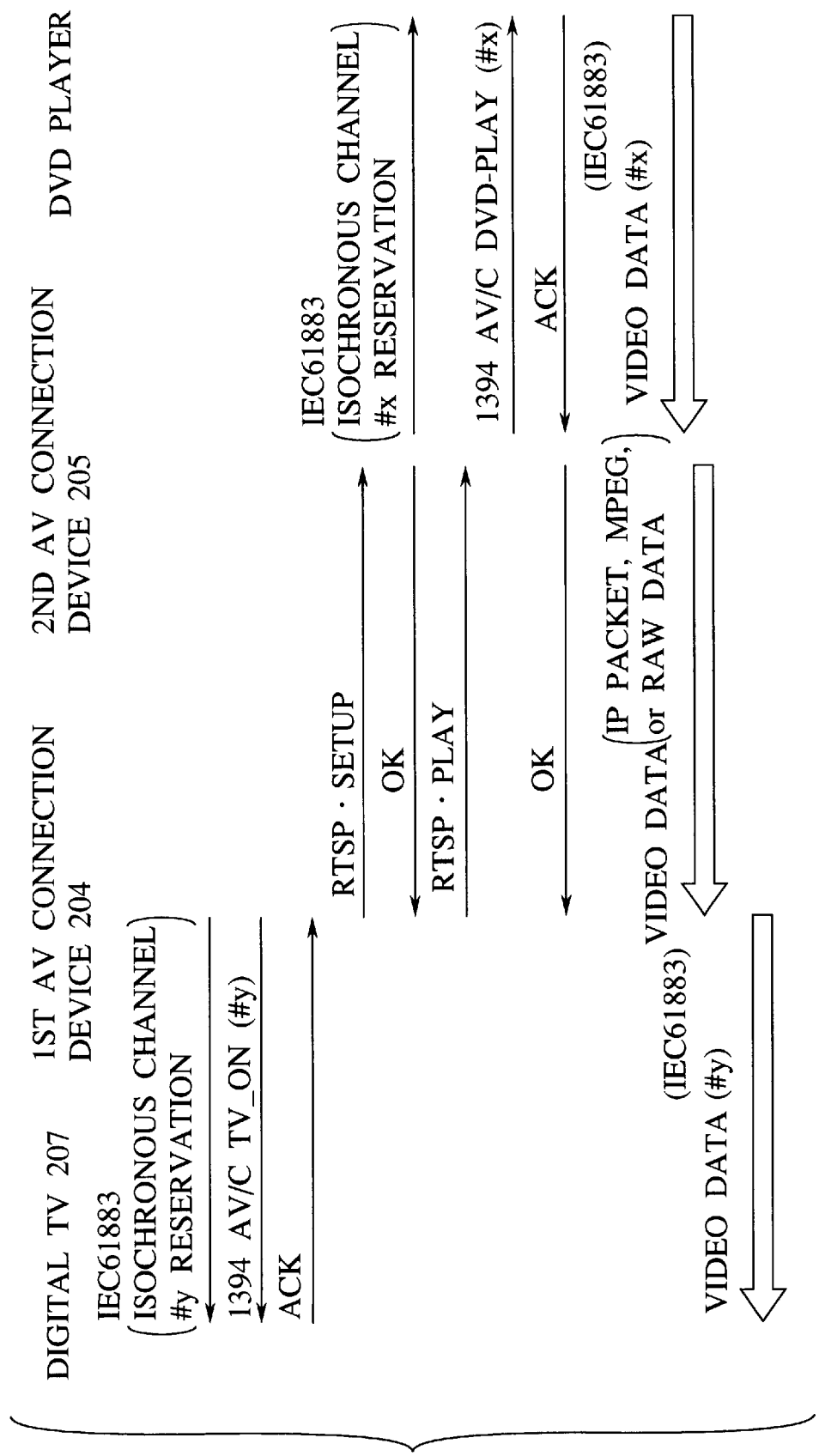
FIG. 22 is a diagram showing one exemplary sequence for commands and protocols flowing in the network system of FIG. 7 in the case of utilizing a service on the first home network from the second home network.
Figure 23:
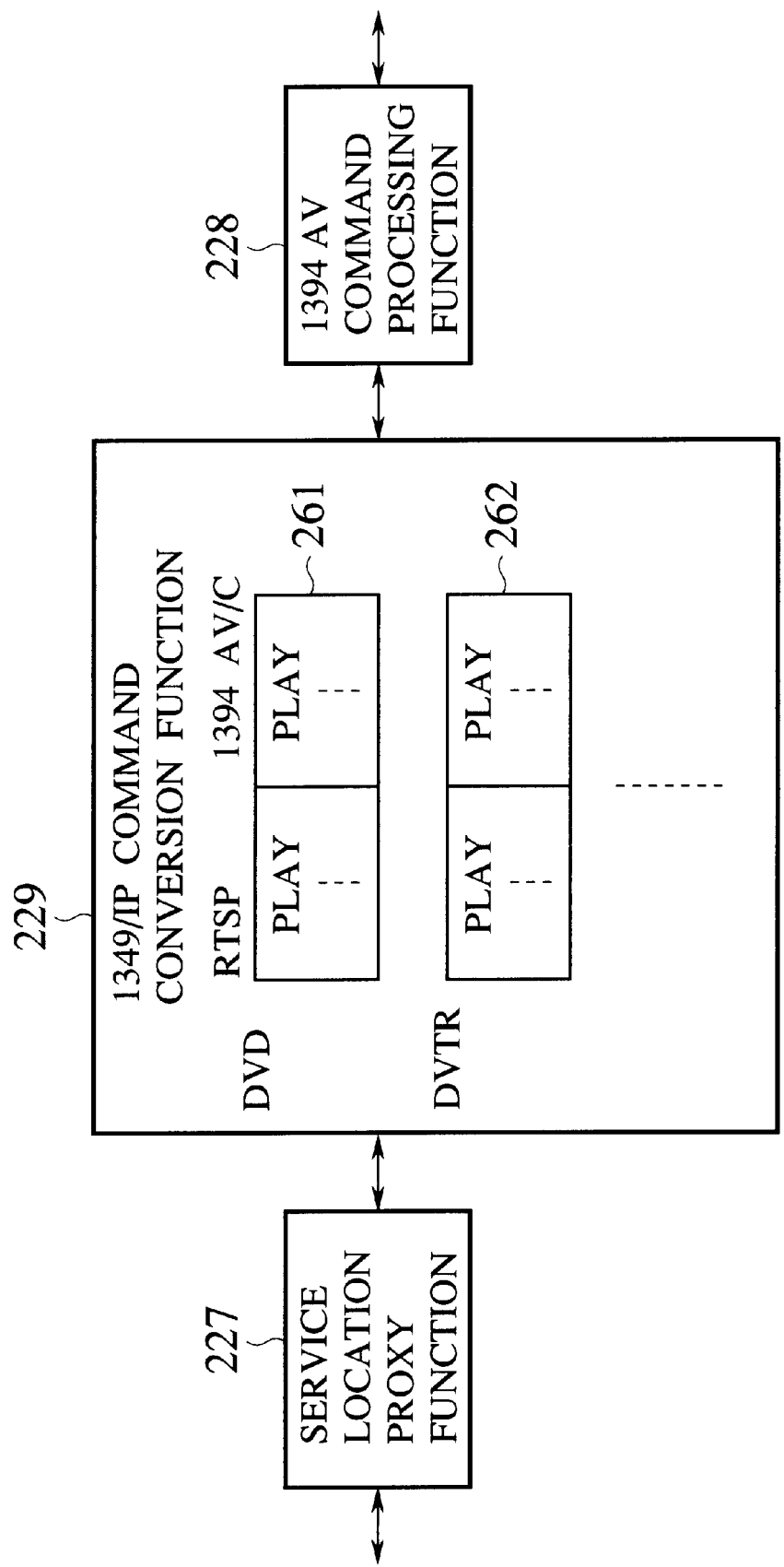
FIG. 23 is a diagram for explaining 1394/IP command conversion used in the network system of FIG. 7.

FIG. 22 shows an exemplary sequence of a group of commands and a group of protocols that actually flow on the network in this case.

First, the first AV connection device 204 sends the video data to the digital TV 207, and carries out the following sequence in order to make a setting for the video data display. Namely, the isochronous channel on the first IEEE 1394 bus is reserved according to the IEC 61883 protocol. The isochronous channel number of the isochronous channel obtained here is assumed to be #y.

Next, the first AV connection device 204 turns the power of the digital TV 207 ON and sends a control command (such as that of 1394 AV/C protocol) predetermined by the standardization organization such as the 1394TA for the purpose of displaying video data from the isochronous channel #y on a screen. It is also possible to return ACK to the first AV connection device 204 when the command is accepted. As a result, the channel from the first AV connection device 204 to the digital TV 207 is reserved.

Before or after that or in parallel to that, the first AV connection device 204 issues a command for the DVD player 208 with respect to the second AV connection device 205. Here, the first AV connection device 204 is interpreting the DVD player 208 as the IP service. The command is issued with respect to the port number "20000" of the proxy server which is the second AV connection device 205 (IP address 192.168.1.254).

Here, as a command for remote control, RTSP (Real Time Stream Protocol) can be utilized for example. RTSP is a protocol for carrying out the remote control of real time signals, which is currently discussed by the IETF which is the standardization organization of Internet. For more information on RTSP, see Internet draft "draft-ietf-mmusic-rtsp-02.ps", for example.

The first AV connection device 204 issues a command necessary for playing the DVD player 208 (such as SETUP command or PLAY command, for example) on RTSP.

Upon receiving the SETUP command of RTSP, the second AV connection device 205 interprets that the control with respect to the DVD player 208 will start subsequently, and carries out the reservation of the bandwidth, i.e., the isochronous channel, for the video transmission on the second IEEE 1394 bus to which the DVD player 208 is connected. This is done by the IEC 61883. The isochronous channel number reserved here is assumed to be #x. For the bandwidth, the empirical value (such as 6 Mbps for MPEG, for example) may be used or the requested value may be included in the message.

Also, upon receiving the PLAY command of RTSP, the second AV connection device 205 converts it into a 1394 command, that is, a corresponding command defined by the protocol between 1394 terminals such as 1394 AV/C protocol (which is to be defined by a command called DVD-PLAY, for example), and issues the obtained 1394 command to the DVD player 208.

This command conversion is carried out at the 1394/IP command conversion function 229. This processing will now be described with reference to FIG. 23. A command on IP is received by the service location proxy function 227. The received command is converted by the 1394/IP command conversion function 229. More specifically, a table describing the relationship between a command (or operation) on IP and a command (or operation) on 1394, such as a DVD command correspondence table 261 and a DVTR command correspondence table 262, is provided for each service, and the command received on IP is converted into the command on 1394 according to this table for each service. Then, the obtained command is given to the 1394 AV command processing function 228 and its transmission is instructed. Upon receiving this instruction, the 1394 AV command processing function 228 carries out the actual command transmission.

Note that the similar procedure will be used for the case in which the command flows in the opposite direction, that is, the case in which the entered 1394 command is to be converted into the IP command and then outputted. Namely, the 1394 command is received by the 1394 AV command processing function 228, and converted into the IP command according to the table for each service at the 1394/IP command conversion function 229. Then, the obtained IP command is transmitted by the service location proxy function 227.

Now, when the command reaches to the DVD player 208 in this manner, the actual transmission of video data is carried out through the isochronous channel #x of the second 1394 bus 203. The actual data transfer starts after the ACK signal is returned. Here, the ACK signal may be converted into "OK" of RTSP on the public network (ISDN, Internet, etc.), as indicated in FIG. 22.

The second AV connection device 205 transmits the video data to the public network 202 through the datalink switch 222. At this point, the transmission may be made in the MPEG multiplexed form.

The transmitted video data are then sent to the first AV connection device 204 through the public network 202. The first AV connection device 204 then sends the received video data to the isochronous channel #y of the first 1394 bus 201 through the datalink switch 222, and the video data are eventually played at the digital TV 207. As a result, it becomes possible for the user of the first home network to watch the video from the DVD player 208 on the second home network, at the digital TV 207.

Figure 24:
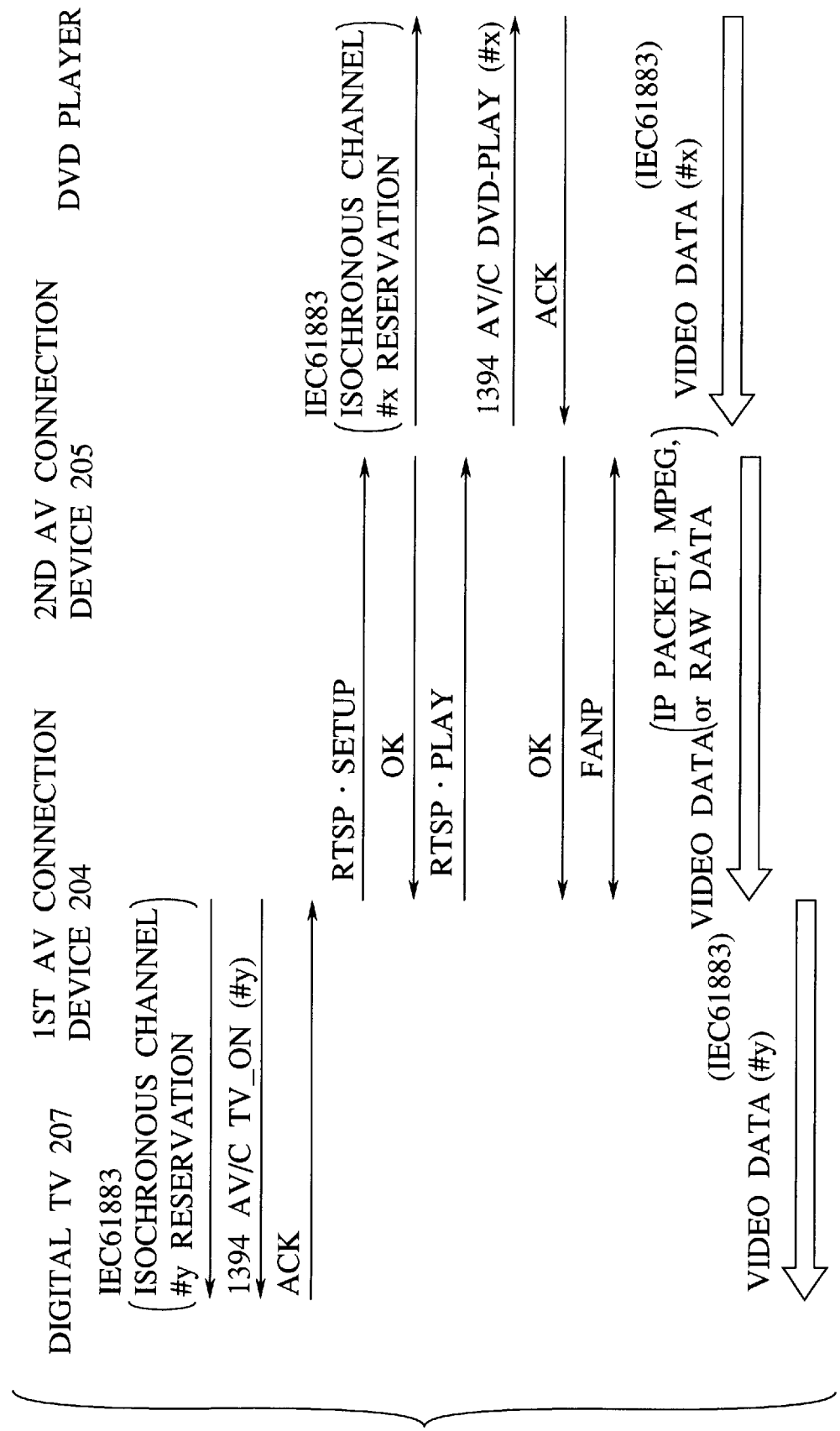
FIG. 24 is a diagram showing another exemplary sequence for commands and protocols flowing in the network system of FIG. 7 in the case of utilizing a service on the first home network from the second home network.

Note that, as described above, it is preferable to realize the reservation of bandwidths and the matching of virtual transmission path identifiers on the datalink layer of a transmission path of video data by the FANP processing function 225 or the other RSVP processing function and the like. By using FANP and the like, it becomes possible to reserve communication resource regardless of network types. An exemplary sequence for such a case is shown in FIG. 24. In this sequence of FIG. 24, prior to the actual transmission of video data, the FANP carries out the reservation of communication resource on the datalink layer that is to be a transmission path of video data, the matching of identifiers, the setting of the connection device, etc.

Next, as another example of remote control through the public network 202, an exemplary case in which the user of the first home network operates the first AV connection device 204 to operate the air conditioner 213 (which is a LON terminal) on the second home network will be considered.

In this case, the actual operations to be made by the user are as follows. First, the user clicks an icon of the air conditioner on the display of FIG. 20. Then, a group of operation buttons for operating the air conditioner will be displayed on the screen, for example. Next, the user executes the remote control of the air conditioner 213 by clicking a desired operation button.

Figure 25:
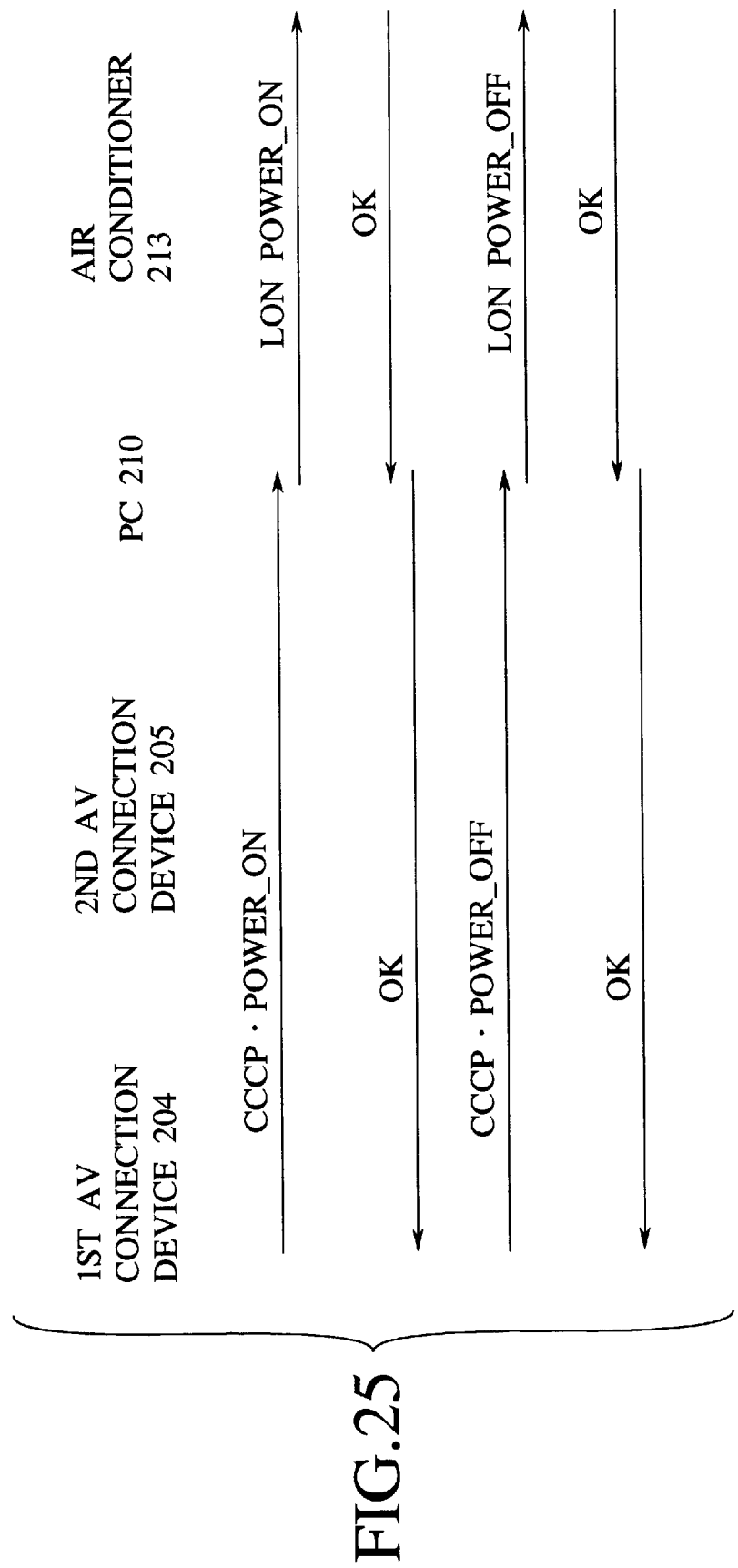
FIG. 25 is a diagram showing one exemplary sequence for commands and protocols flowing in the network system of FIG. 7 in the case of controlling a device connected to the first home network from the second home network.
Figure 26:
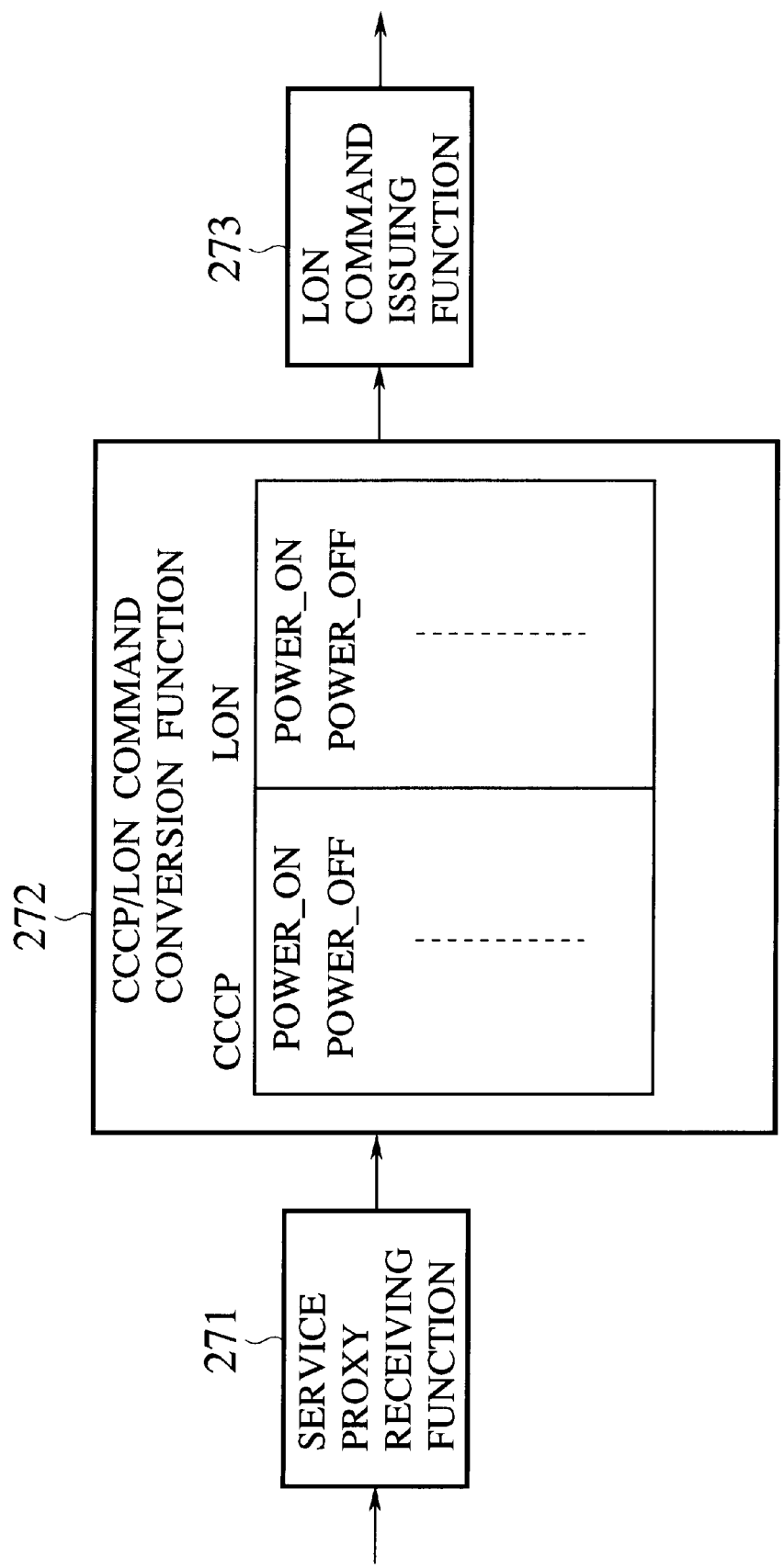
FIG. 26 is a diagram for explaining CCCP/LON command conversion used in the network system of FIG. 7.

FIG. 25 shows an exemplary sequence of a group of commands and a group of protocols that actually flow on the network in this case.

First, the first AV connection device 204 issues a command for the air conditioner 213 with respect to the PC 210 which is the proxy server as indicated by the service location protocol. Here, the first AV connection device 204 is interpreting the air conditioner 213 as the IP service provided by the PC 210. The command is issued with respect to the port number "15000" of the PC 210 which is the proxy server.

Here, as a command for remote control, CCCP (Cam Coder Control Protocol) can be utilized for example. CCCP is a protocol for carrying out the remote control of a cam coder through Internet, but it is also possible to control various electronic devices in the similar manner, and it is assumed here that CCCP includes a group of commands specific to the air conditioner. For more information on CCCP, see Internet draft "draft-ohta-ccc-video-00.txt", for example.

The first AV connection device 204 issues a command necessary for turning the power of the air conditioner 213 ON (POWER_ON command) on CCCP.

Upon receiving the POWER_ON command of CCCP, the PC 210 converts it into a LON command, that is, a corresponding command defined by the protocol between LON nodes (which is to be defined by a command called LON_POWER_ON, for example), and issues the obtained LON command to the air conditioner 213.

This command conversion is carried out within the PC 210. This processing will now be described with reference to FIG. 26. A command on CCCP is received by the service proxy receiving function 271. The received command is converted by the CCCP/LON command conversion function 272. More specifically, the CCCP/LON command conversion function 272 is provided with a table describing the relationship between a command (or operation) on IP and a command (or operation) on CCCP, that is, a LON command correspondence table, and the command received on CCCP is converted into the command to be transmitted to the air conditioner 213 through LON according to this table. Then, the obtained command is given to the LON command issuing function 273 and its transmission is instructed. Upon receiving this instruction, the LON command issuing function 273 carries out the actual command transmission.

Note that the similar procedure will be used for the case in which the command flows in the opposite direction, that is, the case in which the entered LON command is to be converted into the CCCP command and then outputted. Note also that, when the ACK signal is returned, this ACK signal is also notified to the first AV connection device 204. Here, the ACK signal may be converted into "OK" of CCCP on the public network (ISDN, Internet, etc.), as indicated in FIG. 25.

It is to be noted here that the mechanism described in this embodiment is applicable not only to the home network but also to the company network in general, and especially also to the network technique for realizing the so called "mobile environment".

Also, in this embodiment, the exemplary case of using IP as the network layer protocol and IEEE 1394 and LON as the datalink layer protocols has been described, but it is also possible to use the other network layer protocol such as DSM-CC that is expected to be standardized by DAVIC, IPX, etc., and the other datalink layer protocol such as Ethernet, ATM, etc.

Note also that, in this embodiment, the service location service function and the command conversion function are provided in the AV connection device and the services are provided from the AV connection device, but it is not absolutely necessary for these functions to be carried out by the AV connection device of this embodiment that is a node that inter-connects networks, and they may be provided in the PC 206 or the PC 210 in FIG. 7 such that the services are provided from the PC 206 or the PC 210, for example.

In such a case, similarly as in the above described case of providing services from the AV connection device of FIG. 8, the network interface (corresponding to the 1394 interface 221 of FIG. 8), the IP processing function 224, the 1394/IP service location processing function 226, the service location proxy function 227, the 1394 AV command processing function 228, and the 1394/IP command conversion function 229 should be implemented in the PC 206, the PC 210 or the other node, and in addition, the FANP processing function 225 or the control processing function based on RSVP and the like should be implemented when the network controls such as a control for reserving network communication resource and a control for matching identifiers to be used between networks are required.

It is also possible to implement the service location service function and the command conversion function in different nodes.

Note also that, in this embodiment, the private IP address is used for the IP address of the terminal when the public network 202 is not Internet but ISDN or the like, and the global IP address is used for the IP address of the terminal when the public network 202 is Internet, but it is also possible to use the global IP address at least for the node for inter-connecting networks (the AV connection device in FIG. 7) when the public network 202 is Internet and use the private address for any other node, by utilizing the address conversion of NAT (Network Address Translation) and the like. In such a case, the IP packet can be transferred from the external network with a set of the global IP address of the node for inter-connecting networks and the port number for indicating the private IP address (or a set of the private IP address and the port number) of a destination node as a destination. Then, the set of the global IP address and the port number can be converted into the private IP address (or a set of the private IP address and the port number) of the destination node at the node for inter-connecting networks, by referring to a table, for example.

Third Embodiment

Referring now to FIG. 27 to FIG. 42, the third embodiment of the present invention will be described in detail.

The second embodiment described above is directed to the case of using the service location protocol for the purpose of notifying to the first AV connection device 204 the information (service information) regarding services provided by service providing devices (such as the DVD player 208, the digital VTR 209, the WWW server and the digital album server functions provided by the PC 210, and the printer 211, for example) contained within the second home network, as shown in FIG. 18.

This third embodiment is directed to the case of realizing this notification using the WWW (World Wide Web) server and the home page.

The system configuration in this third embodiment is the same as that of FIG. 7. Here, similarly as in the second embodiment, the case of remote control of various service providing devices (the DVD player 208, the digital VTR 209, the WWW server and the digital album server functions provided by the PC 210, and the printer 211) in the second home network from the first AV connection device 204 of the first home network will be considered.

Figure 27:
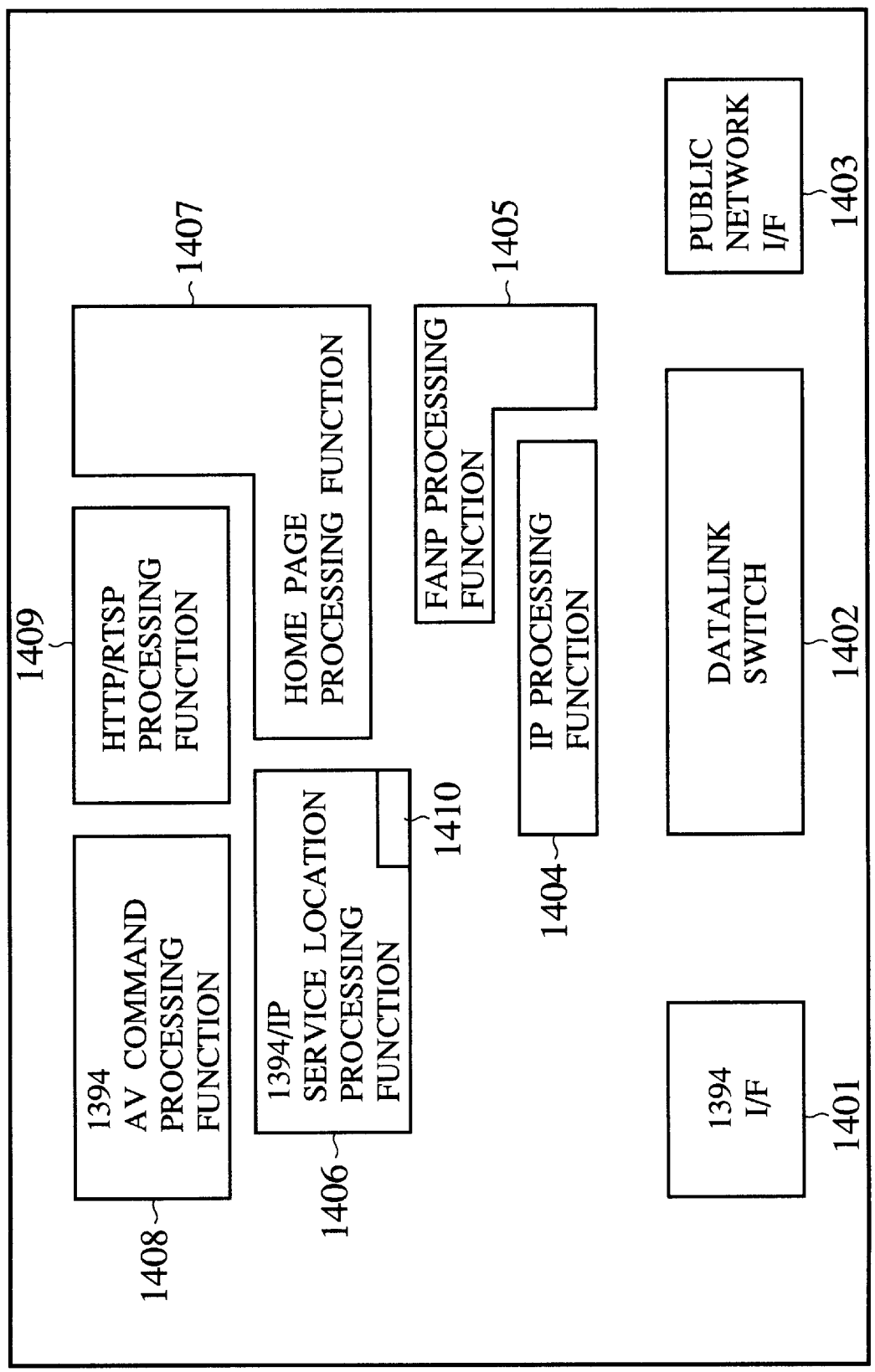
FIG. 27 is a block diagram showing an exemplary internal configuration of an AV connection device in a network system according to the third embodiment of the present invention.

FIG. 27 shows an exemplary internal configuration of the second AV connection device 205 in this third embodiment, in which a 1394 interface 1401, a datalink switch 1402, a public network interface 1403, an IP processing function 1404, a FANP processing function 1405, and a 1394 AV command processing function 1408 are substantially the same as the corresponding elements in the configuration of FIG. 8 described above so that their descriptions will not be repeated here. On the other hand, in FIG. 27, the service location proxy function 227 and the 1394/IP command conversion function 229 of FIG. 8 are replaced by a home page processing function 1407 and an HTTP/RTSP processing function 1409, respectively.

The 1394/IP service location processing function 1406 is a function that searches out a terminal or a service connected to the IEEE 1394 bus or receives its registration, recognizes what service providing device exists on the 1394 bus and what services are being provided, and notifies the service information to the external whenever the need arises such as when a notification is requested, similarly as in the second embodiment. In addition, the 1394/IP service location processing function 1406 also notifies the service information for each service providing device so obtained to the home page processing function 1407 to be described below, so as to urge the creation of a home page for displaying the state of the second home network.

The home page processing function 1407 has the WWW server function which receives the service information of the second home network from the 1394/IP service location processing function 1406 and arrange it into a home page. For example, an icon and a character string representing each service providing device are arranged on the home page. Then, commands for remote control of each service providing device are linked with the icon and character string representing the corresponding service providing device on the home page. When there is an access through the public network 202 to the home page so created, for example, the requested home page is transmitted or the commands for remote control received through the public network 202 are transferred to the HTTP/RTSP processing function 1409 according to the need, as will be described in further detail below.

Here, the commands for remote control of the service providing device are those which suit HTTP, RTSP (a protocol for remote controlling real time media in the WWW server), etc. The commands for remote control that suit HTTP will be referred to as HTTP commands and the commands for remote control that suit RTSP will be referred to as RTSP commands.

The HTTP/RTSP processing function 1409 has an HTTP demon or RTSP demon therein, and has a function for carrying out processing with respect to the HTTP command or RTSP command transferred from the home page processing function 1407 as well as a function (proxy function) for converting the command into the IEEE 1394 command according to the need and carrying out control of a device on the 1394 bus 203 through the 1394 AV command processing function 1408 when the destination of the command is that assigned to a service disclosed by the second AV connection device 205 as a proxy.

Figure 15:
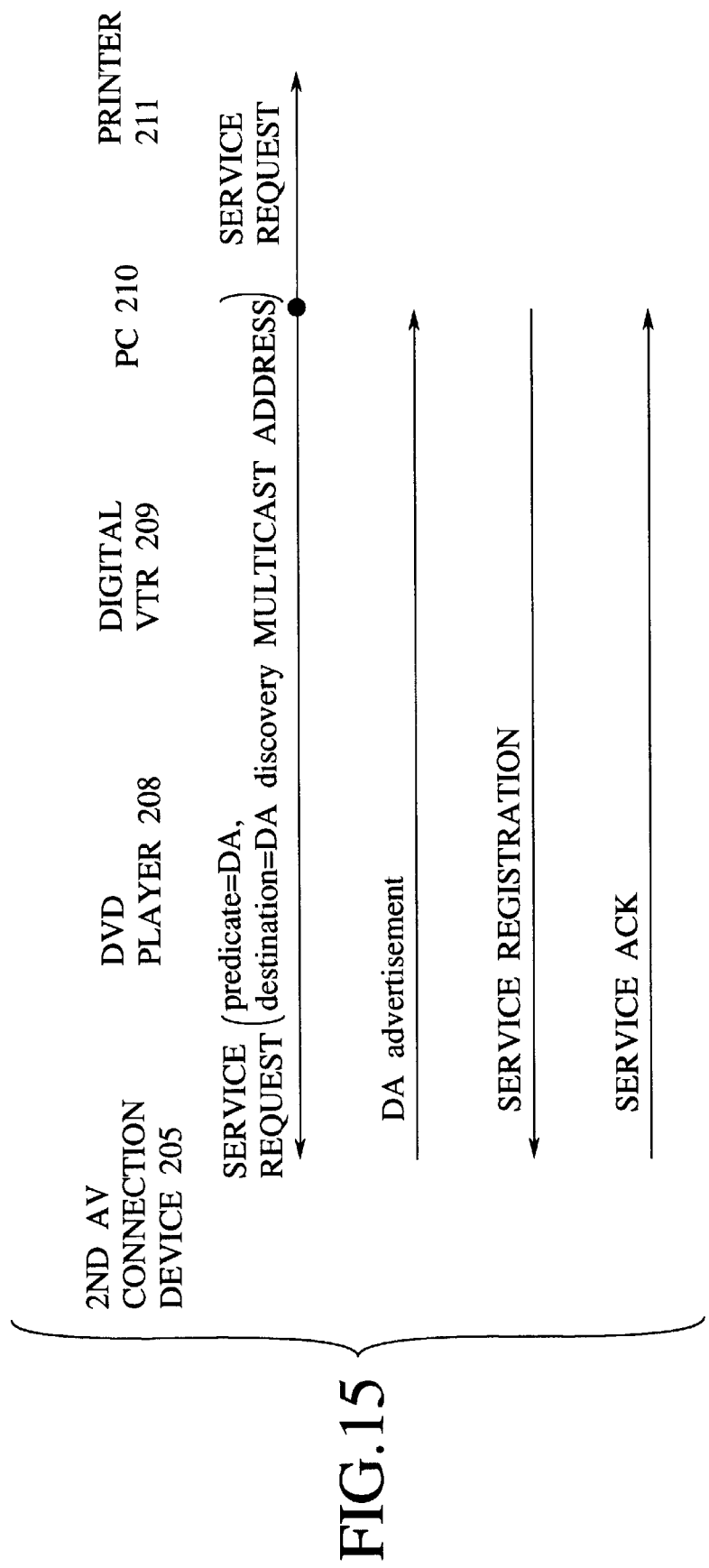
FIG. 15 is a diagram showing an exemplary procedure for registering service information into a directory agent in the network system of FIG. 7.

Next, a procedure for the second AV connection device 205 to acquire the service information of each service providing device connected to the second home network in the second home network will be described. This is basically the same as in the second embodiment. Namely, the second AV connection device 205 acquires the service information of the service providing device connected to the second home network either by reading the configuration memory of the connected device (the DVD player 208, the digital VTR 209, the PC 210, the printer 211) as shown in FIG. 9 described above, or by using the service location protocol as shown in FIG. 15 described above.

Note that the information contained in the configuration memory may be that shown in FIG. 10, FIG. 11, or FIG. 12. Also, the service information may be registered in a format shown in FIGS. 16A to 16D.

Now, at this point, the second AV connection device 205 recognizes the DVD player 208, the digital VTR 209, the PC 210, and the printer 211, as the 1394 nodes through the reading of the configuration memory. Also, the second AV connection device 205 recognizes the WWW service, the digital album service, the air conditioner service and the microwave oven service, through the service location protocol. Here, the second AV connection device 205 recognizes the air conditioner service and the microwave oven service as services provided at the PC 210.

Then, the second AV connection device 205 creates the home page for presenting "what is in that home (what service providing devices and what services are there)" according to the collected service information.

Figure 28:
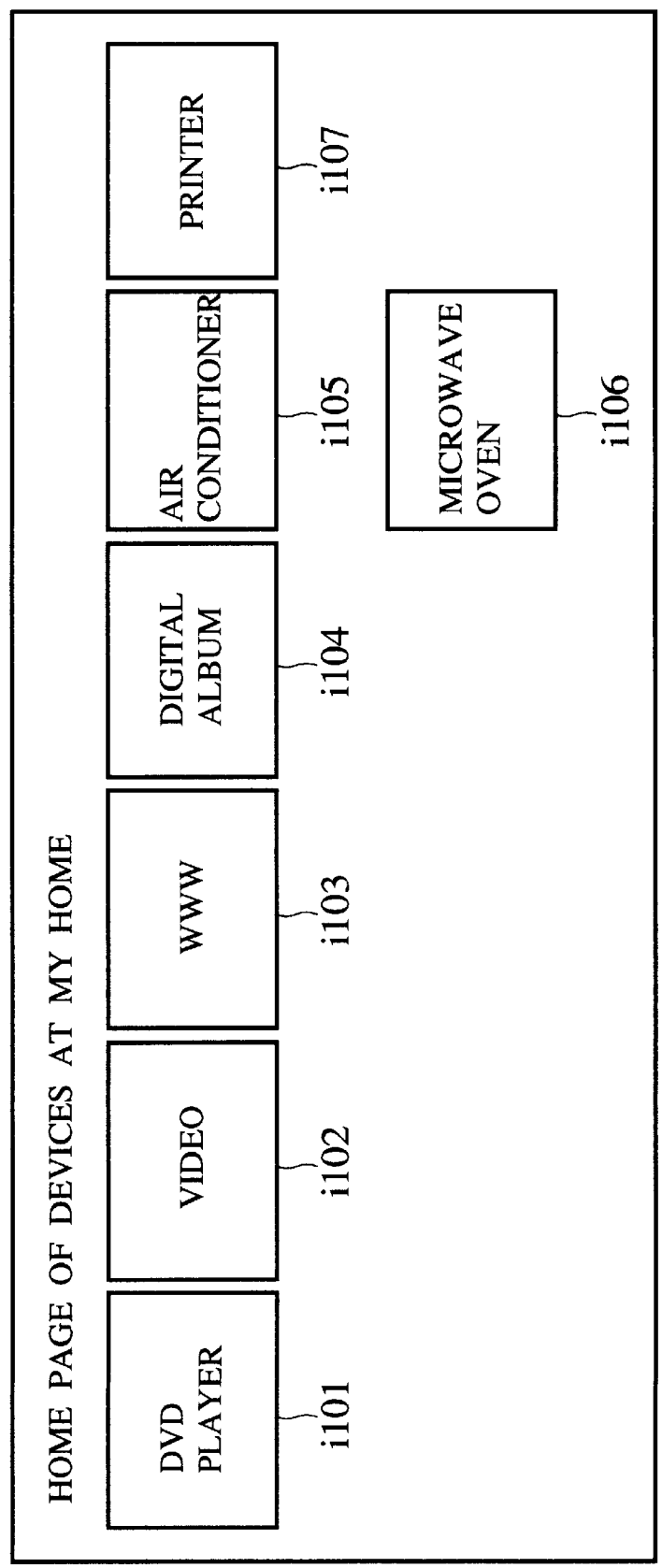
FIG. 28 is a diagram showing an exemplary home page presenting all remote controllable service providing devices on the second home network in the third embodiment of the present invention.

The home page to be created here enumerates icons and character strings representing the service providing devices to be recognized by the user, as shown in FIG. 28, for example. This home page may be constructed in such a manner that it can be reached through the hyperlink from a character string or an icon for "devices at my home", for example, within an initial home page to be presented by the WWW server of that home by default, for example. Note that it is preferable to use some authentication procedure at a time of moving to this "devices at my home" home page in order to prevent intrusion by unauthorized third person.

Figure 31:
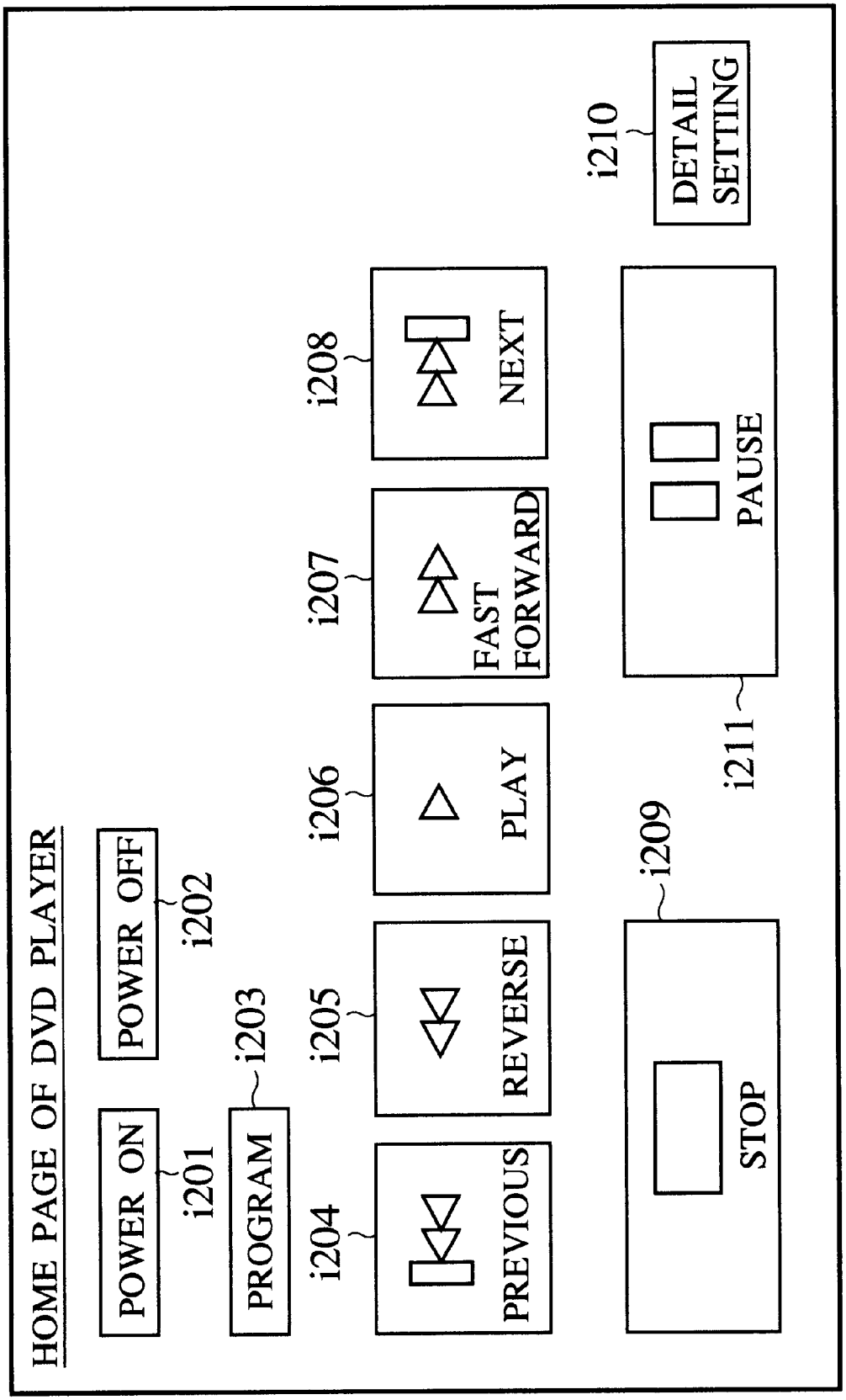
FIG. 31 is a diagram showing an exemplary home page of a service providing device (DVD player) in the third embodiment of the present invention.

This home page of FIG. 28 is created such that, when the icon or the character string on the home page as shown in FIG. 28 is clicked, the corresponding service providing device or the home page of that service is displayed. For example, when the icon of the DVD player is clicked in the home page of FIG. 28, the "home page of DVD player" as shown in FIG. 31 which is linked to that icon will be displayed.

Figure 29:
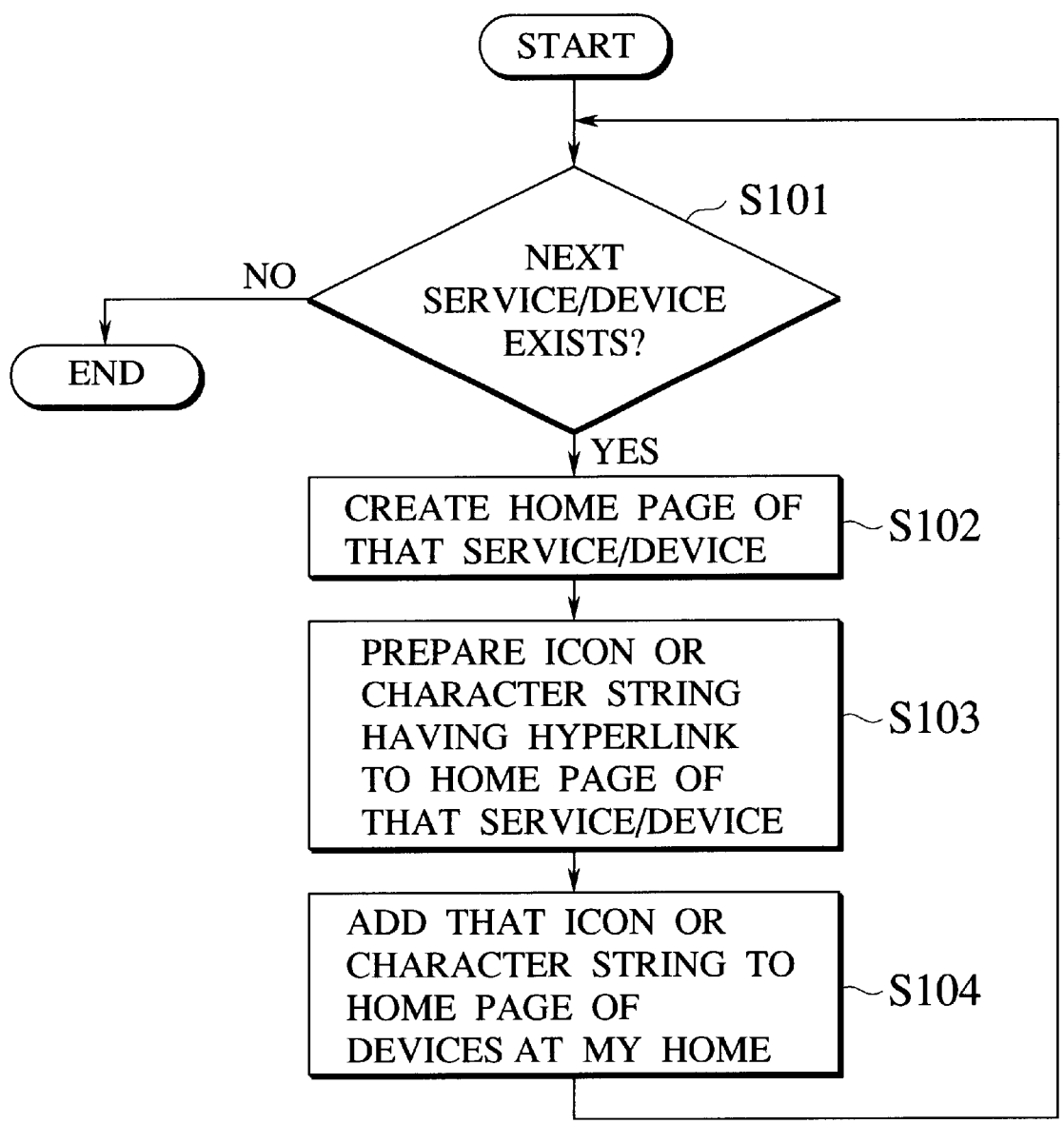
FIG. 29 is a flow chart for a procedure to create a home page as shown in FIG. 28 in the third embodiment of the present invention.

In order to create the home page of FIG. 28 with such a structure, the home page processing function 1407 carries out a procedure according to the flow chart of FIG. 29, for example.

First, the service information for each service providing device registered in the 1394/IP service location processing function 1406 is read out one by one, for example, and the home page for each service providing device (such as the "home page of DVD player" shown in FIG. 31) is created (steps S101 and S102).

Figure 30:
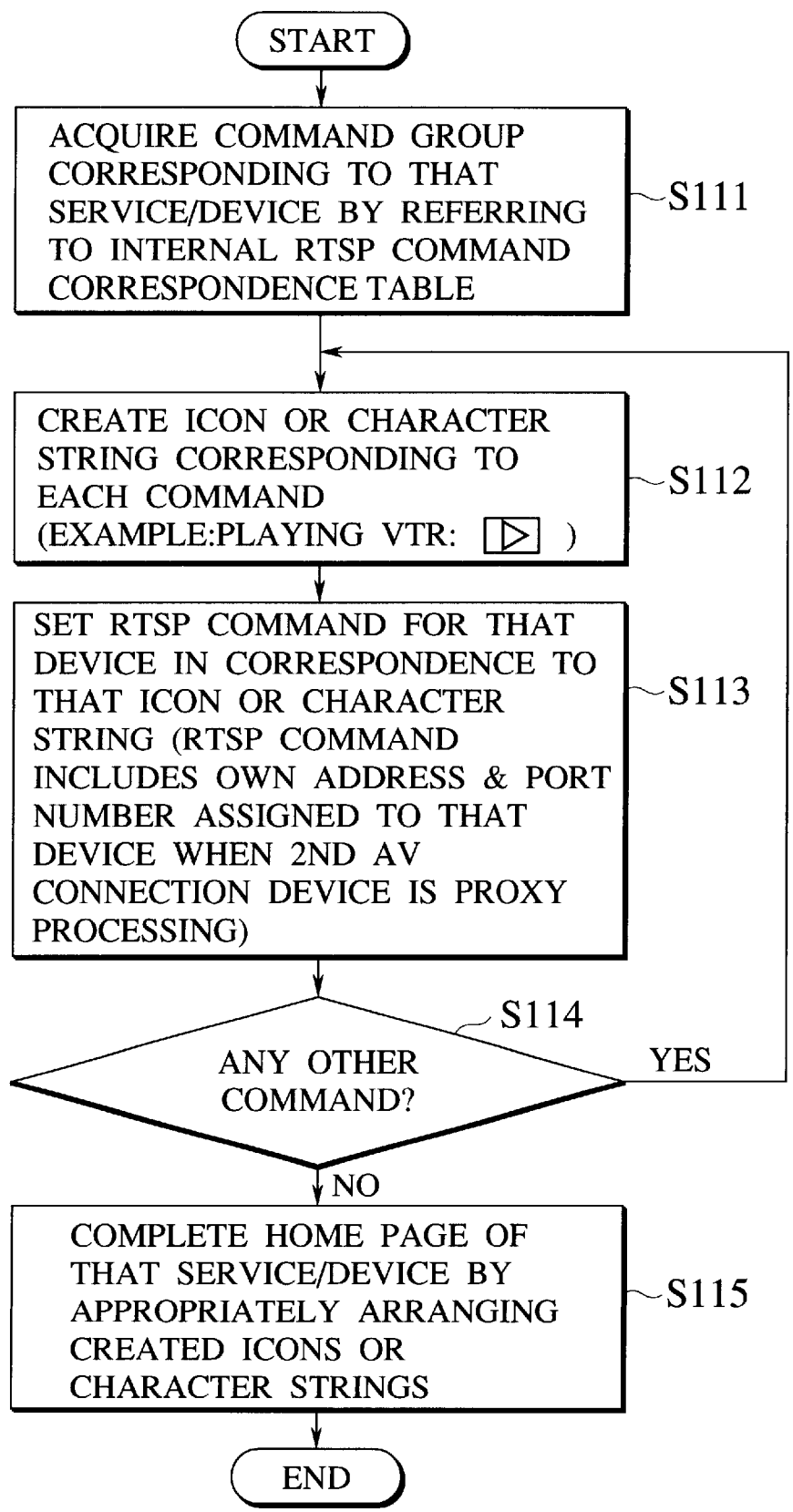
FIG. 30 is a flow chart for a procedure to create a home page of a service providing device in the third embodiment of the present invention.

Here, the home page creation processing procedure at the step S102 is carried out according to the flow chart of FIG. 30.

Namely, the prescribed command group for each service providing device (the command group for control of the service providing device which is to be disclosed to a user through the home page) is acquired by referring to an RTSP command correspondence table 1410 (shown in FIG. 42) for each service providing device that is provided in the 1394/IP service location processing function 1406 (step S111), and an icon or character string corresponding to each command is created (step S112). For example, when the service providing device is the DVD player, an RTSP command "PLAY" for commanding the playing of the DVD player is acquired from the RTSP command correspondence table of FIG. 42, and an icon corresponding to this command (an icon i206 of FIG. 31) is created.

The RTSP command correspondence table 1410 has description of RTSP commands for each service providing device. For example, in the case of the DVD player 208, the command group includes RTSP commands for "power ON", "power OFF", "play", "reverse", "previous", "fast forward", "next", "stop", and "pause". Also, as shown in FIG. 42, in the case of the DVD player 208 or the digital VTR 209 for which the second AV connection device 205 carries out the proxy processing, the 1394 commands corresponding to the RTSP commands are also stored.

Note that the RTSP command correspondence table 1401 may be the same table as that of FIG. 34 to be described below which is to be provided in the 1394/IP command conversion function 1423.

Next, the RTSP command for that service providing device is set in correspondence to the icon or character string created at the step S112. For example, the RTSP command "PLAY" is set in correspondence to the icon i206 for "play" shown in FIG. 31. This can be done by registering the icon or character string and the corresponding RTSP command in a table, for example.

Here, in the case of the DVD player 208 or the digital VTR 209 for which the second AV connection device 205 carries out the proxy processing, the address of the second AV connection device 205 and the port number assigned to the IEEE 1394 node (the DVD player 208 or the digital VTR 209) are to be included in the RTSP command.

The above processing is carried out for all the commands to be provided by that service providing device, and then the home page of that service providing device as shown in FIG. 31 for example is created by appropriately arranging the created icons or character strings (steps S114 and S115).

Returning now to the description of FIG. 29, the icon or character string of that service providing device that has a hyperlink to the home page of that service providing device created according to the flow chart of FIG. 30 is created or acquired (step S103). Namely, the icon or character string for that service providing device can be taken out from the configuration memory of that service providing device, or acquired by accessing a URL provided by the service location protocol that can uniquely specify the location of this icon or character string.

Then, the icon or character string obtained at the step S103 is attached to the "home page of devices at my home". The above processing is carried out for all the service providing devices contained in the second home network, so as to produce the home page as shown in FIG. 28 (step S104).

Now, among the icons or character strings representing the service providing devices on the home page shown in FIG. 28, when the icon i101 representing the DVD player is clicked, the home page of the service providing device corresponding to this icon, i.e., the "home page of DVD player" as shown in FIG. 31, is displayed.

Using the home page of the service providing device as shown in FIG. 31, i.e., the "home page of DVD player" in this case, as a control panel of the DVD player, the user can remote control the DVD player 208. For example, when a "power ON" button is clicked, the power of the DVD player 208 will be turned ON.

Figure 32:
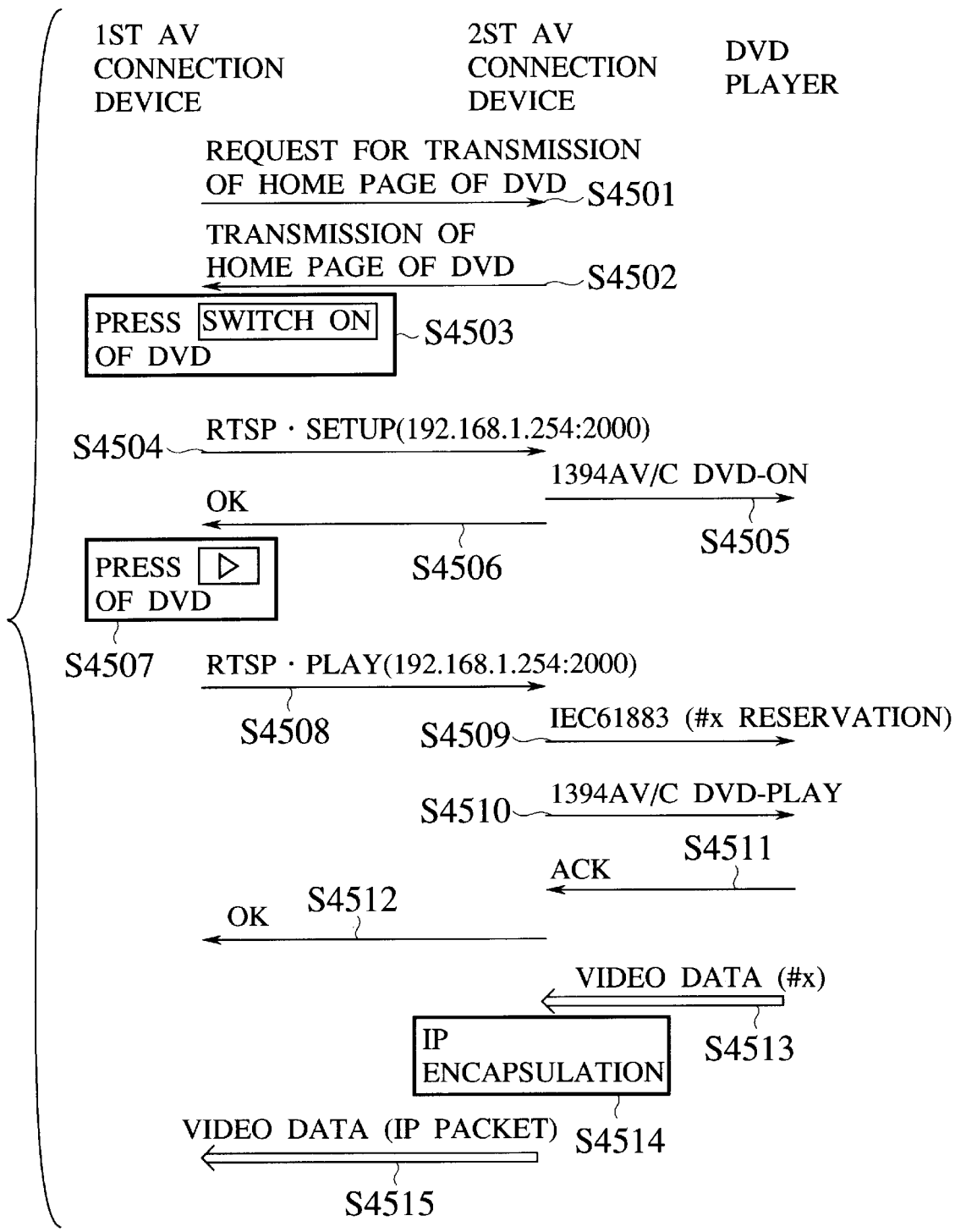
FIG. 32 is a sequence chart for one exemplary processing in the case of remote controlling a service device on the second home network in the third embodiment of the present invention.

Next, with reference to the sequence chart of FIG. 32, the operation in the case of remote control of various service providing devices (the DVD player 208, the digital VTR 209, the WWW server and the digital album server functions provided by the PC 210, and the printer 211) in the second home network from the PC 206 of the first home network through the first AV connection device 204 and the public network 202 will be considered.

Suppose that the home page as shown in FIG. 28 is presented as a result of using the prescribed WWW browser at the PC 206 provided in the first home network. When the user clicks the icon i101 of the DVD player, for example, the HTTP message for requesting the "home page of DVD player" that is set in correspondence to that icon is outputted from the PC 206.

Upon receiving this message, the first AV connection device 204 makes a request for transmission of the "home page of DVD player" to the second AV connection device 205 (step S4501). For example, a message like "GET/appliances/dvd.hmtl HTTP/1.1" is transmitted from the first AV connection device 204 to the second AV connection device 205.

Upon receiving this message, the second AV connection device 205 transmits the text (as shown in FIG. 33) of the "home page of DVD player" as shown in FIG. 31 for example to the first AV connection device 204 (step S4502).

As shown in FIG. 33, the hyperlink given to the icon i206 for "play" is the RTSP "PLAY" command for commanding the playing, to which a connection target node (the IP address of the second AV connection device 205 in this embodiment, i.e., "192.168.1.254") and its port number ("2000" in this embodiment) are attached, for example. In this manner, it becomes possible for the user to send the RTSP "PLAY" command to a desired port of a desired node without being conscious about its destination address by simply clicking the icon i206 for "play". Thus it becomes possible to realize the remote control using RTSP through the relationships established by hyperlinks.

Now, upon receiving the "home page of DVD player", the user of the first AV connection device 204 can start the remote control of the DVD player. For example, suppose that the user clicks the icon i201 for "power ON" in the home page of FIG. 31 (step S4503). This icon i201 for "power ON" is set in correspondence to the RTSP "SETUP" command by the hyperlink, for example. Thus the command data of a form "SETUP rtsp://192.168.1.254:2000 RTSP/1.0 1 Transport:rtp/udp;port=5500" is transmitted from the first AV connection device 204 to the second AV connection device 205 (step S4504). By this command data, the first AV connection device 204 requests the transmission of data using protocols of RTP/UDP and the use of the receiving side port number of "5500".

Upon receiving this command data, the second AV connection device 205 operates as follows. FIG. 34 shows an exemplary internal configuration of the HTTP/RTSP processing function 1409 of the second AV connection device 205. The above described RTSP "SETUP" command data reaches to an HTTP/RTSP main processing function 1421. Here, it is recognized first that the port number "2000" contained in this "SETUP" command data is the port number assigned to the DVD player 208 which is a 1394 node, so that the control is handed over to an RTSP proxy function 1422.

The RTSP proxy function 1422 searches out the corresponding 1394 AV/C command (the AV/C command indicating "power ON" in this embodiment) by referring to a table in a 1394/IP command conversion function 1423, and issues this AV/C command to the corresponding 1394 node (the DVD player 208 in this embodiment) through a 1394 AV command processing function 1408 (step S4505).

When this is successful, the second AV connection device 205 transmits the RTSP "OK" command data ("RTSP/1.0 200 1 OK Session:1234", for example) indicating the completion of control to the first AV connection device 204 (step S4506). At this point, the RTSP command is attached with a session number ("1234" in this embodiment") to be used throughout this session. The browser of the first AV connection device 204 keeps this session number, and attaches this session number "1234" to each RTSP command to be issued with respect to the same device hereafter.

Next, suppose that the user clicks the icon i206 for "play" in the home page of FIG. 31 (step S4507). This icon i206 for "play" is set in correspondence to the RTSP "PLAY" command by the hyperlink, for example. Thus the command data of a form "PLAY rtsp://192.168.1.254:2000 RTSP/1.0 2 Session:1234" is transmitted from the first AV connection device 204 to the second AV connection device 205 (IP address "192.168.1.254", port number "2000", session number "1234") that is set in correspondence by that hyperlink (step S4508).

Upon receiving this command data, the second AV connection device 205 carries out the reservation of an isochronous channel using IEC 61883 (step S4509) and the execution of the "PLAY" command for the DVD player 208 by the 1394 AV/C protocol (step S4510) so as to urge the playing of the DVD player 208 and the transmission of the video data to the reserved isochronous channel. Then, upon receiving an "ACK" signal indicating the completion of preparation for video data transmission from the DVD player 208, the second AV connection device 205 transmits the RTSP "OK" command data ("RTSP/1.0 200 2 OK Session:1234") to the first AV connection device 204 (steps S4511 and S4512).

Then, the second AV connection device 205 applies the IP encapsulation to the video data transmitted through this isochronous channel and transmits the obtained IP packets to the first AV connection device 204 (steps S4513 to S4515).

The first AV connection device 204 receives the video data as the IP packets, and carries out the processing necessary for video display, etc. In the case where the destination of the video is set to be the digital TV 207, similarly as in the second embodiment, the reservation of a necessary isochronous channel on the IEEE 1394 bus that constitutes the first home network is carried out and the first AV connection device 204 commands the receiving of data from that isochronous channel and the displaying of that data on a screen to the digital TV 207. Then, the video data are taken out from the received IP packets and converted into format suitable for the IEEE1394, and then sent to the first home network.

Note that, even when the user clicks the icon i206 for "play" before clicking the icon i201 for "power ON" in the home page of FIG. 31, it is possible to transmit both the "SETUP" command and the "PLAY" command in response to the clicking of the icon i206 for "play" by judging that the user has an intention to operate the DVD player 208. It is also possible to transmit the "SETUP" command for the DVD player as the RTSP command at a time of opening the "home page of DVD player".

As described, the second AV connection device 205 creates the home page listing icons that are liked with the RTSP commands of the service providing devices by referring to the RTSP command correspondence table 1410 according to the service information collected from all the remote controllable service providing devices contained in the second home network, and when a desired icon is clicked at the first AV connection device 204 side that made an access to this home page, the RTSP command that is set in correspondence to this icon (as registered in the table of the 1394/IP command conversion function 1423 in the HTTP/RTSP processing function 1409) executes a desired control with respect to a desired service providing device by being converted into the 1394 AV/C command, so that it becomes possible to realize the remote control (by using the AV connection device of the present invention) even when the service providing device (the DVD player 208 for example) connected to the second physical network (the IEEE 1394 bus 203 for example) can only interpret protocol dependent on datalink layer.

In the above, the case where the second AV connection device 205 transmits the video data by encapsulating it into IP packets has been described. In contrast, it is also possible to consider the case where the second AV connection device 205 transmits the video data to the first AV connection device 204 in the original form of non-IP data, without applying the IP encapsulation. The operation in such a case will now be described with reference to the sequence chart of FIG. 35.

Here, the steps 4801 and S4802 at which the user of the first AV connection device 204 receives the "home page of DVD player" and starts the remote control of the DVD player are the same as in the case of FIG. 32.

For example, suppose that the user clicks the icon i201 for "power ON" in the home page of FIG. 31 (step S4803). This icon i201 for "power ON" is set in correspondence to the RTSP "SETUP" command by the hyperlink, for example. Thus the command data of a form "SETUP rtsp://192.168.1.254:2000 RTSP/1.0 1 Transport:iec61883/nonip;port=FANP" is transmitted from the first AV connection device 204 to the second AV connection device 205 (step S4804). By this command data, the first AV connection device 204 requests the transmission of data in forms of non-IP packets using the encapsulation of the IEC 61883 (that is, the RTSP "SETUP" command contains an information "iec61883/nonip" for commanding the non-IP encapsulation). In addition, in order to ascertain the link layer information and attribute information of data to be transmitted, the above command data also requests the second AV connection device 205 to notify the above information to the first AV connection device 204 by using FANP.

The RTSP "SETUP" command data is received by the HTTP/RTSP processing function 1409 and reaches to the HTTP/RTSP main processing function 1421.

At the HTTP/RTSP main processing function 1421 recognizes that the port number "2000" contained in this "SETUP" command data is the port number assigned to the DVD player 208 which is a 1394 node, so that the control is handed over to an RTSP proxy function 1422.

The RTSP proxy function 1422 searches out the corresponding 1394 AV/C command (the AV/C command indicating "power ON" in this embodiment) by referring to a table in the 1394/IP command conversion function 1423, and issues this AV/C command to the corresponding 1394 node (the DVD player 208 in this embodiment) through the 1394 AV command processing function 1408 (step S4805).

When this is successful, the second AV connection device 205 transmits the RTSP "OK" command data ("RTSP/1.0 200 1 OK Session:1234", for example) indicating the completion of control to the first AV connection device 204 (step S4806). At this point, the RTSP command is attached with a session number ("1234" in this embodiment") to be used throughout this session. The browser of the first AV connection device 204 keeps this session number, and attaches this session number "1234" to each RTSP command to be issued with respect to the same device hereafter. Here, the session number to be kept by the browser will be updated by the explicit termination of the session by the user such as the act of referring to the hyperlink corresponding to the session termination, for example, the termination of the session by the second AV connection device 205 of the correspondent side, or the re-loading of pages.

Next, suppose that the user clicks the icon i206 for "play" in the home page of FIG. 31 (step S4807). This icon i206 for "play" is set in correspondence to the RTSP "PLAY" command by the hyperlink, for example. Thus the command data of a form "PLAY rtsp://192.168.1.254:2000 RTSP/1.0 2 Session:1234" is transmitted from the first AV connection device 204 to the second AV connection device 205 (IP address "192.168.1.254", port number "2000", session number "1234") that is set in correspondence by that hyperlink (step S4808).

Upon receiving this command data, the second AV connection device 205 carries out the reservation of an isochronous channel (#x) using IEC 61883 (step S4809) and the execution of the "PLAY" command for the DVD player 208 by the 1394 AV/C protocol (step S4810) so as to urge the playing of the DVD player 208 and the transmission of the video data to the reserved isochronous channel. Then, upon receiving an "ACK" signal indicating the completion of preparation for video data transmission from the DVD player 208, the second AV connection device 205 transmits the RTSP "OK" command data ("RTSP/1.0 200 2 OK Session:1234") to the first AV connection device 204 (steps S4811 and S4812).

Then, the second AV connection device 205 transmits the video data transmitted through this isochronous channel (#x), by directly applying the encapsulation for the public network without applying the IP encapsulation, to the first AV connection device 204. For example, when the public network is the ATM network, the IEC 61883 packets transmitted to the second AV connection device 205 can be directly mapped and transmitted to the ATM network, or the IEC 61883 packets can be decapsulated once and the video data itself can be mapped and transmitted to the ATM network. In either case, the FANP message "FANP message (ch:#y, Session:1234)" is transmitted in order to notify the header information for the link layer to be transmitted by the second AV connection device 205 to the first AV connection device 204 (step S4813).

Here, the manner of using the FANP message is basically the same as in the second embodiment, but this FANP message may contain the session number ("1234" in this embodiment) identical to that notified at the step S4812 in order to make it clear that it is the FANP corresponding to the session number notified at the step S4812. In this manner, the receiving side node, i.e., the first AV connection device 204, can recognize that this FANP message corresponds to the above described RTSP "PLAY" command.

When the second AV connection device 205 outputs to the public network 202 the video data transmitted through the isochronous channel (#x) from the DVD player 208 without applying the IP encapsulation, upon receiving this video data, the first AV connection device 204 carries out the processing necessary for video display, etc. (steps S4814 to S4816). At this point, when the data transmission method dependent on a transmitting networks is defined, as in a case of transmission from the MPEG-over-1394 to the MPEG-over-ATM, for example, a necessary format conversion can also be carried out as indicated by the step S4815. Also, the case where the destination of the video is set to be the digital TV 207 can be handled similarly as the above described case.

Figure 35:
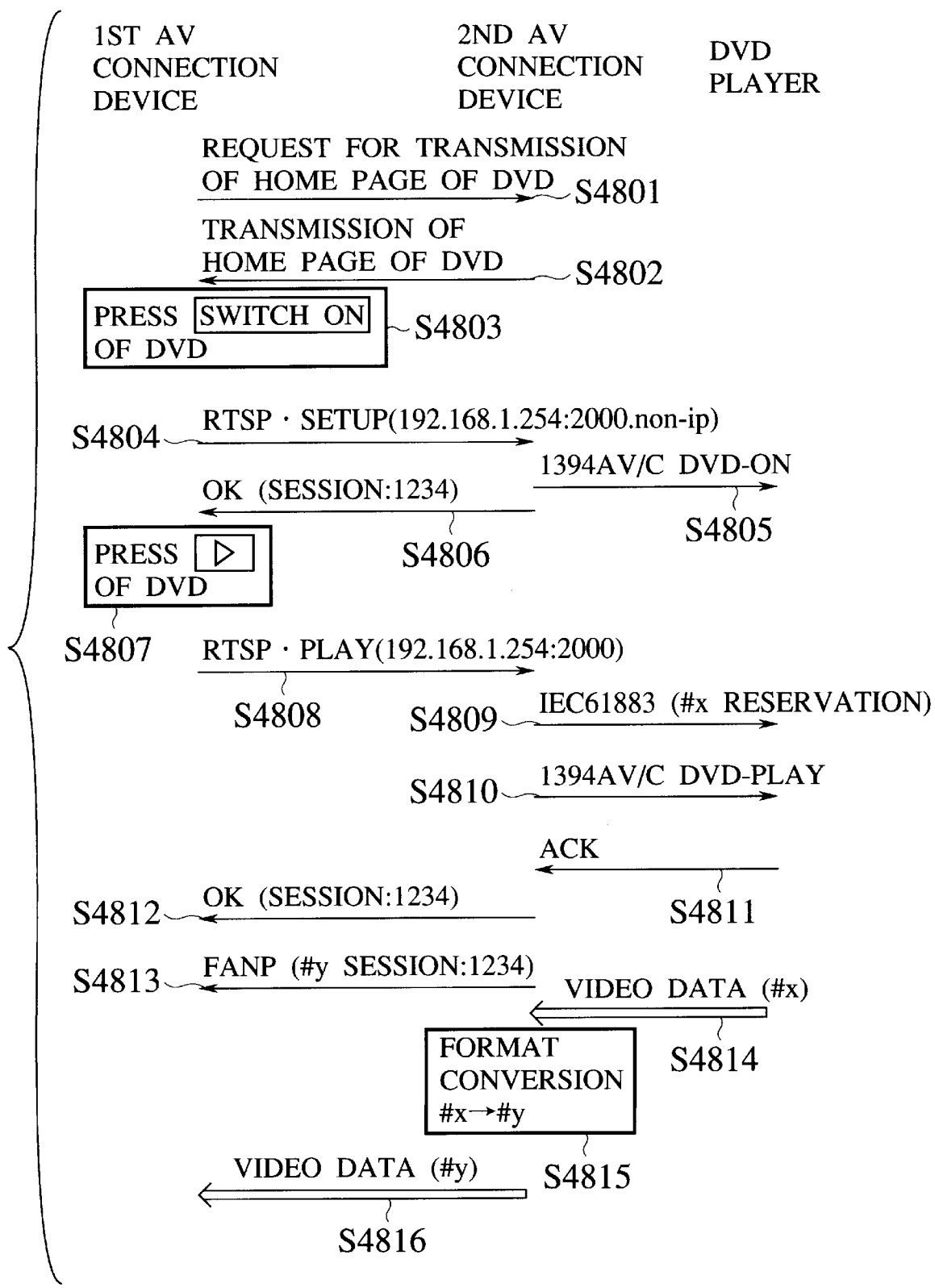
FIG. 35 is a sequence chart for another exemplary processing in the case of remote controlling a service device on the second home network in the third embodiment of the present invention.

In the above description of the third embodiment, the case where the icon or character string in the home page is set in correspondence by the hyperlink to the RTSP command for remote controlling the service providing device has been described, but instead of establishing the correspondence by the hyperlink, it is also possible to attach a program for generating the corresponding RTSP command data (such as JAVA (trademark) program) to each icon or character string in the home page that corresponds to each RTSP command, such that this program is activated at the first AV connection device 204 (by a virtual JAVA machine on the first AV connection device 204, for example) and the RTSP command as described in relation to FIG. 32 and FIG. 35 is outputted when an icon or character string is clicked.

Figure 40:
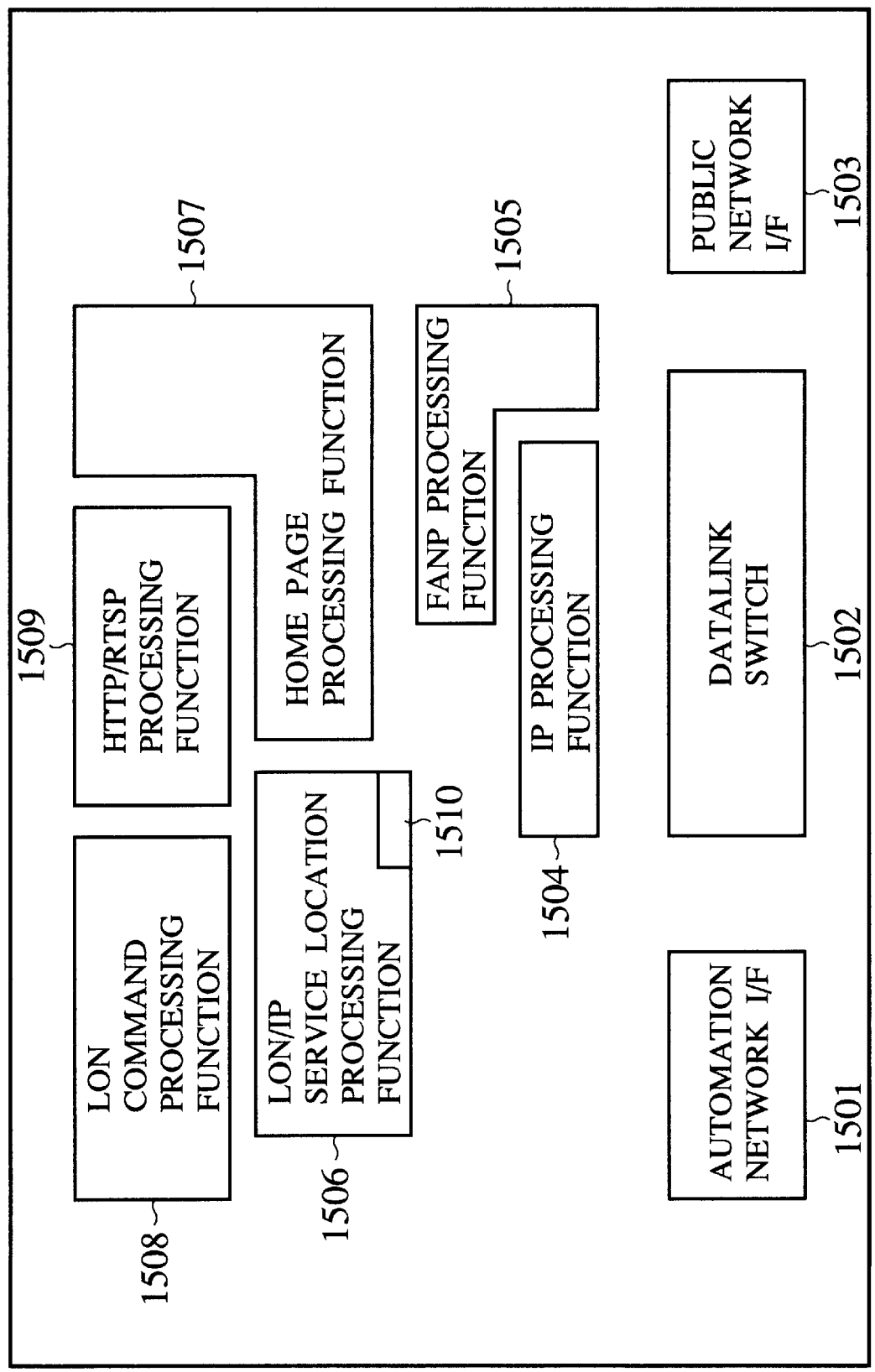
FIG. 40 is a block diagram showing an exemplary internal configuration of an AV connection device to be connected with LON in a network system according to the third embodiment of the present invention.
Figure 43:
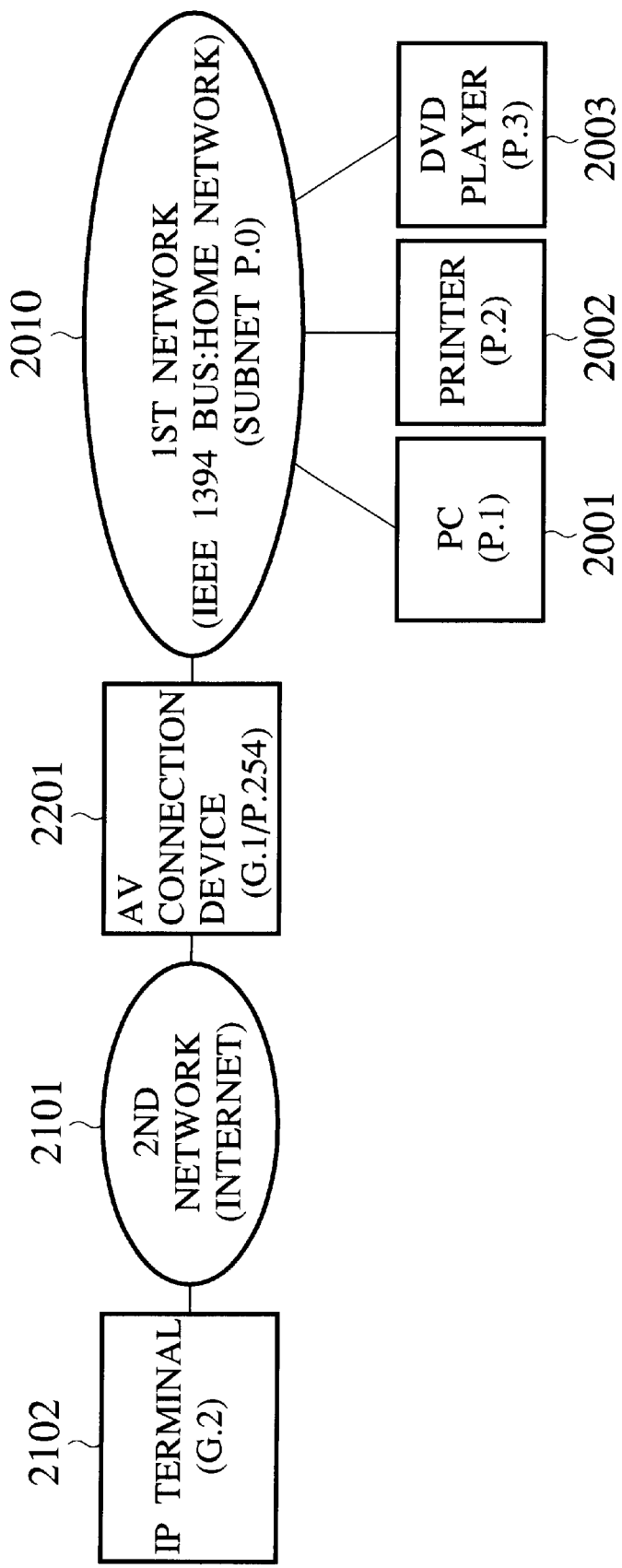
FIG. 43 is a block diagram showing an exemplary overall configuration of a network network according to the fourth embodiment of the present invention.

The operation in such a case is similar to those of FIG. 32 and FIG. 35, except for the text description for the home page of the service providing device to be transmitted from the second AV connection device at the step S4504 of FIG. 40 or the step S4802 of FIG. 43.

An exemplary text for the home page of the service providing device in such a case is shown in FIG. 36. Here, FIG. 36 shows the text for the home page of the DVD player, where a program for generating the RTSP command is attached to the icon i206 for "play" of the home page of FIG. 31, for example.

In this case, again, when the icon i206 for "play" is clicked, it becomes possible to transmit the RTSP "PLAY" command to a desired port of a desired node by activating the program for generating the RTSP "PLAY" command. so that it becomes possible to realize the remote control of the service providing device using RTSP.

Next, an icon (button) i210 for "detail setting" in the home page of FIG. 31 will be described. This button is to be used when it is desired to carry out more sophisticated operation with respect to the target service providing device (the DVD player 208, for example) than the remote control prescribed by the RTSP commands. Namely, the control commands of the DVD player 208 defined by the AV/C protocol of the IEEE 1394 may possibly be more multifarious than the commands defined by the RTSP. As a measure to cope with such a case where all the commands of the 1394 AV/C cannot be handled by the RTSP commands, a dedicated home page for this purpose is provided separately so that, when the "detail setting" button of FIG. 31 is pressed, a command of a form "GET/appliances/dvd_detail.html HTTP/1.1" for example that is set in correspondence to that button is outputted and a "home page for detail setting of DVD player" as shown in FIG. 39 is transmitted.

Figure 37:
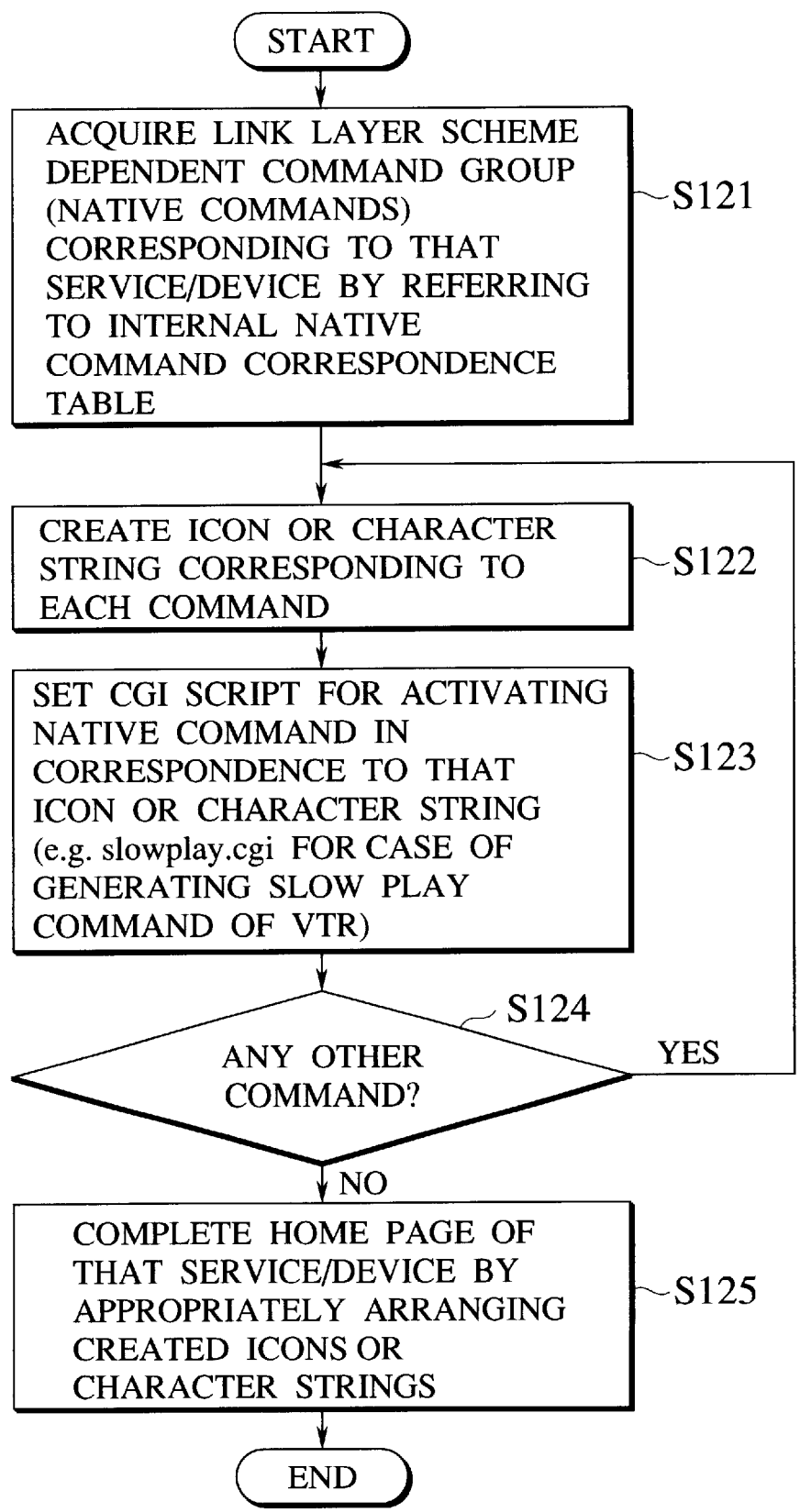
FIG. 37 is a flow chart for a procedure to create a home page for detail setting of a service providing device in the third embodiment of the present invention.

FIG. 37 shows the processing procedure for creating the home page for detail setting of the service providing device. In this case, the 1394/IP service location processing function 1406 separately has a native command correspondence table which registers commands (native commands) which are dependent on the link layer scheme (the AV/C protocol of the IEEE 1394 in this embodiment) of that service providing device and for which the correspondence is not established in the above described command table 1410 for each service providing device. In the procedure of FIG. 37, the native commands are acquired by referring to the native command table for each service providing device (step S121), and an icon or character string corresponding to each command is created (step S122). Then, the created icon or character string is set in correspondence to the CGI (Common Gateway Interface) script (step S123). This operation is carried out for all the native commands of that service providing device, and the home page for detail setting of the service providing device as shown in FIG. 39 for example is created by appropriately arranging the created icons or character strings (steps S124 and S125).

Figure 34:
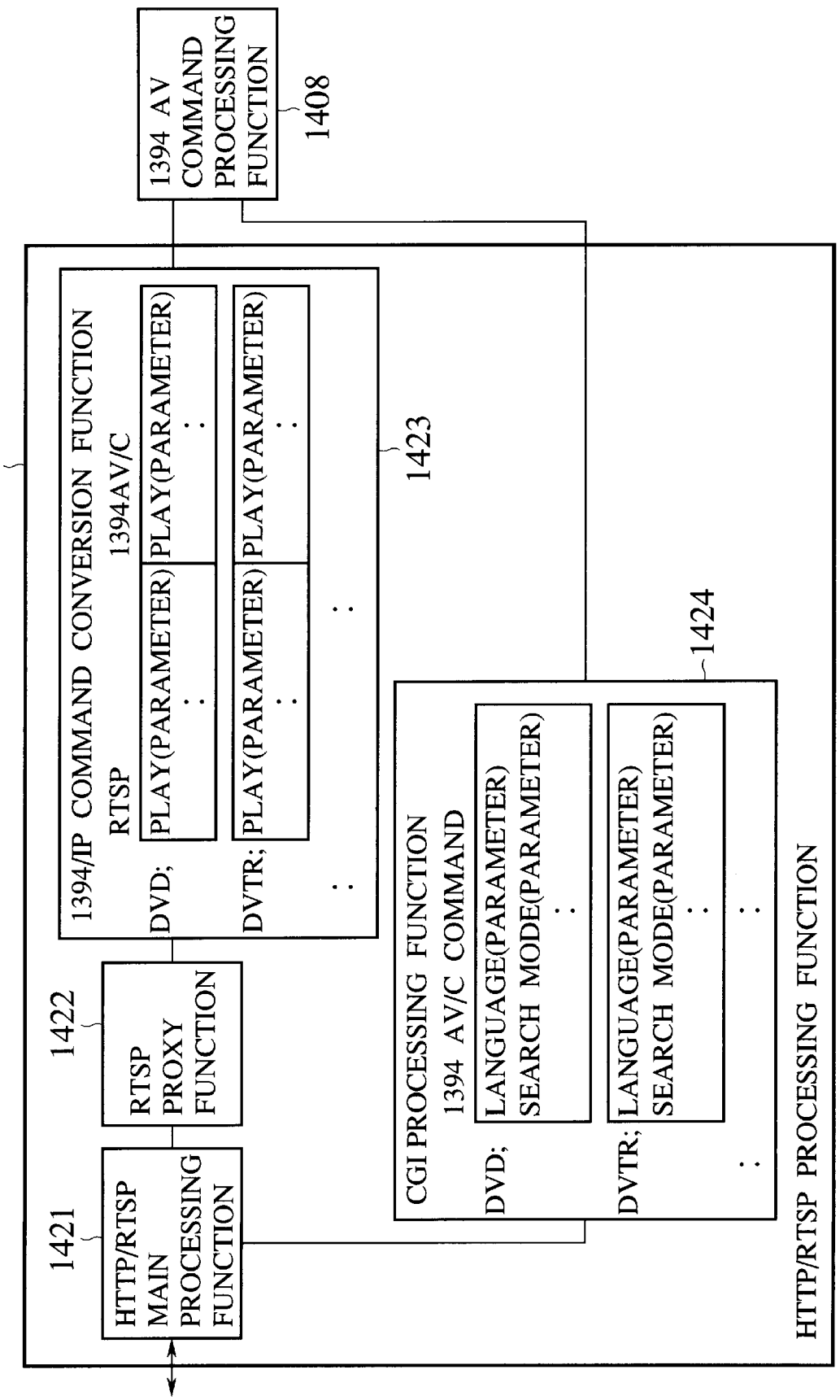
FIG. 34 is a block diagram showing an exemplary configuration of an HTTP/RTSP processing function in the AV connection device of FIG. 27.

Note that the native command correspondence table may be the same as a table in a CGI processing function 1424 provided in the HTTP/RTSP processing function shown in FIG. 34.

Figure 39:
FIG. 39 is a diagram showing an exemplary home page for detail setting of a service providing device (DVD player) in the third embodiment of the present invention.

Here, some of the buttons (icons or character strings) arranged in the home page for detail setting of the DVD player shown in FIG. 39 are set in correspondence to the CGI scripts by the CGI processing function in the second AV connection device 205. Then, each CGI script is a script for transmitting the corresponding AV/C command of the IEEE 1394 to the IEEE 1394 bus of the second home network, so that it is possible to carry out the control in granularity specified by the AV/C protocol by simply clicking the above described icon or character string.

When the home page for detail setting is created in this manner and an icon or character string in that home page is clicked, a request message for activating the CGI script in the second AV connection device 205 that is set in correspondence to that icon or character string is transmitted by HTTP, and upon receiving this request message, the second AV connection device 205 activates that CGI script and the corresponding AV/C command is issued.

Figure 38:
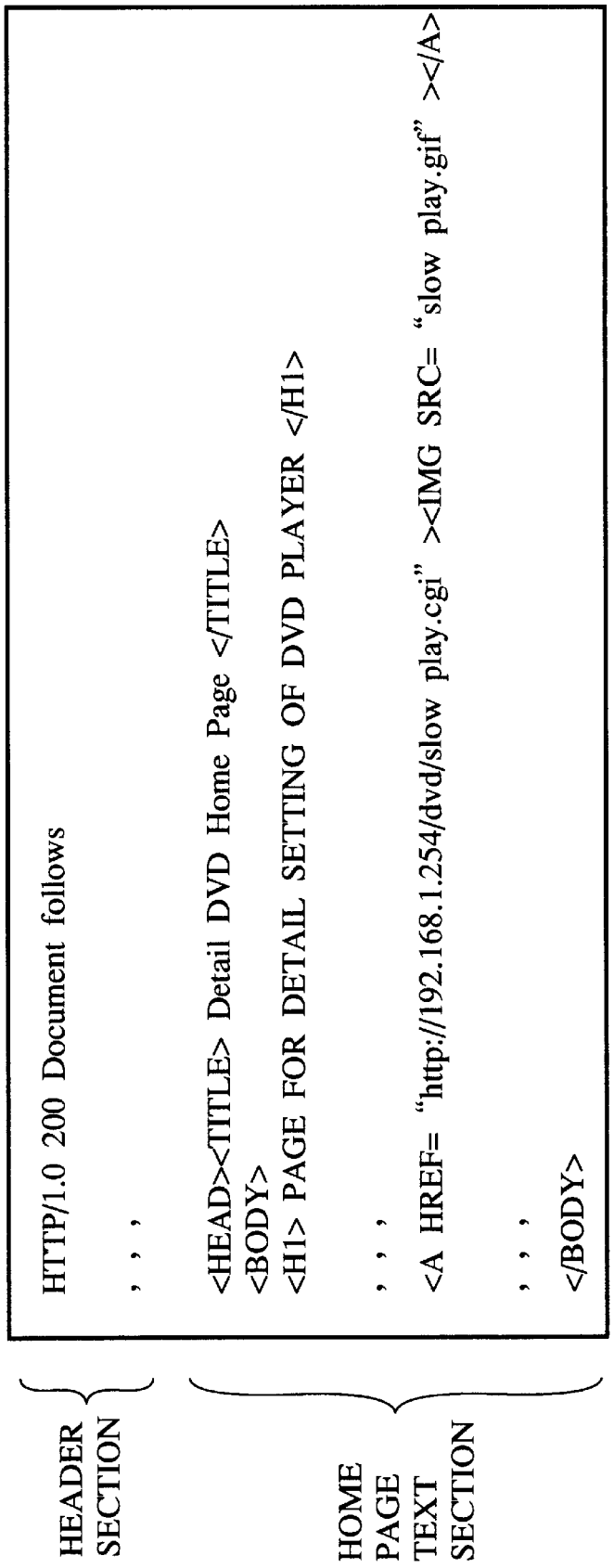
FIG. 38 is a diagram showing an exemplary home page text of a home page for detail setting of a service providing device (DVD player) in the third embodiment of the present invention.

FIG. 38 shows an exemplary text description for the "home page for detail setting of DVD player", for example, which is to be transmitted from the second AV connection device 205. This FIG. 38 shows an exemplary case of setting the CGI script in correspondence to the character string "slow play" shown in FIG. 39.

When "normal play" in the "home page for detail setting of DVD player" is selected in FIG. 39, the RTSP command is issued similarly as the step S4508 of FIG. 32 described above, but for the command that is not supported by the RTSP such as "language" or "slow play", the CGI processing function 1424 provided in the HTTP/RTSP processing function of the second AV connection device 205 activates the corresponding CGI script and issues the corresponding AV/C command through the 1394 AV command processing function 1408.

For example, when "slow play" is selected in the home page shown in FIG. 39, a message of a form "GET http://192.168.1.254/dvd/slowplay.cgi HTTP/1.1" for activating the corresponding CGI script is transmitted toward the second AV connection device 205. Upon receiving this message, at the second AV connection device 205, the CGI processing function 1424 provided in the HTTP/RTSP processing function activates the corresponding CGI script and issues the corresponding AV/C command through the 1394 AV command processing function 1408, because the command for "slow play" is not supported by the RTSP.

In the home page for detail setting of the service providing device, the icons or character strings corresponding to the RTSP commands and the icons or character strings corresponding to the CGI scripts may coexist, but it is also possible to form this home page only by the icons or character strings corresponding to the CGI scripts. For example, it is possible to realize the commands contained in the RTSP command correspondence table such as those for "play", "power ON" and "power OFF" buttons by the hyperlinks, JAVA programs, etc., while the other detail commands such as "language" and "superimpose" are realized by the CGI.

It is also possible to register all of the buttons arranged in the home page for detail setting of FIG. 39 in the native command correspondence table and set them in correspondence to the CGI scripts.

In the above description of the third embodiment, the case of the remote control of an AV device that obeys the AV/C commands on the IEEE 1394 bus has been described, but the similar control can be realized similarly for a device that has a protocol group dependent on any other arbitrary link layer. As an example, the case of an application to the LON which is a kind of home automation network will now be described.

Figure 41:
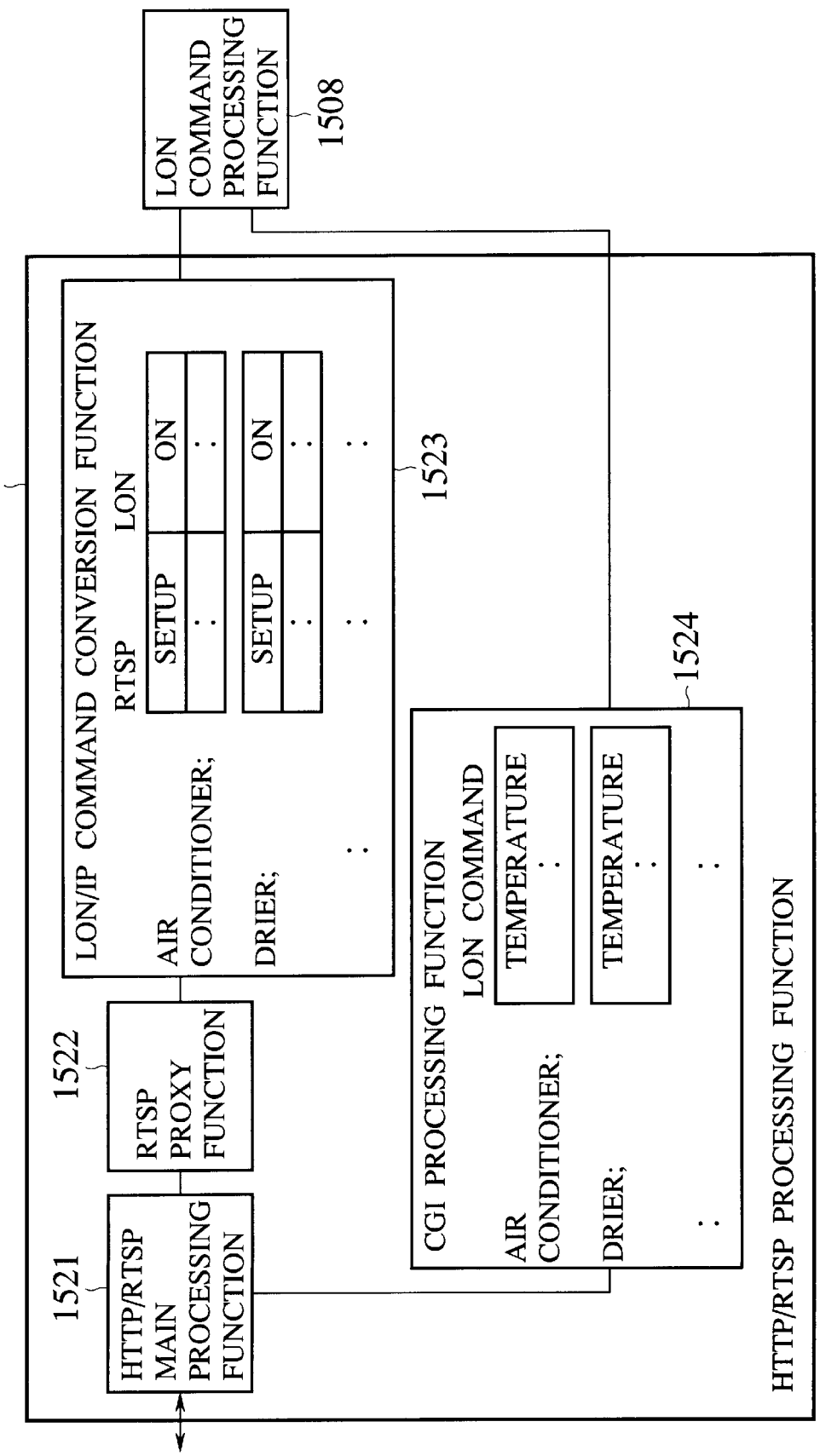
FIG. 41 is a block diagram showing an exemplary configuration of an HTTP/RTSP processing function in the AV connection device of FIG. 40.

FIG. 40 shows an exemplary internal configuration of the AV connection device to be connected with the LON and FIG. 41 shows an exemplary configuration of the HTTP/RTSP processing function in this case. They differ from those of FIG. 27 and FIG. 34 respectively in that they are capable of transmitting a command group defined by the LON such as LONtalk, for example, instead of the AV/C commands of the IEEE 1394. The rest of these configurations of FIG. 40 and FIG. 41 are the same as described above.

Note that each function described in this third embodiment can also be realized as software. It is also possible to implement a computer readable medium that stores programs for causing the computer to execute each function or means described above.

As described, according to the second and third embodiments described above, it becomes possible to realize a uniform service providing environment without relying on a particular network.

Fourth Embodiment

Referring now to FIG. 43 to FIG. 51, the fourth embodiment of the present invention will be described in detail.

FIG. 43 shows an exemplary configuration of a communication system according to the fourth embodiment, in which a first network (a home network formed by the IEEE 1394 bus, for example) 2010 and a second network (Internet on a public network, for example) 2101 are inter-connected through an AV connection device 2201. In the following, the first network 2010 and the second network 2101 will be referred to as the home network 2010 and Internet 2101, respectively, for the sake of clarity.

The AV connection device 2201 plays a role of a gateway for connecting the home network 2010 and Internet 2101, and has functions including a terminal function for terminating the home network and Internet, a router function a protocol conversion function, and a proxy server function, as will be described in detail below.

The IEEE 1394 bus that constitutes the home network 2010 is connected with a PC 2001, a printer 2002, and a DVD player 2003. Internet 2101 is connected with an IP terminal 2102 which is capable of carrying out IP communications. Note that devices other than those shown in FIG. 43 may also be connected to each network, if desired.

In FIG. 43, all the devices are Internet terminals which have IP addresses and which can carry out IP communications. However, the IEEE 1394 bus that constitutes the home network 2010 is operated using addresses in the private address space while Internet 2101 is operated using global IP addresses (such as IPv4, for example). The IP terminal 2102 is assumed to have the IP address "G.2". As for the addresses of the devices on the home network 2010, the home network 2010 has a private subnet address "P.0", and the private addresses of the PC 2001, the printer 2002 and the DVD player 2003 are "P.1", "P.2" and "P.3", respectively.

The AV connection device 2201 has two addresses of two different address systems as it is connected to networks using these two address systems. Namely, the AV connection device 2201 has an address "P.254" on the home network 2010 side and an address "G.1" on Internet 2101 side.

Figure 44:
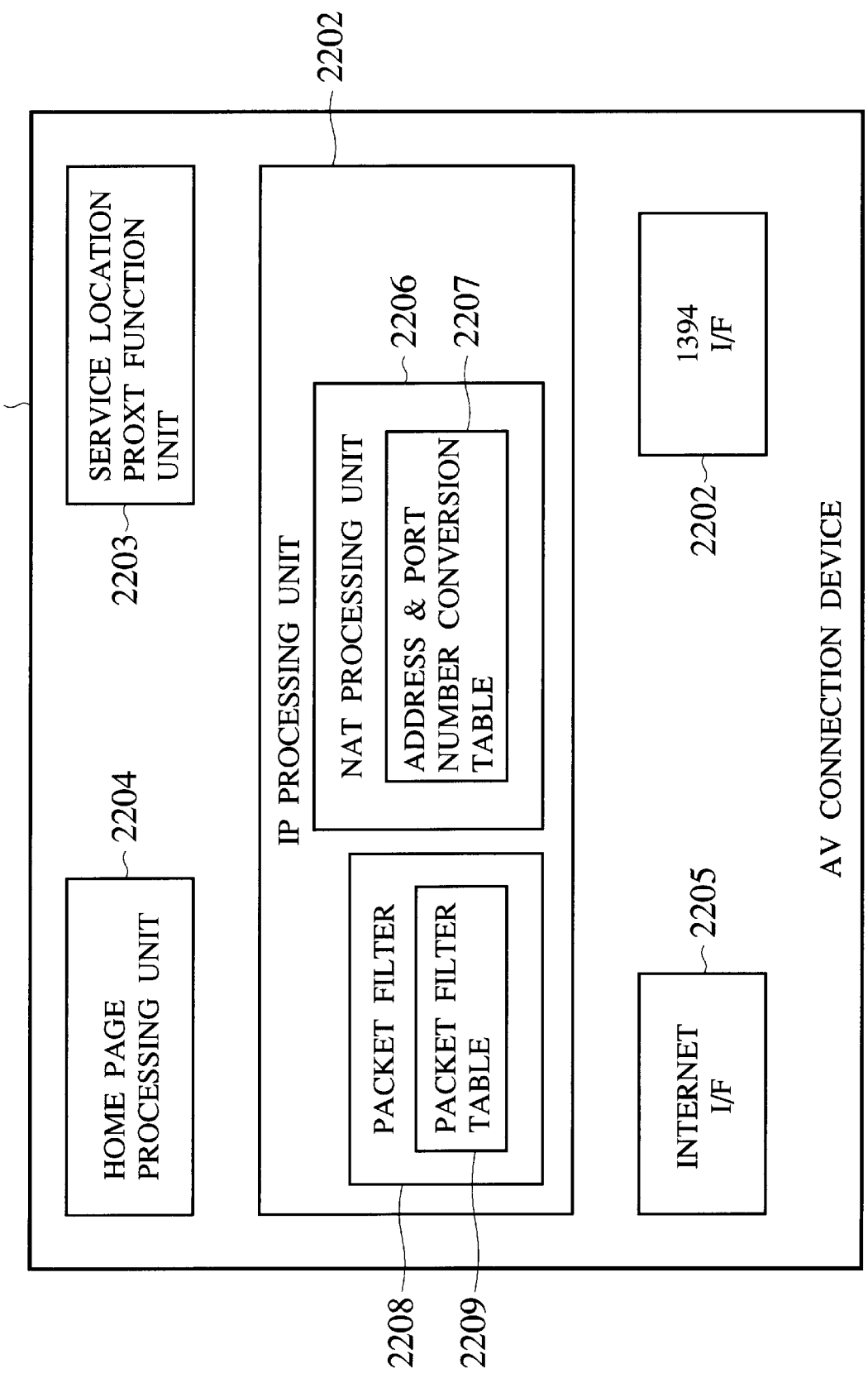
FIG. 44 is a block diagram showing an exemplary internal configuration of an AV connection device in the network system of FIG. 43.

FIG. 44 shows an exemplary configuration of the AV connection device 2201. This AV connection device 2201 of FIG. 44 comprises: a 1394 Interface (I/F) 2202 that functions as an interface for connection with the IEEE 1393 bus that constitutes the home network 2010; an Internet interface (I/F) 2205 that functions as an interface for connection with Internet 2101; an IP processing unit 2202 for carrying out the routing processing for Internet packets, the address conversion between the global IP address and the private IP address, etc.; a service location proxy processing unit 2203 for detecting and collecting services within the home network 2010 and advertising these services to Internet 2101 side through a home page processing unit 2204; and a home page processing unit 2204 for creating home pages for the devices/services on the home network 2010 that enables remote control of the devices/services from Internet 2101 side, and delivering the home pages in response to requests.

The IP processing unit 2202 has a NAT processing unit 2206 for carrying out the NAT (Network Address Translation) processing which realizes translation between the global IP address and the private IP address or between the IPv4 address and the IPv6 address in general. For more detail of the NAT, see RFC 1631.

The NAT processing unit 2206 also has an address translation function in port units called IP masquerade. This is a technique for making a single global IP address ("G.1" in this embodiment) on the home network 2010 side sufficient even when there are many terminals on the home network 2010 side. More specifically, the same global IP address "G.1" and different port numbers are allocated to different devices or applications (ports) on the home network 2010 side, and the correspondence between them is stored as an address and port number conversion table 2207 as shown in FIG. 47. Then, a packet to be transferred from one of Internet 2101 and the home network 2010 to the other is transferred by converting its destination address or source address into the address (and the port number) of the other's address space by using this address and port number conversion table 2207, so that it becomes possible to carry out communications between a device on Internet 2101 and a device on the home network 2010.

The IP processing unit 2202 also has a packet filter 2208, which has a function of the so called firewall. Namely, the packet filter 2208 judges a packet that should not pass through the AV connection device 2201 (or a packet that may pass) and limits an access to the home network 2010 from the external by not handing the packet that should not pass to any parts other than the IP processing unit 2202, so as to prevent an access to the service on the home network 2010 by a malicious user. For the purpose of this judgement processing, the packet filter 2208 has a packet filter table 2209 that registers source addresses of those packets that may pass through the AV connection device 2201, for example, so that the packet filter 2208 allows a packet incoming from Internet 2101 to pass through when its source address is registered in this packet filter table 2209. Note that the packet filter table 2209 may register source addresses of those packets that may not pass through the AV connection device 2201 instead.

Next, with reference to the sequence chart of FIG. 45, the operation of the AV connection device 2201 will be described for an exemplary case of making an access from the IP terminal 2102 on Internet 2101 to the home network 2010 and carrying out remote control of the DVD player 2003.

First, the service location proxy processing unit 2203 of the AV connection device 2201 collects the service location information on the home network 2010 (steps S5001 to S5003). Here, the service location information is an information indicating what services or devices are existing on the home network 2010. A method for collecting the service location information can be any one of a method using the service location protocol, a method using LDAP (Lightweight Directory Access Protocol), a method using DHCP (Dynamic Host Configuration Protocol), a method using MIB (Management Info-Base) of SNMP (Simple Network Management Protocol), etc.

Here, it is assumed that the service location information on the home network 2010 is collected by using the service location protocol as shown in FIG. 12 described above, for example. For more detail of the service location protocol, see RFC 2165. The actual collection of the service location information may be realized as shown in FIG. 45 where the AV connection device 2201 functions a directory agent of the home network 2010 and the service agents (that is, the PC 2001, the printer 2002 and the DVD player 2003) carry out registration of the respective services to the AV connection device 2201.

Alternatively, it is also possible to adopt a method in which the AV connection device 2201 transmits a service request to an IP multicast address assigned in advance to each service that can be supported by the AV connection device 2201, and the device that provides the corresponding service answers in response to this request. It is also possible to adopt a method in which the AV connection device 2201 inquires about details of services on the home network 2010 to a directory agent which is separately provided on the home network 2010.

Figure 46:
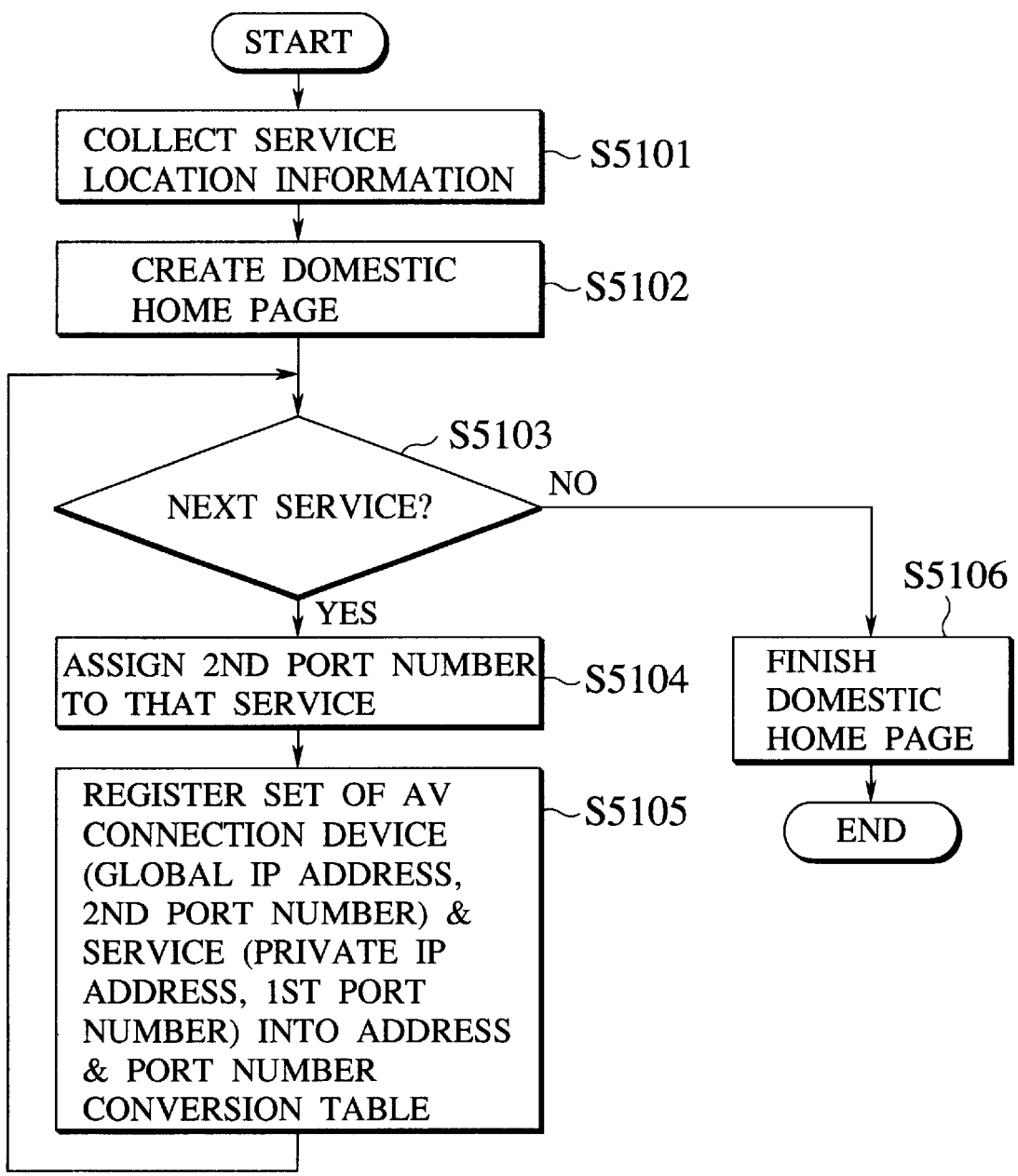
FIG. 46 is a flow chart for the initial operation of the AV connection device of FIG. 44 in the case of controlling a device connected to the first home network from the second home network.

Then, according to the information regarding a service provided on the home network 2010 as collected here (more specifically, an address of a device on the home network 2010 and an identifier (a port number as defined by RFC 1340) of a service provided by that device), the operation as shown in the flow chart of FIG. 46 is carried out.

Namely, the AV connection device 2201 creates a home page explaining what services or devices exist at a home of the owner (Mr. A, for example) of the home network 2010, at the home page processing unit 2204 (steps S5101 and S5102).

This home page is as shown in FIG. 51, for example, which is a home page to be displayed when an access is made to the URL (Uniform Resource Locator) of Mr.A's home, i.e., "http://G.1" for example, from arbitrary terminal on Internet 2101. This home page functions as a user interface from which each service or device existing at Mr. A's home can be operated using the CGI (Common Gateway Interface) program, for example. In practice, links are connected from this home page to the devices on the home network 2010 so that, when an object of each device is clicked in this home page, a home page of that device is displayed next, where remote control is supported in a form of an operation user interface for that device which is provided by that device.

Next, the service location proxy processing unit 2203 assigns a separately defined logical multiplex identifier, such as a port number (one that can be set up dynamically and not a well known one) as defined by RFC 1340 for example, to each of the services or devices whose information has been collected (step S5104). Thereafter, the port numbers defined on the home network 2010 in advance will be referred to as first port numbers, while the port numbers separately assigned by the service location proxy processing device 2203 with respect to the services on the home network 2010 will be referred to as second port numbers in clear distinction from the first port numbers.

Here, the second port number "2000" is assigned to the DVD player 2003, the second port number "2002" is assigned to the printer 2002, and the second port number "2004" is assigned to the PC 2001, for example. These port numbers are to be used in set with the global IP address of the AV connection device 2201. Namely, when an access to the second port number "2000" is made by Internet 2101 side, for example, the AV connection device 2201 interprets that as an access with respect to the DVD player 2003. Note that the logical multiplex identifier is not necessarily limited to a port number defined by RFC 1340, and can be any identifier by which each service provided on the home network 2010 can be identified at Internet 2101 side.

The address and port number correspondence table 2208 registers the correspondence among the global unique IP address of the AV connection device 2201, the second port number assigned to each service provided on the home network 2010, the first port number as an identifier of that service on the home network 2010, and the private IP address of a device that provides that service (step S5105).

FIG. 47 shows an exemplary content of the address and port number correspondence table 2207. In this example, the address and port number correspondence table 2207 registers a set of the IP address (global unique IP address) and the second port number of Internet 2101 side and a set of the IP address (private IP address) and the first port number of the home network 2010 side, in pair for each service provided on the home network 2010. The correspondence for every service provided on the home network 2010 is sequentially registered into this address and port number correspondence table 2207.

For example, in the case of the DVD player 2003, the global IP address "G.1" of the AV connection device 2201 and the second port number "2000" are assigned to the service of the DVD player in the home network 2010 (IP address (which is interpreted by the service location protocol as an http service by the DVD player which is provided at the private IP address)=P.3 and the first port number=80), with respect to Internet 2101 side.

Such an address and port number conversion table 2207 is produced for each service at Mr.A's home, and for each of these, the description into the home page of Mr. A's home is made.

When the registration into the address and port number conversion table 2207 is completed for all the services at Mr. A's home, the production of the address and port number conversion table 2207 and the creation of the home page for Mr. A's home are finished (step S5106).

Now, the address and port number conversion table 2207 so produced is used in carrying out the IP address and port number conversion processing when an IP packet passes through the AV connection device 2201. This IP address and port number conversion processing using the address and port number conversion table 2207 will be described more concretely with reference to FIG. 50. For example, an IP packet with a destination IP address "G.1" and a destination port number "2000" that comes from Internet 2101 side is converted into an IP packet with a destination IP address "P.3" and a destination port number "80" by referring to the address and port number conversion table 2207, and then transmitted to the home network 2010 side. Conversely, an IP packet with a source IP address "P.3" and a source port number "80" that comes from the home network 2010 side is converted into an IP packet with a source IP address "G.1" and a source port number "2000" by referring to the address and port number conversion table 2207, and then transmitted to Internet 2101 side.

After the production of the address and port number conversion table 2207 and the creation of the home page of Mr. A's home are completed, the AV connection device 2201 discloses this home page on Internet 2101 as the home page of Mr. A's home, as shown in FIG. 51.

Next, the case where a user of the IP terminal 2102 on Internet 2101 carries out remote control of the DVD player 2003 at Mr. A's home will be described.

Figure 48:
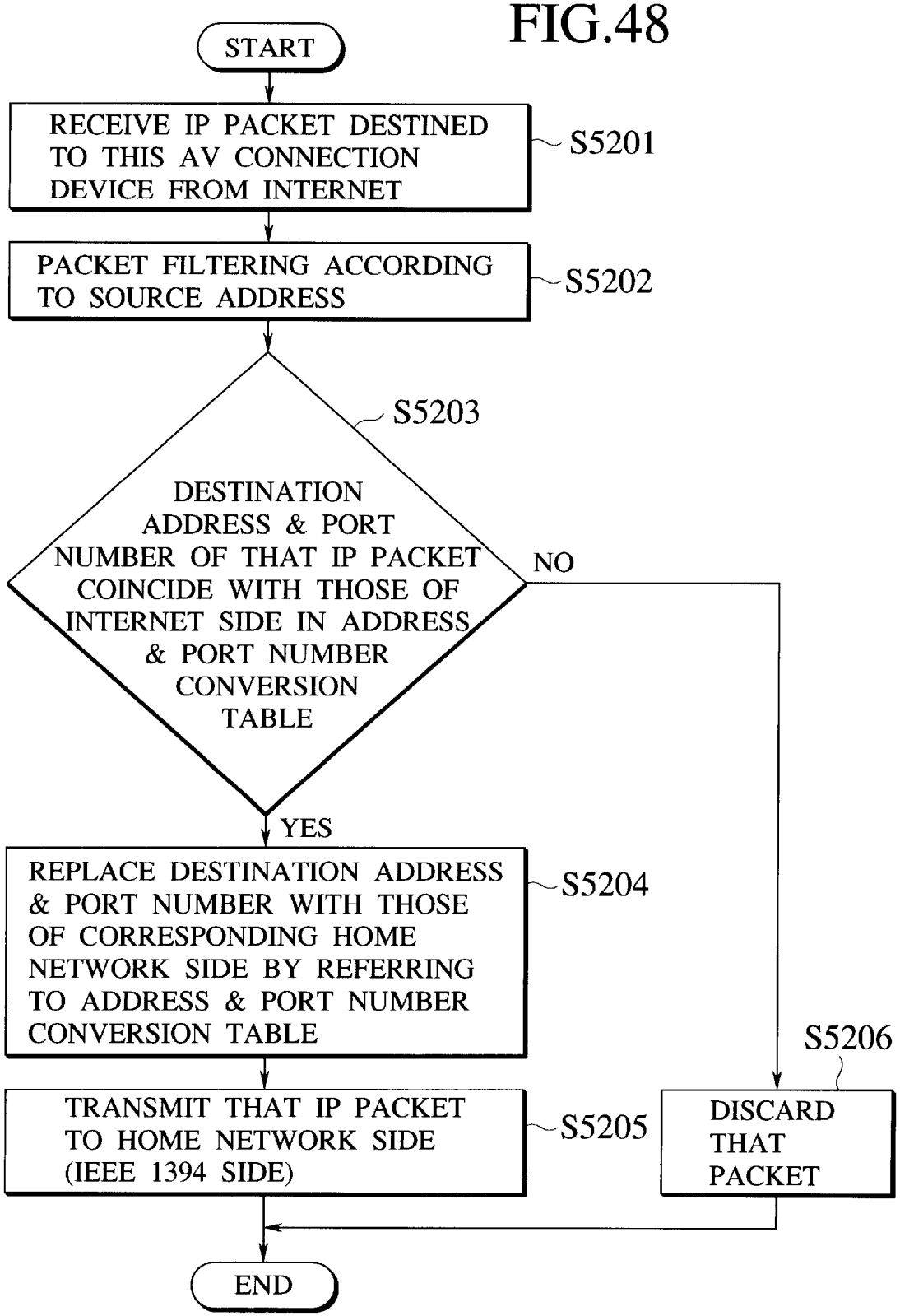
FIG. 48 is a flow chart for the subsequent operation of the AV connection device of FIG. 44 in the case of receiving an IP packet from Internet side.
Figure 49:
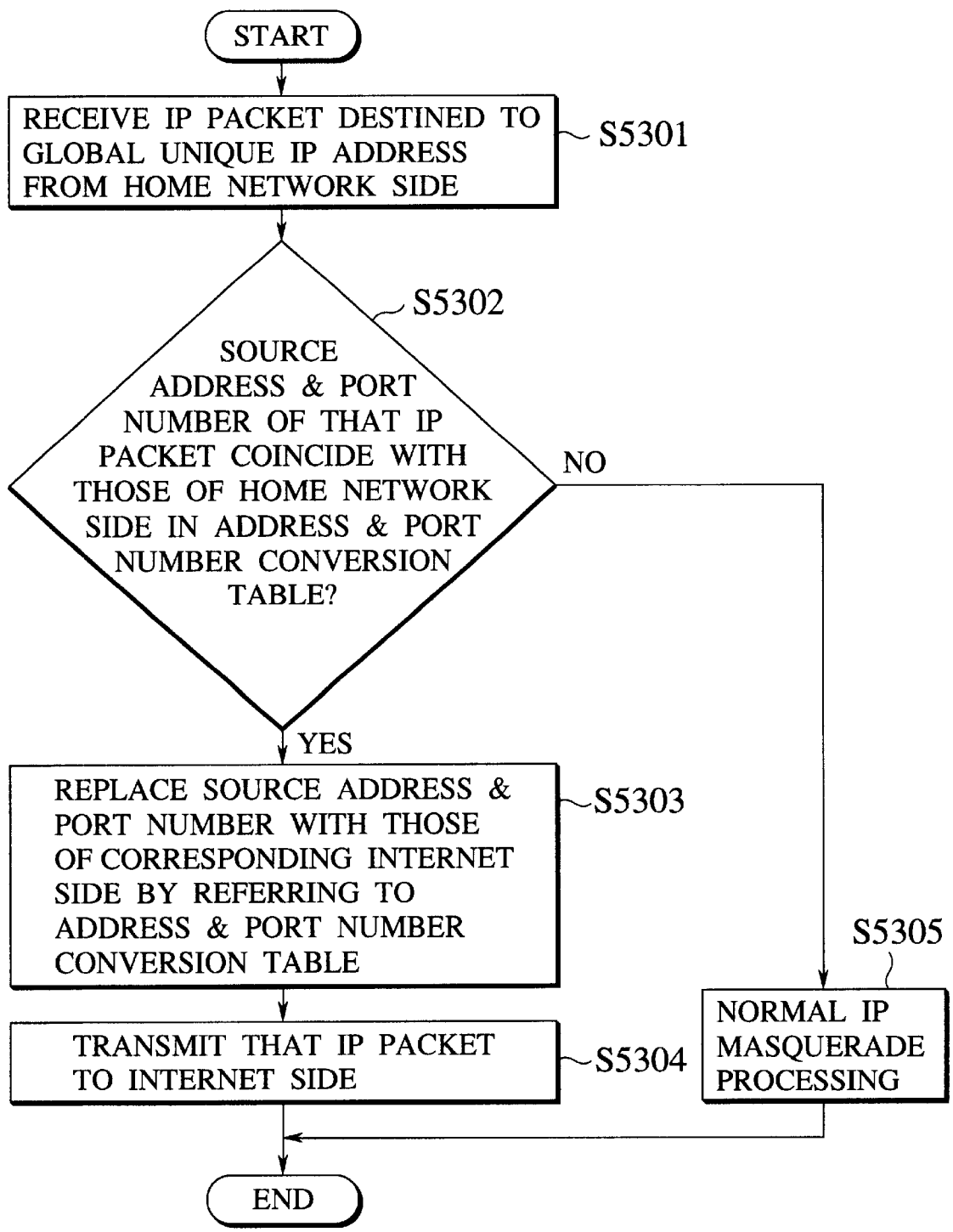
FIG. 49 is a flow chart for the subsequent operation of the AV connection device of FIG. 44 in the case of receiving an IP packet from the home network side.
Figure 50:
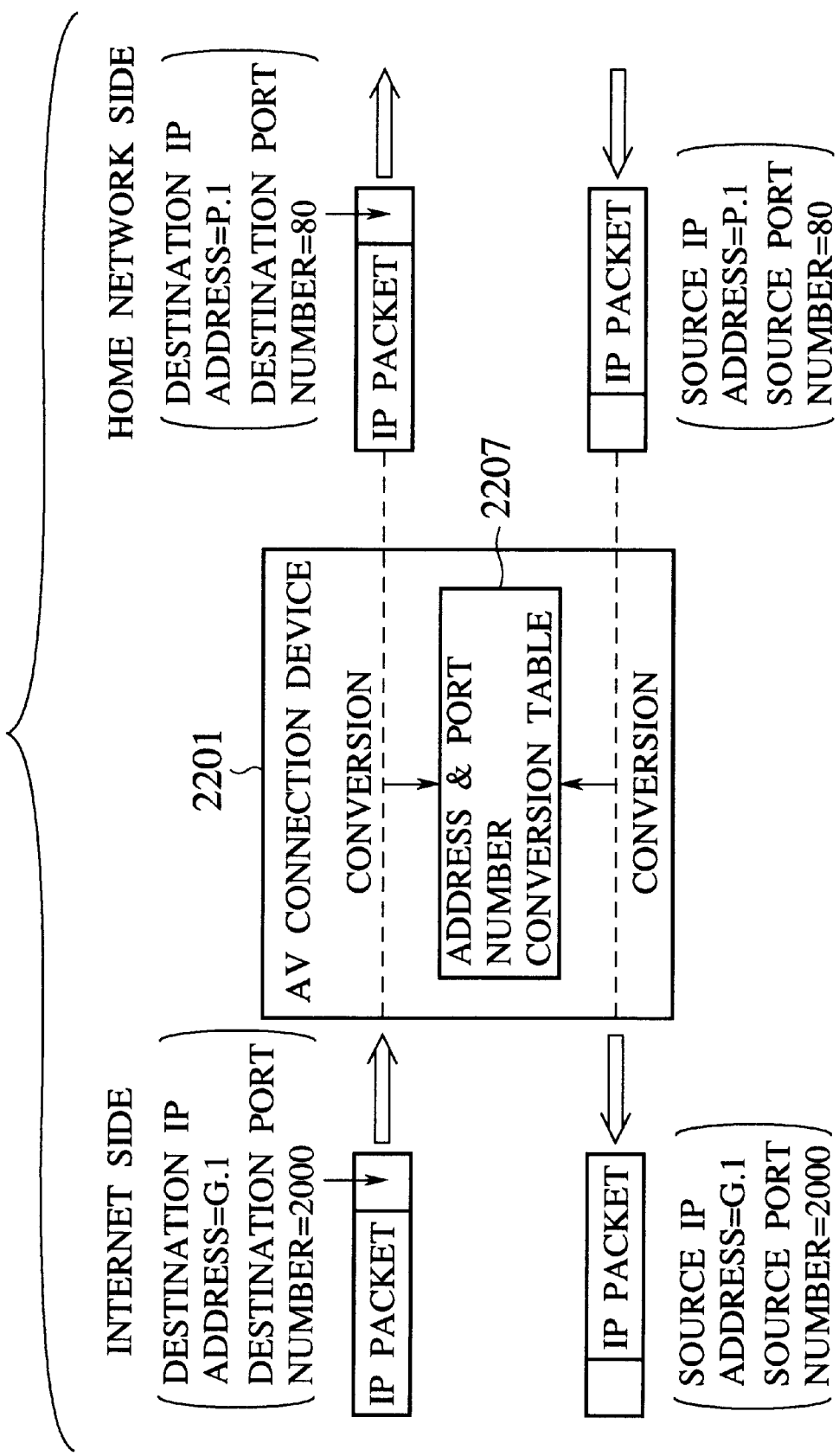
FIG. 50 is a diagram for explaining the IP address and port number conversion processing using the address and port number conversion table in the AV connection device of FIG. 44.

FIG. 48 shows the operation of the AV connection device 2201 in the case of receiving an IP packet from Internet 2101 side, and FIG. 49 shows the operation of the AV connection device 2201 in the case of receiving an IP packet from the home network 2010 side. In the following, these operations will be described with references to FIGS. 48 and 49 as well as FIG. 45.

First, the IP terminal 2102 carries out the authentication procedure (step S5004 of FIG. 45) in order to request transmission of the home page of Mr. A's home to the AV connection device 2201. For example, the password input is requested to the user of the IP terminal 2102, and only when the user is authenticated in this manner, the IP address of the IP terminal 2102 is registered into the packet filter table 2209 described above.

The packet filter table 2209 is a table that simply enumerates IP addresses, and only the IP addresses registered on this table are allowed to make accesses to the home network 2010 and the services provided on the home network 2010.

Next, the IP terminal 2102 requests transmission of the home page of Mr. A's home to the AV connection device 2201 (step S5005). Then, the packet filter 2208 checks whether the source address of that packet for requesting transmission of the home page is registered in the packet filter table 2209 or not (step S5006), and only when its source address is registered in the packet filter table 2209, this packet is given to the home page processing unit 2204. In response to this request, the home page processing unit 2204 carries out the transmission of the home page of Mr. A's home to the IP terminal 2102 (step S5007).

The home page to be transmitted here is attached with respective home pages of the DVD player 2003, the printer 2002 and the PC 2001 on the home network 2010. For example, an icon or character string for "DVD player" on the home page of FIG. 51 is linked to the home page of the DVD player 2003. The actual link target address is the global IP address "G.1" of the AV connection device 2201 and the second port number "2000", so that the AV connection device 2201 formally functions as a proxy server for access to the devices on the home network 2010. This fact is obviously not recognized from the IP terminal 2102. Here, however, unlike the proxy server processing, the processing to be actually carried out by the AV connection device 2201 is the IP masquerade processing, i.e., the IP address and port number conversion processing, as described below.

Next, the user of the IP terminal 2102 transmits a request for transmission of the home page of the DVD player in order to remote control the DVD player 2003 (step S5008). For example, an IP packet for requesting transmission of the home page of the DVD player is transmitted by clicking an icon or character string for "DVD player" on the home page shown in FIG. 51. The destination of this packet is the destination IP address "G.1" and the destination port number "2000".

Now, the operation of the AV connection device 2201 upon receiving this IP packet, that is, the packet filtering processing and the address and port number conversion processing of the steps S5009 and S5010 of FIG. 45, will be described with reference to the flow chart of FIG. 48.

Namely, the AV connection device 2201 checks that it is the destination of the received IP packet by referring to the destination address of the received IP packet (step S5201), and then carries out the packet filtering processing by referring to the packet filter table 2209 (step S5202). When the source address of this packet is registered in the packet filter table 2209, whether a set of the destination IP address and the destination port number of this packet is registered in the address and port number conversion table 2207 or not is checked (step S5203). If it is registered, these destination IP address and destination port number are replaced by the corresponding IP address (private IP address) and first port number of the home network side (step S5204), and this IP packet is transmitted to the home network 2010 (step S5205). In this manner, the address conversion from the global IP address and the second port number to the private address and the first port number is carried out.

On the other hand, when the set of the destination IP address and the destination port number of this packet is not registered in the address and port number conversion table 2207, and when this packet is not destined to this AV connection device 2201, this packet is discarded (step S5206).

Returning now to FIG. 45, the IP packet which is applied with the address and port number conversion processing (IP masquerade processing) and transmitted to the home network 2010 side reaches to the DVD player 2003 (step S5011). Then, the DVD player 2003 transmits the home page of the DVD player 2003 with the global IP address of the IP terminal 2102 as the destination address. At this point, the IP packet for this home page transmission has the private IP address "P.3" as the source IP address and the first port number "80" as the source port number (step S5012).

Next, the operation of the AV connection device 2201 upon receiving the IP packet containing the home page of the DVD player 2003 from the home network 2010 side, that is, the address and port number conversion processing of the step S5013 of FIG. 45, will be described with reference to the flow chart of FIG. 49.

Namely, the AV connection device 2201 checks whether a set of the source IP address and the source port number of the received IP packet is registered in the address and port number conversion table 2207 or not (step S5301 and S5302). If it is registered, these source IP address and source port number are replaced by the corresponding IP address (global unique IP address) and second port number of Internet side (step S5303), and this IP packet is transmitted to Internet 2101 side (step S5304).

On the other hand, when the set of the source IP address and the source port number of this packet is not registered in the address and port number conversion table 2207, the normal IP masquerade processing is carried out (step S5305). Namely, the set of source address and source port number of this IP packet is newly registered into the address and port number conversion table 2207 so as to be prepared for the subsequent IP masquerade processing.

Returning now to FIG. 45, the IP packet which is applied with the address and port number conversion processing (IP masquerade processing) and transmitted to Internet 2101 side reaches to the IP terminal 2102 (step S5014). Then, the home page of the DVD player 2003 is displayed at the Ip terminal 2102, and the user of the IP terminal 2102 carries out the remote control of the DVD player 2003 using the displayed home page.

Figure 45:
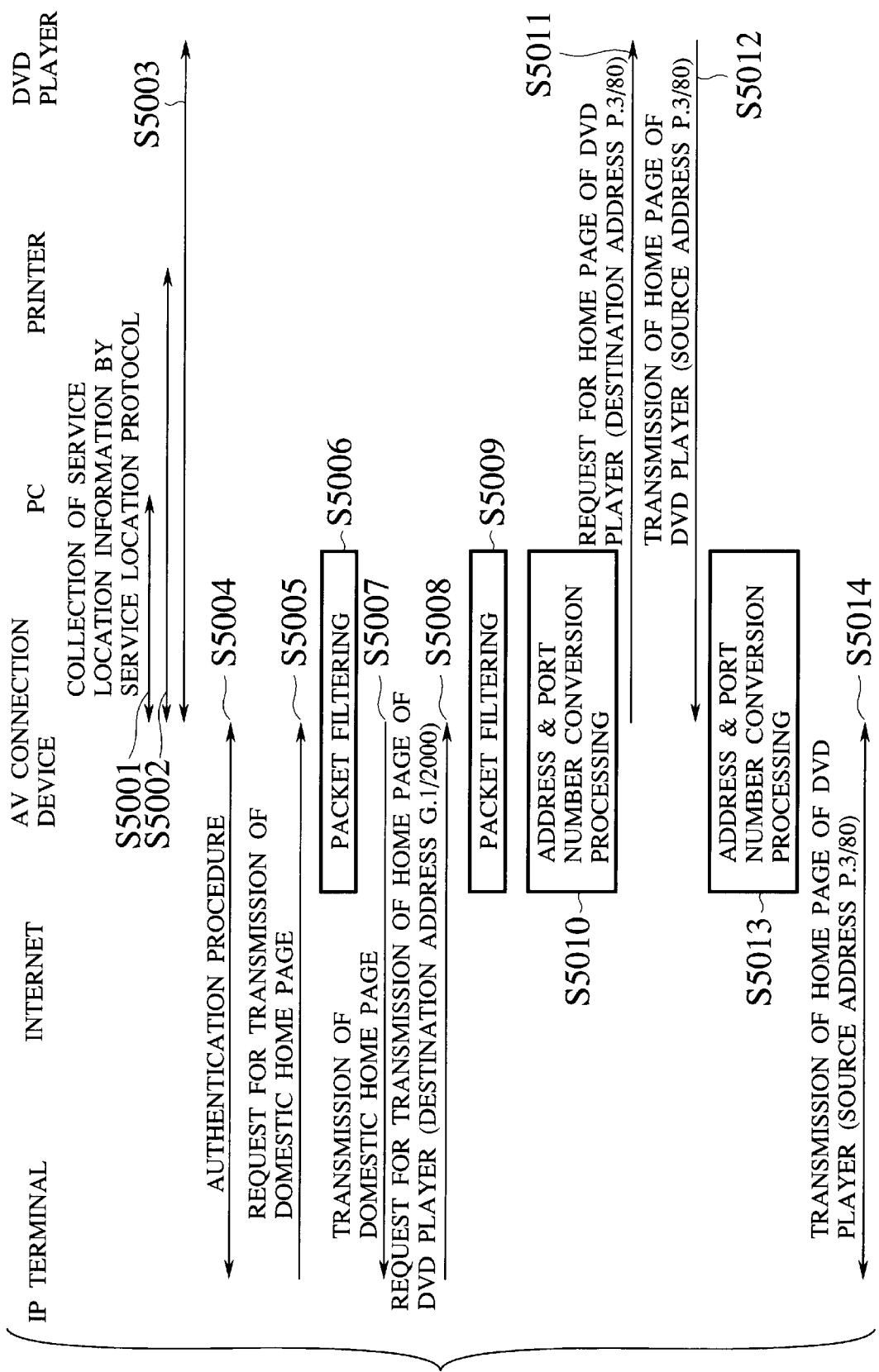
FIG. 45 is a diagram showing an exemplary sequence for the operation of the AV connection device of FIG. 44 in the case of controlling a device connected to the first home network from the second home network.

In the remote control, the start of the playing operation of the DVD player 2003 and the like is carried out by exchanging a request by the CGI program and its processing result in forms of IP packets between the IP terminal 2102 and the DVD player 2003, for example, and the IP masquerade processing like the steps S5010 and S5013 of FIG. 45 is also carried out here as well.

During this operation, the IP terminal 2102 is not aware of the fact that it is carrying out communications with a node of the private address space (the DVD player 2003 having the private IP address in this embodiment). By handling the service presentation and the address conversion processing (IP masquerade processing) integrally in this manner, it becomes possible to make an access from the global unique IP address space to a service provided in the private IP address space.

Note that this fourth embodiment has been described for the case of the address and port number conversion processing by the AV connection device 2201 between the first network in a form of the home network 2010 having the private IP address space and the second network in a form of Internet 2101 having the global IP address space, but it should be apparent that the present invention is equally applicable to any of the following combinations for the first and second networks.

(1) A combination of global IP address and private IP address.

(2) A combination of IPv4 address and IPv6 address.

(3) A combination of IPv6 address and link local IPv6address.

For example, the present invention is applicable to the case where the first network is Internet operated by using IPv6 addresses and the second network is Internet operated by using IPv4 addresses.

Similarly, the present invention is directly applicable to the case where the first network is Internet operated by using link local IPv6 addresses and the second network is Internet operated by using IPv6 addresses.

Also, this fourth embodiment has been described for the case of using home pages on the AV connection device 2201 as a method for advertising services on the home network 2010, but the present invention is equally applicable to the case of using any other method for advertising services such as a method using LDAP (Lightweight Directory Access Protocol), a method using DHCP (Dynamic Host Configuration Protocol), a method using MIB (Management Info-Base) of SNMP (Simple Network Management Protocol), etc.

It is to be noted that the protocols of the network such as IEEE 1394 and LON in the above described amendments should be construed as a protocol depending on a datalink of that network.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication control device connected with first and second networks, comprising:

a collecting unit configured to collect first network service information of service providing devices connected with the first network, the first network service information being readable by using a first protocol depending on the first network;

a notifying unit configured to notify second network service information equivalent to the first network service information collected by the collecting unit to a device connected with the second network, as information on services provided on the second network by the communication control device, the second network service information being readable by using a second protocol not depending on the first network, such that the device connected with the second network that receives the second network service information from the communication control device recognizes services indicated by the second network service information as services provided by the communication control device on the second network;

a receiving unit configured to receive a second protocol packet for controlling at least one of the service providing devices connected with the first network, from said device connected with the second network; and a control unit configured to control said at least one of the service providing devices specified by the second protocol packet, according to the first protocol.

2. The communication control device of claim 1, wherein the second protocol is a network layer protocol.

3. The communication control device of claim 1, wherein the first protocol is depending on a datalink of the first network.

4. The communication control device of claim 1, wherein the notifying unit also notifies the second network service information to another device connected with the first network,
   the receiving unit also receives another second protocol packet for controlling at least another one of the service providing devices connected with the first network, from said another device; and
   the control unit also controls said at least another one of the service providing devices specified by the another second protocol packet, according to the first protocol.

5. The communication control device of claim 1, wherein the notifying unit notifies the second network service information to a directory agent of the second network, so as to register a service provided by one service providing device into the directory agent on behalf of said one service providing device.

6. The communication control device of claim 1, wherein the notifying unit notifies the second network service information to a user agent of the second network, so as to notify the second network service information of one service providing device in response to a query from the user agent on behalf of said one service providing device.

7. The communication control device of claim 1, wherein the notifying unit notifies the second network service information by using a logical multiplex identifier defined by the communication control device and assigned to one service providing device as an access port for said one service providing device.

8. The communication control device of claim 7, further comprising:
   a transfer unit configured to receive a second protocol command in the second protocol which is destined to a port specified by the logical multiplex identifier assigned to said one service providing device, to convert the second protocol command into a first protocol command in the first protocol, and transmitting the first protocol command to said one service providing device.

9. The communication control device of claim 8, wherein the transfer unit has a correspondence table for mapping second protocol commands in the second protocol into first protocol commands in the first protocol.

10. A communication control device connected with first and second networks, comprising:
    a collecting unit configured to collect first network service information of service providing devices connected with the first network, the first network service information being readable by using a first protocol depending on the first network;
    a notifying unit configured to notify second network service information equivalent to the first network service information collected by the collecting unit to a device connected with the second network, in a form of a home page for issuing a first protocol command in the first protocol for controlling a service provided by one service providing device, as information on services provided on the second network by the communication control device, the second network service information being readable by using a second protocol not depending on the first network, such that the device connected with the second network that receives the second network service information from the communication control device recognizes services indicated by the second network service information as services provided by the communication control device on the second network;
    a receiving unit configured to receive a message based on the home page from said device connected with the second network; and
    a control unit configured to control said one service providing device by the first protocol command issued according to said message received by the receiving unit.

11. The communication control device of claim 10, wherein said message contains a second protocol command in the second protocol which is depending on the second network for controlling the service provided by said one service providing device, and the control unit converts the second protocol command contained in said message into the first protocol command by referring to a correspondence table of first protocol commands and second protocol commands.

12. The communication control device of claim 11, wherein said message also contains an address depending on the second protocol and a multiplex identifier for identifying said one service providing device, and the control unit also controls said one service providing device as identified by said multiplex identifier in the first protocol command.

13. The communication control device of claim 11, wherein the home page contains a program configured to generate a second protocol command in the second protocol for controlling the service provided by said one service providing device and said message contains the second protocol command generated by said program.

14. The communication control device of claim 10, wherein the control unit activates a program for issuing the first protocol command with respect to said message received by the receiving unit.

15. The communication control device of claim 1, further comprising:
    a home page creation unit configured to create a home page for issuing a first protocol command in the first protocol for controlling a service provided by one service providing device according to the first network service information collected by the collecting unit, so that the notifying unit notifies the second network service information in a form of the home page created by the home page creation unit;
    a receiving unit configured to receive a message based on the home page from said device connected with the second network; and
    a control unit configured to control said one service providing device by the first protocol command issued according to said message received by the receiving unit.

16. The communication control device of claim 15, wherein the home page creation unit has a table registering a second protocol command in the second protocol for controlling the service provided by said one service providing device that corresponds to the first protocol command which is prescribed for the service provided by said one service providing device, and the home page creation unit creates the home page by obtaining from said table an information regarding the second protocol command that corresponds to the first network service information collected by the collecting unit.

17. The communication control device of claim 15, wherein said message contains a second protocol command in the second protocol for controlling the service provided by said one service providing device, and the control unit converts the second protocol command contained in said message into the first protocol command by referring to a correspondence table of first protocol commands and second protocol commands.

18. The communication control device of claim 17, wherein said message also contains an address depending on the second protocol and a multiplex identifier for identifying said one service providing device, and the control unit controls said one service providing device as identified by said multiplex identifier in the first protocol command.

19. The communication control device of claim 17, wherein the home page contains a program configured to generate a second protocol command in the second protocol for controlling the service provided by said one service providing device and said message contains the second protocol command generated by said program.

20. The communication control device of claim 15, wherein the control unit activates a program for issuing the first protocol command with respect to said message received by the receiving unit.

21. The communication control device of claim 1, further comprising:
- a memory unit configured to assign a second logical multiplex identifier to a service provided by one service providing device on the first network which is identified by a first logical multiplex identifier, and to store a correspondence between a set of a first address of said one service providing device and the first logical multiplex identifier and a set of a second address accessing from the second network and the second logical multiplex identifier, such that the notifying unit notifies the second network service information in order to present the service provided by said one service providing device as a service accessible from the second network at the second address and the second logical multiplex identifier; and
- a packet transfer unit configured to carry out packet transfer between the first network and the second network in order to provide the service provided by said one service providing device to the second network according to the correspondence stored by the memory unit.

22. The communication control device of claim 21, further comprising:
- a unit configured to collect first logical multiplex identifiers and first addresses of the service providing devices on the first network.

23. The communication control device of claim 21, further comprising:
- a second memory unit configured to store identifiers of packets transferrable to the first network; and
- an output unit configured to output those packets having identifiers which are stored by the second memory unit among packets entered from the second network.

24. A method of communication control at a communication control device connected with first and second networks, comprising the steps of:
(a) collecting first network service information of service providing devices connected with the first network, the first network service information being readable by using a first protocol depending on the first network;
(b) notifying second network service information equivalent to the first network service information collected by the step (a) to a device connected with the second network, as information on services provided on the second network by the communication control device, the second network service information being readable by using a second protocol not depending on the first network, such that the device connected with the second network that receives the second network service information from the communication control device recognizes services indicated by the second network service information as services provided by the communication control device on the second network;
(c) receiving a second protocol packet for controlling at least one of the service providing devices connected with the first network, from said device connected with the second network; and
(d) controlling said at least one of the service providing devices specified by the second protocol packet, according to the first protocol.

25. The method of claim 24, wherein the second protocol is a network layer protocol.

26. The method of claim 24, wherein the first protocol is depending on a datalink of the first network.

27. The method of claim 24, wherein the step (b) also notifies the second network service information to another device connected with the first network, and the method further comprises the steps of:
(e) receiving another second protocol packet for controlling at least another one of the service providing devices connected with the first network, from said another device; and
(f) controlling said at least another one of the service providing devices specified by the another second protocol packet, according to the first protocol.

28. The method of claim 24, wherein the step (b) notifies the second network service information to a directory agent of the second network, so as to register a service provided by one service providing device into the directory agent on behalf of said one service providing device.

29. The method of claim 24, wherein the step (b) notifies the second network service information to a user agent of the second network, so as to notify the second network service information of one service providing device in response to a query from the user agent on behalf of said one service providing device.

30. The method of claim 24, wherein the step (b) notifies the second network service information by using a logical multiplex identifier defined by the communication control device and assigned to one service providing device as an access port for said one service providing device.

31. The method of claim 30, further comprising the step of:
(e) receiving a second protocol command in the second protocol which is destined to a port specified by the logical multiplex identifier assigned to said one service providing device, converting the second protocol command into a first protocol command in the first protocol, and transmitting the first protocol command to said one service providing device.

32. The method of claim 31, wherein the step (e) uses a correspondence table for mapping second protocol commands in the second protocol into first protocol commands in the first protocol.

33. A method of communication control at a communication control device connected with first and second networks, comprising the steps of:
(a) collecting first network service information of service providing devices connected with the first network, the first network service information being readable by using a first protocol depending on the first network;
(b) notifying second network service information equivalent to the first network service information collected by the step (a) to a device connected with the second network, in a form of a home page for issuing a first protocol command in the first protocol for controlling a service provided by one service providing device, as information on services provided on the second network by the communication control device, the second network service information being readable by using a second protocol not depending on the first network, such that the device connected with the second network that receives the second network service information from the communication control device recognizes services indicated by the second network service information as services provided by the communication control device on the second network;

(c) receiving a message based on the home page from said device connected with the second network; and (d) controlling said one service providing device by the first protocol command issued according to said message received by the step (c).

34. The method of claim 33, wherein said message contains a second protocol command in the second protocol which is depending on the second network for controlling the service provided by said one service providing device, and the step (d) converts the second protocol command contained in said message into the first protocol command by referring to a correspondence table of first protocol commands and second protocol commands.

35. The method of claim 34, wherein said message also contains an address depending on the second protocol and a multiplex identifier for identifying said one service providing device, and the step (d) also controls said one service providing device as identified by said multiplex identifier in the first protocol command.

36. The method of claim 34, wherein the home page contains a program for generating a second protocol command in the second protocol for controlling the service provided by said one service providing device and said message contains the second protocol command generated by said program.

37. The method of claim 33, wherein the step (d) activates a program for issuing the first protocol command with respect to said message received by the step (c).

38. The method of claim 24, further comprising the steps of:

(e) creating a home page for issuing a first protocol command in the first protocol for controlling a service provided by one service providing device according to the first network service information collected by the step (a), so that the step (b) notifies the second network service information in a form of the home page created by the step (e);

(f) receiving a message based on the home page from said device connected with the second network; and (g) controlling said one service providing device by the first protocol command issued according to said message received by the step (f).

39. The method of claim 38, wherein the step (e) uses a table registering a second protocol command in the second protocol for controlling the service provided by said one service providing device that corresponds to the first protocol command which is prescribed for the service provided by said one service providing device, and the step (e) creates the home page by obtaining from said table an information regarding the second protocol command that corresponds to the first network service information collected by the step (a).

40. The method of claim 38, wherein said message contains a second protocol command in the second protocol for controlling the service provided by said one service providing device, and the step (g) converts the second protocol command contained in said message into the first protocol command by referring to a correspondence table of first protocol commands and second protocol commands.

41. The method of claim 40, wherein said message also contains an address depending on the second protocol and a multiplex identifier for identifying said one service providing device, and the step (g) controls said one service providing device as identified by said multiplex identifier in the first protocol command.

42. The method of claim 40, wherein the home page contains a program for generating a second protocol command in the second protocol for controlling the service provided by said one service providing device and said message contains the second protocol command generated by said program.

43. The method of claim 38, wherein the step (g) activates a program for issuing the first protocol command with respect to said message received by the step (f).

44. The method of claim 24, further comprising the steps of:

(e) assigning a second logical multiplex identifier to a service provided by one service providing device on the first network which is identified by a first logical multiplex identifier, and storing a correspondence between a set of a first address of said one service providing device and the first logical multiplex identifier and a set of a second address accessing from the second network and the second logical multiplex identifier, such that the step (b) notifies the second network service information in order to present the service provided by said one service providing device as a service accessible from the second network at the second address and the second logical multiplex identifier; and (f) carrying out packet transfer between the first network and the second network in order to provide the service provided by said one service providing device to the second network according to the correspondence stored by the step (e).

45. The method of claim 44, further comprising the steps of:

(g) collecting first logical multiplex identifiers and first addresses of the service providing devices on the first network.

46. The method of claim 44, further comprising the steps of:

(g) storing identifiers of packets transferrable to the first network; and (h) outputting those packets having identifiers which are stored by the step (g) among packets entered from the second network.

* * * * *